(12) United States Patent
Coyle et al.

(10) Patent No.: US 6,789,030 B1
(45) Date of Patent: Sep. 7, 2004

(54) PORTABLE DATA COLLECTOR AND ANALYZER: APPARATUS AND METHOD

(75) Inventors: Sean Coyle, Warrington (GB);
Christopher Dagnall, Bebington (GB);
Andrew Barnes, Warrington (GB);
Anthony Doggett, Rochdale (GB);
Dean Wood, Manchester (GB)

(73) Assignee: Bently Nevada, LLC, Minden, NV (US)

( * ) Notice: Subject to any disclaimer, the term of this patent is extended or adjusted under 35 U.S.C. 154(b) by 684 days.

(21) Appl. No.: 09/603,659

(22) Filed: Jun. 23, 2000

(51) Int. Cl.$^7$ .................................................. G01M 7/00
(52) U.S. Cl. ........................................ 702/77; 702/182
(58) Field of Search ..................... 702/77, 190, 189, 702/113, 141, 179, 182, 76

(56) References Cited

U.S. PATENT DOCUMENTS

| | | |
|---|---|---|
| 3,783,680 A | 1/1974 | Mason |
| 3,930,248 A | 12/1975 | Keller |
| 4,038,866 A | 8/1977 | Johnson |
| 4,090,247 A | 5/1978 | Martin |
| 4,133,034 A | 1/1979 | Etter |
| 4,184,205 A | 1/1980 | Morrow |
| 4,302,977 A | 12/1981 | Sisson et al. |
| 4,320,662 A | 3/1982 | Schaub et al. |
| 4,322,976 A | 4/1982 | Sisson et al. |
| 4,352,164 A | 9/1982 | Reed et al. |
| 4,366,544 A | 12/1982 | Shima et al. |
| 4,399,513 A | 8/1983 | Sullivan et al. |
| 4,408,285 A | 10/1983 | Sisson et al. |
| 4,425,798 A | 1/1984 | Nagai et al. |
| 4,478,082 A | 10/1984 | Sato et al. |
| RE31,750 E | 11/1984 | Morrow |

(List continued on next page.)

FOREIGN PATENT DOCUMENTS

| | | |
|---|---|---|
| EP | 0 088 627 | 9/1983 |
| GB | 2 049 935 A | 12/1980 |
| GB | 2 082 324 A | 3/1982 |
| GB | 2 116 713 A | 9/1983 |
| JP | 58 108419 | 6/1983 |
| WO | WO 81/03702 | 12/1981 |
| WO | WO 97/10491 | 3/1997 |

OTHER PUBLICATIONS

Tecalemit Electronics, Ltd., article re: "Automatic Vibration Monitor", "Noise & Vibration Control Worldwide", Equipment News, Dec., 1982, pp. 361 and 362.

(List continued on next page.)

Primary Examiner—Marc S. Hoff
Assistant Examiner—Edward Raymond
(74) Attorney, Agent, or Firm—Dennis A. DeBoo

(57) ABSTRACT

A portable data collector and analyzer apparatus and method provides predictive and preventative maintenance of a multiplicity of assets through the use of a unique architecture that allows a variety of different application programs to be downloaded to the apparatus for providing a single multi-purpose portable data collector and analyzer apparatus that can employ the variety of different application programs for configuring, inter alia, different measurements types, different transducers types and different signal processing types for collecting and analyzing sensed physical data from a variety of different assets found in industrial plants. A unique frequency shifting and decimation method is employed for spectrum calculation that, inter alia, retains DSP addressing efficiency and increases signal processing speed. Additionally, a unique synchronous sampling method is employed that generates synchronous sample waveforms from asynchronous sample waveforms. Furthermore, a unique clear touch screen overlying a quarter VGA display, an ergonomically designed keypad, and an intuitive user interface allow quick and easy setup and operation for in-field data acquisition, analysis and display.

10 Claims, 74 Drawing Sheets

U.S. PATENT DOCUMENTS

| | | | |
|---|---|---|---|
| 4,518,917 | A | 5/1985 | Oates et al. |
| 4,520,674 | A | 6/1985 | Canada et al. |
| 4,558,311 | A | 12/1985 | Forsgren et al. |
| 4,573,358 | A | 3/1986 | Luongo |
| 4,612,620 | A | 9/1986 | Davis et al. |
| 4,800,512 | A | 1/1989 | Busch |
| 4,847,556 | A | 7/1989 | Langley |
| 4,868,498 | A | 9/1989 | Lusinchi et al. |
| 4,885,707 | A | 12/1989 | Nichol et al. |
| 4,928,400 | A | 5/1990 | Schuh |
| 4,974,214 | A | 11/1990 | Forster et al. |
| 5,112,196 | A | 5/1992 | Schuh |
| 5,365,787 | A | 11/1994 | Hernandez et al. |
| 5,438,882 | A | 8/1995 | Karim-Panahi et al. |
| 5,442,285 | A | 8/1995 | Zombo et al. |
| 5,633,811 | A | 5/1997 | Canada et al. |
| 5,691,904 | A | 11/1997 | Lysen |
| 5,757,181 | A | 5/1998 | Wolf et al. |
| 5,767,669 | A | 6/1998 | Hansen et al. |
| 5,808,903 | A | 9/1998 | Schiltz et al. |
| 5,839,094 | A | 11/1998 | French |
| 5,870,699 | A | 2/1999 | Canada et al. |
| 5,943,634 | A | 8/1999 | Piety et al. |
| 5,956,658 | A | 9/1999 | McMahon |
| 6,006,164 | A | 12/1999 | McCarty et al. |
| 6,484,109 | B1 * | 11/2002 | Lofall .......................... 702/56 |

OTHER PUBLICATIONS

Tecalert Electronics Ltd. advertisement re: AVM1 Automated Vibration Monitor, Noice & Vibration Control Worldwide, Apr., 1983, p. 88.

IRD Mechanalysis, Inc. product data sheet re: "Model 816 Machinery Maintenance Data Collector" 1983, 2 pages total.

Bently Nevada Corporation, Product Brochure re: "Snapshot", Oct., 1983, 4 pages total.

IRD Mechanalysis, Inc. product data sheet re: "Model 817 Machinery Maintenance Data Collector", 1984, 6 pages total.

IRD Mechanalysis, Inc. product data sheet re: "Model 818 Machinery Maintenance Data Collector", 1985, 4 pages total.

Tecalemit Electronics Ltd., product brochure, AVM11 Automated Vibration Monitor, Apr. 19, 1987, 4 pages total.

Beta Monitors & Controls Ltd. and Trap Technology, advertisement, "Data–Trap 9000", Nov. 1989, double–sided, single page document.

SKF USA Inc., Conditioning Monitoring Catalog, 1991, 3 cover pages and catalog pp. B38–B43, and B45.

DLI Engineering Corporation, DLI Watchman Predictive Maintenance System "Watchman DC–7", Vibration Data Collector and Field Analyzer Operating Manual, Apr. 17, 1992, entire manual.

DLI Engineering Corporation, advertisement re: DLI "Watchman DC–7A" Field Analyzer/Data Collector, Jun. 8, 1992, 2 pages total.

Pruftechnik AG, product brochure re: "vibrotip" machine analyzer & data collector: five maintenance tools in one instrument; 1993, 8 pages total.

Vibro–Meter SA, product brochure re; "Vibrolog VML 931" Data Collector & Analyzer, Aug. 1992, 3 pages total.

SKF Conditioning Monitoring, Inc., product brochure re: Vibration Pen Plus "CMVP40" and "CMVP50", Sep., 1994, 2 pages total.

DiognosticInstruments, DI–1100 Operator's Guide, 1995, entire guide.

CSI, product advertisement and data sheet re: 2120 Machinery Analyzer, Feb., 1995, 2 page advertisement.

Bruel & Kjaer, Data Collector System—2526 Series Product Data Pamphlet, Oct., 1995, entire pamphlet.

Diagnostic Instruments Limited, Di–1100–iS Data Collector advertisement, 1996, 2 page advertisement.

CSI, product advertisement and data sheet re: 1010 Data Collector, Feb., 1996, 2 page advertisement.

Schenck Trebel, Schenck Corporation, Series 40 portable machinery diagnostic instrmentations brochure, 1996, entire brochure.

SKF Condition Monitoring, Inc., product advertisement re: Microlog CMVA55 Portable Data Collector/FFT Analyzer, May, 1996, 2 page advertisement.

Balmac, Inc. product advertisement re: Digital Vibration Meter, Feb., 1997, "Maintenance Technology", 1 page advertisement.

Vitec, Inc., product brochure re: DC+3 Data Collector, non–dated publication, entire brochure .

Schenck, Technical Data Sheet re: Data Collector Vibrostore 41, non–dated publication, 1 page total.

SKF, product brochure re: Hand–Held Products for Conditioning Monitoring "CMVL 10 Picolog Hand–Held Data Logge"r, non–dated publication, 2 pages total.

SKF, product brochure re: Microlog and Prism System CMVL 40Portable Dual–Channel FFT Analyzer, non–dated publication, 3 pages total.

IRD Mechanalysis, product brochure re: The dataPAC Family, non–dated publication, entire brochure.

AMD, Machine Diagnosis Series brochure, non–dated publication, entire brochure.

Beta Monitors & Controls, Ltd., Automated Prediction Maintenance product brochure, non–dated publication, entire brochure.

Entek Scientific Corporation, Emonitor dataline product brochure, non–dated publication, entire brochure .

DLI Engineering Corporation, Watchman–DC–7B Operating Manual, non–dated publication, introduction, chapters 2–8, glossary of terms and index.

* cited by examiner

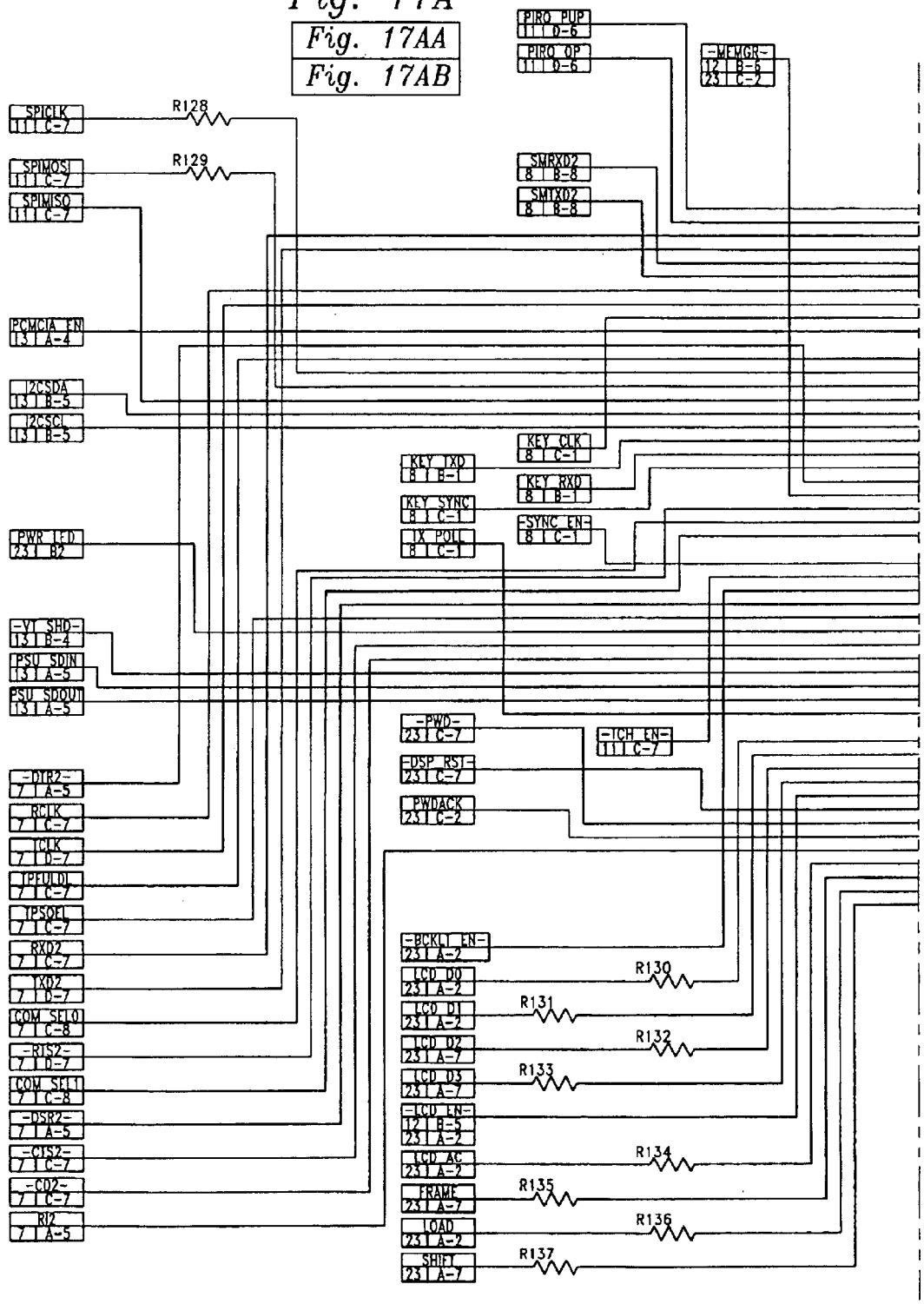

PCMCIA ADDRESS & DATA BUFFERS
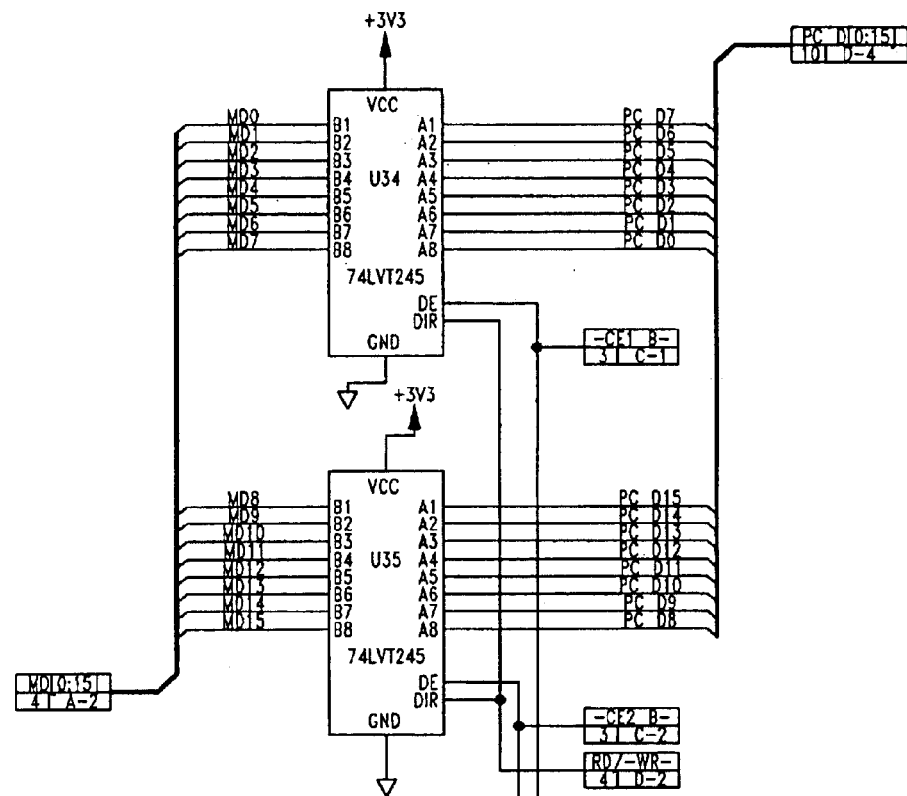
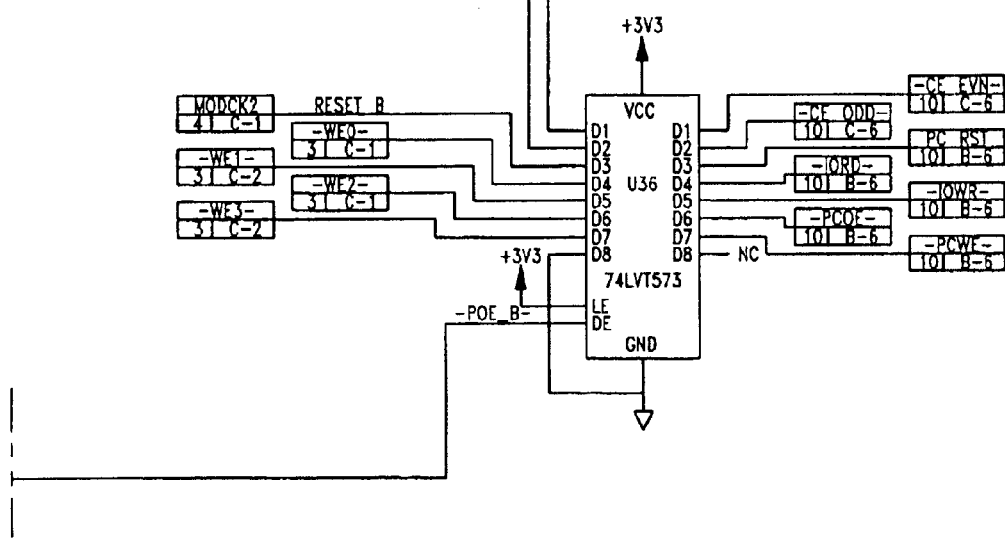
Fig. 26

TRANSDUCER CURRENT LIMITED SUPPLIES

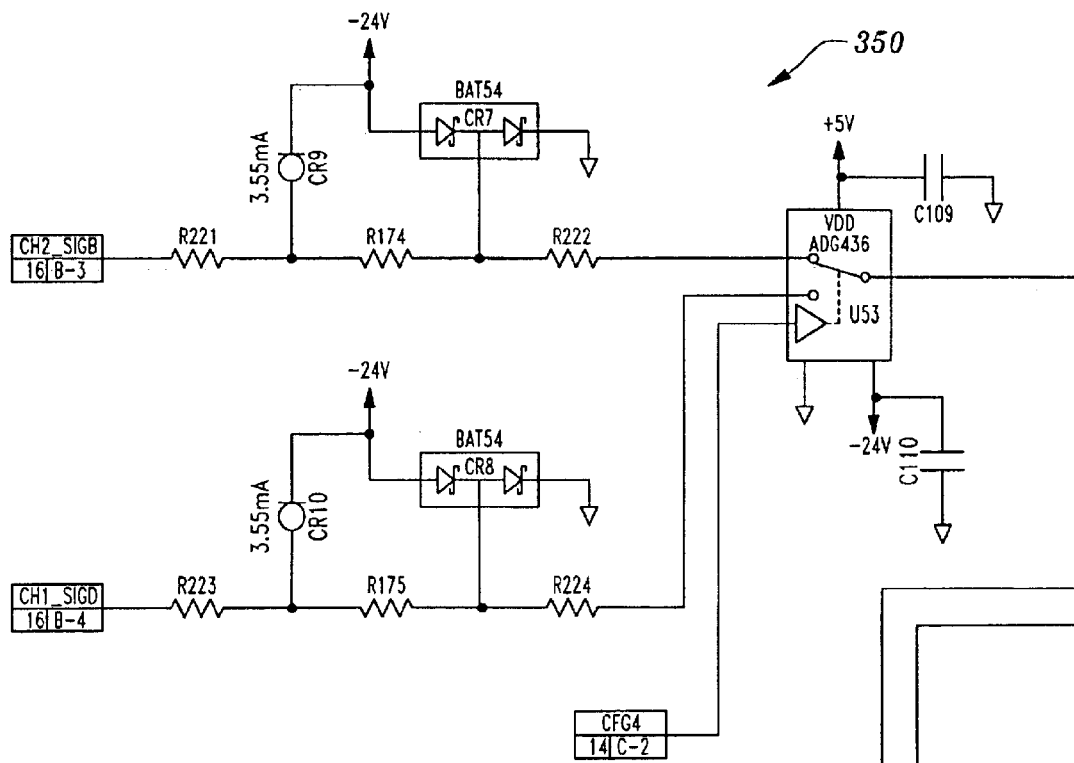
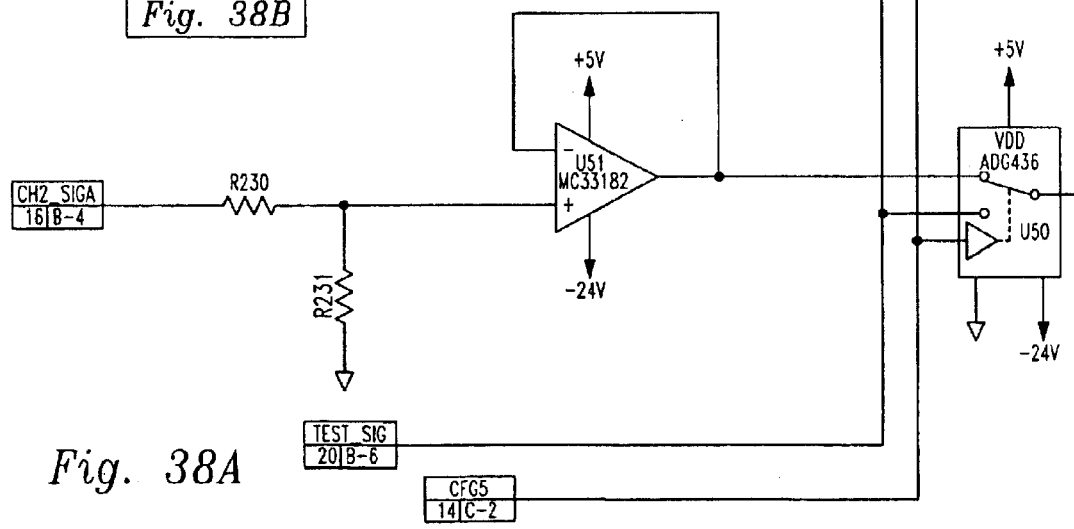
Fig. 38
| Fig. 38A |
| Fig. 38B |
Fig. 38A

TRANSDUCER SUPPLY NODE VOLTAGES

| Fig. 50A |
| Fig. 50B |

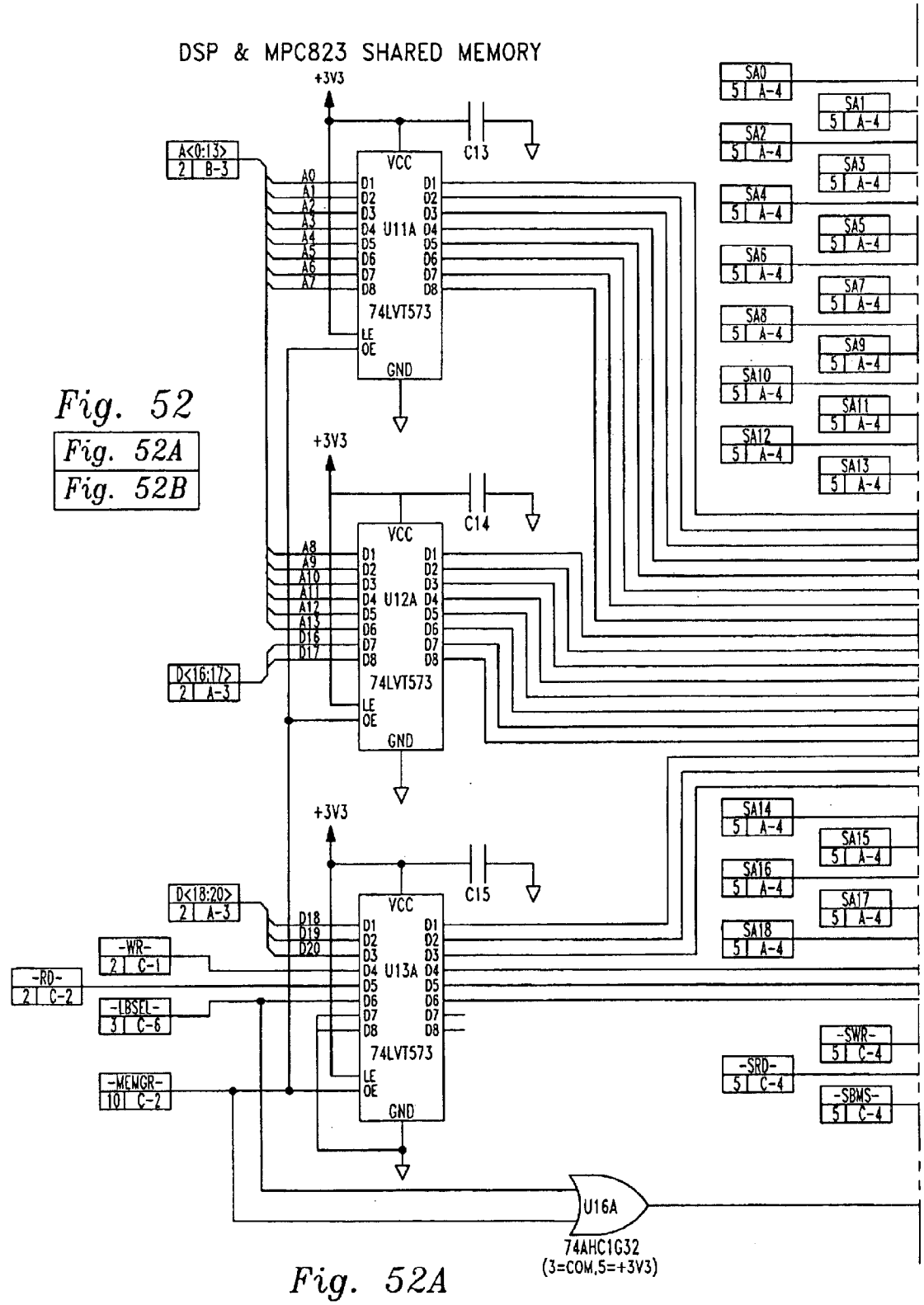

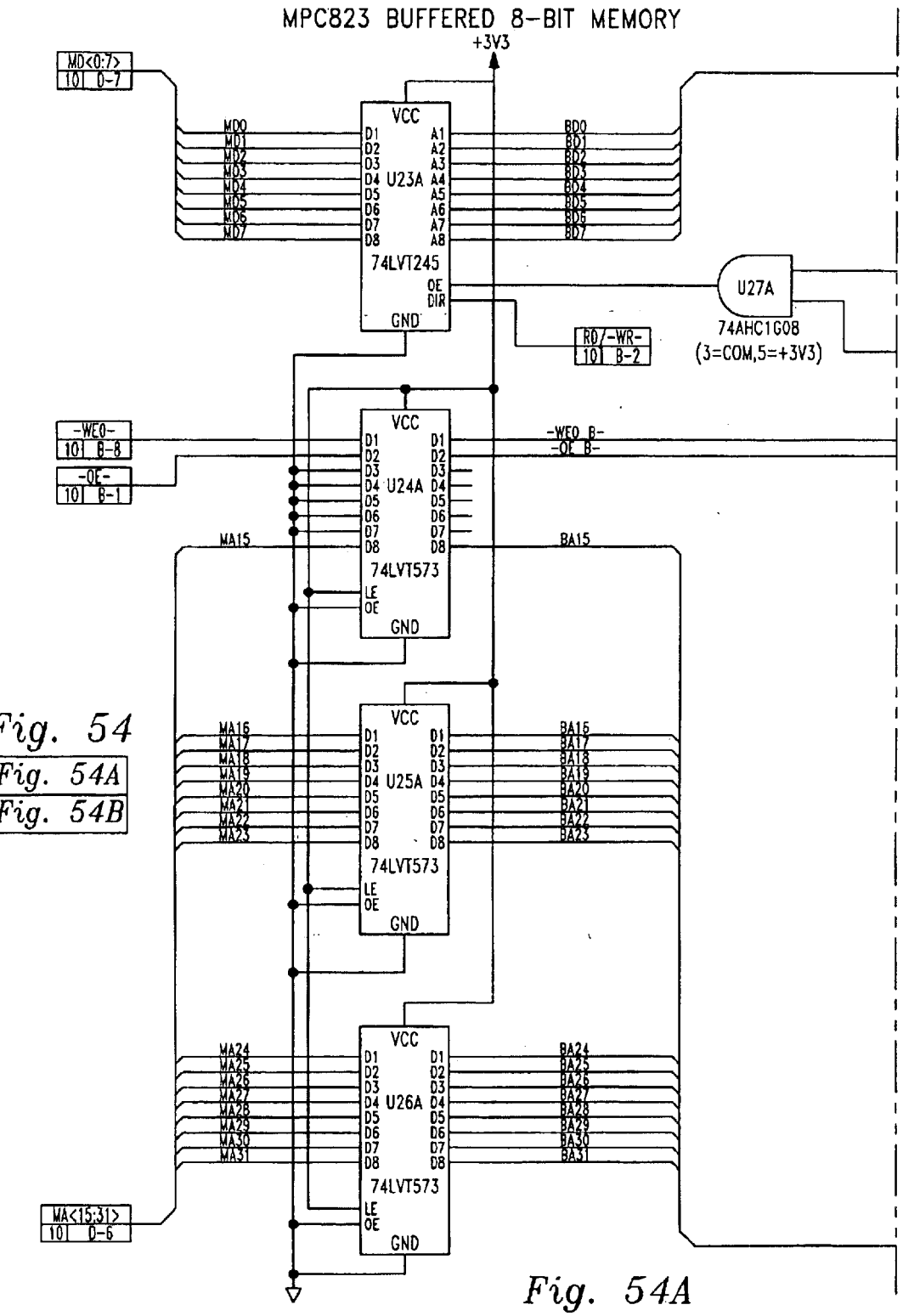

| Fig. 55B |
|----------|
| Fig. 55B |

LED CONTROL CIRCUIT AND OVP CIRCUIT

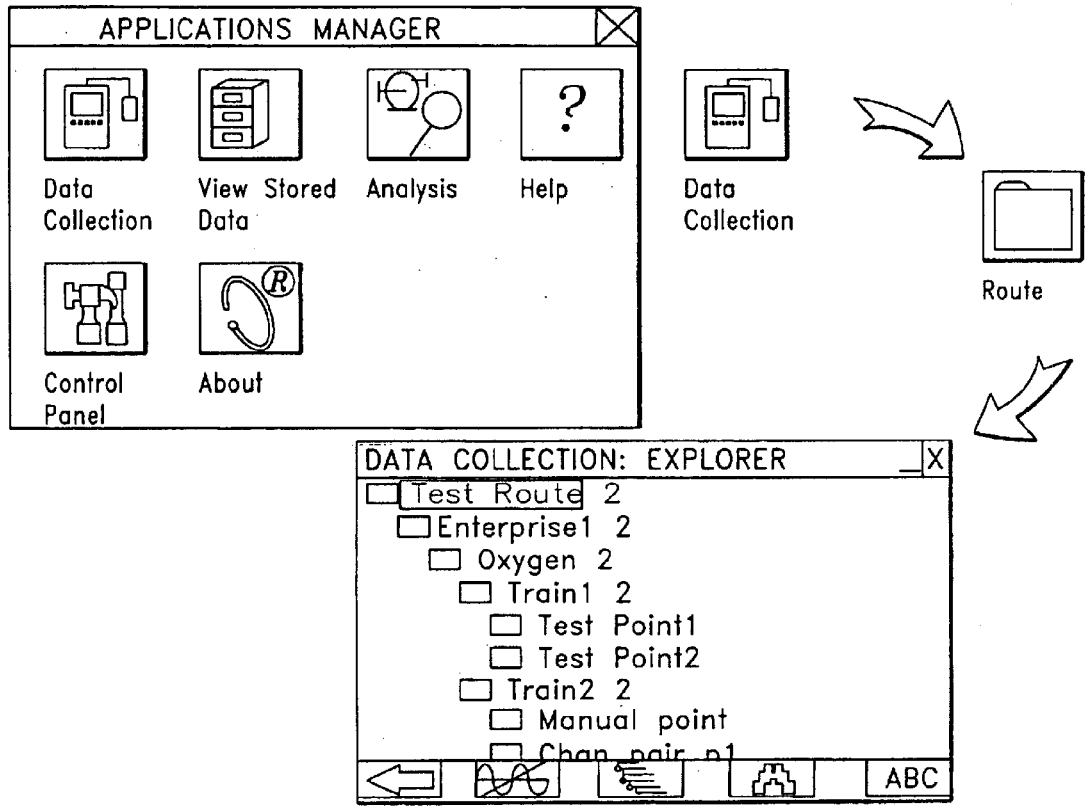

Fig. 74

| KEY | ACTION |
|---|---|
| ⬅ OR F1 | RETURN TO PREVIOUS SCREEN. |
| F2 | MARK THE CURRENT LEVEL IN THE HIERARCHY AS INTENTIONALLY MISSED. |
| F3 | EXPAND/CONTRACT THE HIERARCHY STRUCTURE AT THE HIGHLIGHTED LEVEL. |
| F4 | LOCATE THE REQUIRED POINT BY TAG ID. |
| F5 | ENTER A TEXT MESSAGE AT THE CURRENT LEVEL IN THE ENTERPRISE HIERARCHY. |
| 🔘 | START TAKING MEASUREMENTS. ONLY ONE KEY PRESS IS REQUIRED TO START MEASUREMENT, STORE DATA, AND RETURN TO THE NEXT POINT IN THE ROUTE. |

Fig. 75

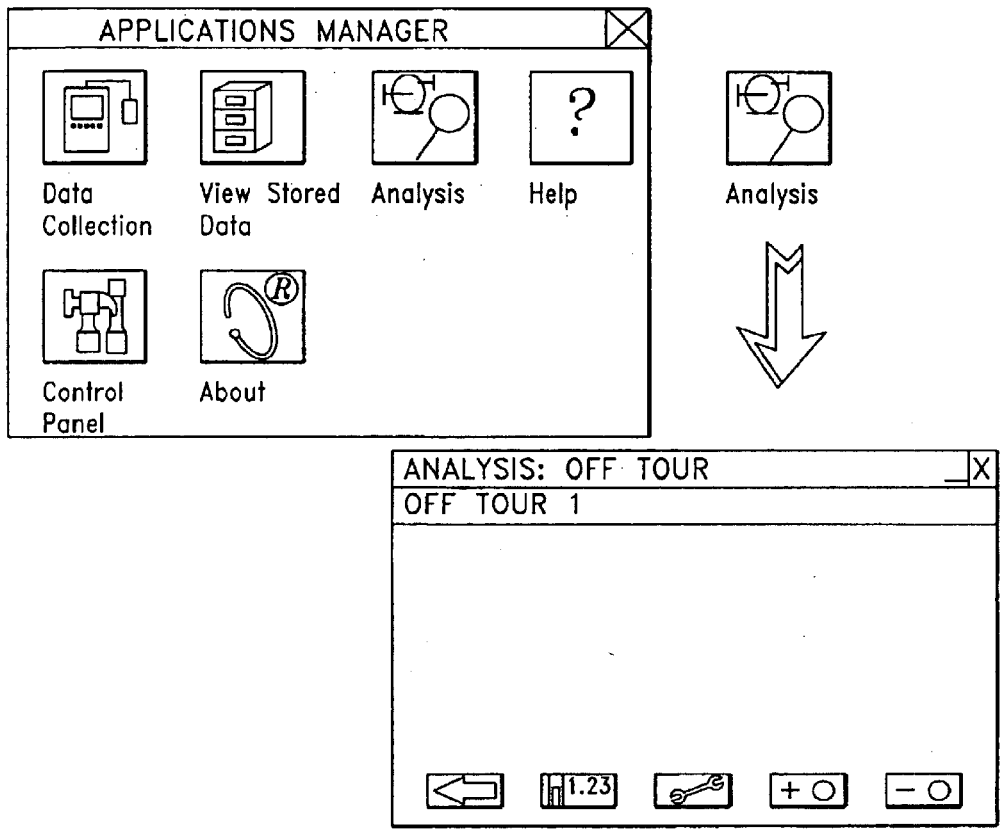

Fig. 76

| KEY | ACTION |
|---|---|
| ⬅ OR F1 | RETURN TO PREVIOUS SCREEN. |
| 1.23 OR F2 | GO TO MEASUREMENT SCREEN. |
| 🔧 OR F3 | CONFIGURE TRANSDUCER TYPE, MEASUREMENT TYPE, ETC. USE DIRECTION BUTTONS AND AND ENTER BUTTON AS NECESSARY. |
| F4 | CREATE A NEW ANALYSIS MEASUREMENT POINT. |
| F5 | DELETE THE CURRENT ANALYSIS MEASUREMENT POINT. |
| ⏎ | START TAKING MEASUREMENTS. PRESS TO START MEASURING, COLLECT DATA, SAVE VALUES, AND RETURN TO ANALYSIS MAIN SCREEN. |

Fig. 77

PORTABLE DATA COLLECTOR AND ANALYZER: APPARATUS AND METHOD

FIELD OF THE INVENTION

The present invention relates generally to portable data collector and analyzer systems for collecting and analyzing data and, in particular, to a handheld portable data collector and analyzer apparatus and method for collecting and analyzing industrial plant asset data for protecting and managing industrial plant assets including machinery.

BACKGROUND OF THE INVENTION

Portable data collector and analyzer apparatus supporting predictive and preventative maintenance of plant assets have been employed in industry for a number of years. However, this apparatus is specialized and can only be targeted for narrow applications. For example, hand-held vibration measuring apparatus has been designed and targeted for the predictive and preventative maintenance of rotating machinery assets. Likewise, compressor performance measuring systems have been designed and targeted for reciprocating compressors. Manual data loggers have been used to record the condition of large assets such as pipe-work and underground tunnels. Further apparatus is required to align and balance machinery. This methodology of employing a large variety of specialized apparatus has resulted in significant costs and logistical problems for maintenance departments and personnel in industrial environments.

For example, the employment of a multiplicity of specialized apparatus for providing predictive and preventative maintenance of industrial plant assets augments costs by having a direct correlation to the amount of training required by personnel on each of the different specialized apparatus.

Additionally, personnel making multiple visits to a site with each of the specialized apparatus or carrying a collection of the specialized apparatus to a site for collecting data is both a laborious and time-consuming task that also augments the costs of providing predictive and preventative maintenance of industrial plant assets.

Furthermore, the task of procuring, maintaining and training personnel on a variety of different apparatus often from a variety of vendors and then routing the personnel with this variety of apparatus for collecting data is a huge logistical problem which is both costly and time consuming and results in resources being directed to the logistical problems of collecting data at the expense of correcting problems.

Moreover, safety risks to the health of maintenance personnel in industrial environments are significant. For example, many installations are classified as hazardous due to the likelihood of the presence of explosive gases. These gases, in even much smaller concentrations, may also be deleterious to the health of maintenance personnel. Thus, the employment of a multiplicity of specialized apparatus for providing predictive and preventative maintenance of industrial plant assets increases the exposure of personnel to these hazards and thus brings about greater safety risks.

Hence, there is a need to provide a single portable data collector and analyzer apparatus that not only provides predictive and preventative maintenance of a multiplicity of commonly occurring assets within an industrial environment for reducing costs, training and logistical problems but also provides an apparatus that increases the types of measurements that can made during each visit to each asset for reducing the exposure and safety risks of personnel to these hazardous environments thereby providing, inter alia, significant costs, training, logistical, safety, and timeliness advantages.

Notwithstanding, current portable data collector and analyzer apparatus have also failed to address the important fact that typically machinery diagnostics rarely rely on a single plot or data type for a complete understanding of problems and in stark contrast one looks for multiple indicators from various sources to confirm problems. Additionally, current portable data collector and analyzer apparatus require significant manual operation which is more prone to human error. Furthermore, there is a need to increase the speed and accuracy in current portable data collector and analyzer apparatus.

In view of the foregoing, there is a need for a single portable data collector and analyzer apparatus that collects and analysis a variety of different types of asset data in a variety of different ways. Additionally, there is also a need for increasing the ease and accuracy in which these instrumentalities operate for, inter alia, providing fast and accurate data collection thereby allowing personnel to correct (rather then detect) problems. Furthermore, the improvement in speed and accuracy directly correlate to cost savings and to the speed in which problems may be addressed.

SUMMARY OF THE INVENTION

The present invention recognizes the shortcomings of the known prior art and is distinguished thereover in a multiplicity of ways. One of the starkest differentiations that the present invention enjoys over the known prior art involves the fact that the present invention is not a specialized apparatus that merely targets a single category of machinery or other plant asset for providing predictive and preventative maintenance. In stark contrast, the present invention provides a single handheld multi-purpose portable data collector and analyzer apparatus and method that, inter alia, provides predictive and preventative maintenance of a multiplicity of commonly occurring assets within an industrial environment for reducing costs, training and logistical problems. The single handheld multi-purpose portable data collector and analyzer apparatus and method, in accordance with the present invention, also increases the types of measurements that can made during each visit to each asset for providing significant cost, training, logistical, safety, and timeliness advantages.

Additionally, the present invention combines a flexible hardware and software design to provide a multi-purpose apparatus and method that permits the preventative and predictive maintenance of the multifarious types of assets typically found within an industrial complex. It can be configured to be operatively coupled with a wide range of transducer types e.g. vibration, temperature, speed, process variable, pressure as well as provide the means to manually record a broad range of values and observations relating to the condition of a variety of assets including machines. Moreover, the present invention provides a single multi-purpose apparatus that employs a single unified display application for addressing the wide range of transducer types and signal processing options.

Furthermore, the present invention is designed to provide extensive external communication capabilities. As a result, the present invention is capable of correlating information from multiple sources that allows timely, operational decisions on machinery condition that consider both the machinery and the surrounding process conditions/constraints. Thus, the present invention provides fewer and less severe failures, better production availability, maintenance cost reductions, and the potential for increased production revenues. This ability is provided by the present invention gathering information from multiple information sources within the industrial complex and integrating the information into a single upload to a host computer for further analysis and storage.

For a clear explanation, the present invention can be partitioned into a transducer input/output module, a analog signal conditioning module, an anti-alias filtering and analog to digital converter module, microcontroller module, a digital signal processing module, a user input and display module, a communications module, and a power supply/charger module.

These modules are preferably housed by an injection molded casing formed from a polycarbonate/ABS material for providing high impact resistance and durability.

Transducer Input/Output Transfer Module

The transducer input/output module provides connector means for transferring input and output signals between the analog signal conditioning module and transducers interfaced to the connector means via cables or other signal transmitting medium.

Analog Signal Conditioning Module

The analog signal conditioning module is comprised of two fully functional channels which couple to a wide variety of transducers. Specifically, the two functional channels each provide a pair of constant current sources which can be toggled to power an acceleration or velocity transducer. Each of the two functional channels also include an interface for general purpose signal inputs, including displacement, velocity, acceleration, temperature, pressure and other process variables transducers which produce voltage outputs in the range from a negative 24 to a positive 10 volts. One specific example is the powering of negative 24 volt proximity transducers. The signals outputted by these transducers are conditioned to, for example, a range of about plus 1.25 to plus 3.75 volts and, in turn, are passed to the DSP module.

Additionally, the analog signal conditioning module includes a third channel for phase and speed input. The present invention supports phase reference input from single output devices, such as displacement transducers, optical phase references transducers or magnetic pickup transducers, or from dual output devices, such as encoder transducers. The signals outputted by the single output transducers that are in range of a negative 24 to a positive 10 volts are conditioned to, for example, a range of about 0 to 2.5 volts and are, in turn, passed to the DSP module. The signals outputted by the dual output transducers are pulled up to about 5 volts and are conditioned to, for example, a range of about 3 to 3.3 volts and are, in turn, passed to the DSP module.

Furthermore, the analog signal conditioning module includes a fourth channel for receiving and conditioning input signals from an Auto-Point ID device such as a barcode reader and outputting conditioned signals to the microcontroller module.

Moreover, the analog signal conditioning module includes a self-test mechanism means that can be toggled to disconnect the transducer inputs from each of the two fully functional channels and from the third channel. A know voltage is then applied to each of the respective signal paths and then their outputs are measured and compared against an ideal value via the DSP module for determining whether the signal paths are working correctly or not.

Anti-alias Filtering and Analog to Digital Converter Module

The anti-alias filtering and analog to digital converter module includes a pair of multiplexers which receive signals from the analog signal conditioning module. Each of the multiplexers can select one source from the fully functional channels and the third channel. Each of the outputs from the pair of multiplexers is connected to a separate anti-alias filter which filters the multiplexed signals and in turn passes the filtered signals to a separate analog to digital converters. The analog to digital converters digitize the filtered signals and output these digitized signals to the DSP module for further processing. The DSP module orchestrates the digitization or sampling rate of the analog to digital converters by selecting between one of two oscillators having different frequencies. The selected oscillator is used to clock the analog to digital converters for providing one of two output data rates.

Microcontroller Module

The microcontroller module includes a microcontroller which is a versatile one-chip integrated microprocessor and peripheral combination that supports a Graphical User Interface (GUI), communications, and a high-level real-time operating systems such as the Windows®CE operating system. The microcontroller will be discussed below in combination with the digital signal processing module, the communications module and the user input and display module delineated below.

Digital Signal Processing Module

The digital signal processing module is comprised of a digital signal processor (DSP) that performs all of the signal processing necessary for the input transducers in use. Specifically, a shared memory device is interfaced between and shared by both the digital signal processor and the microprocessor. When first requiring the DSP to perform signal processing, the microcontroller places the DSP in reset, then downloads DSP code into the shared memory, and subsequently brings the DSP out of reset. This has the effect of forcing the DSP to load and run this code. Each download of DSP code to the shared memory can be, for example, different types of applications, different types of measurements, different types of transducers or any combination thereof for accommodating different types of sensed physical data for the large variety of different types of assets found in industrial plants.

Hence, one hallmark of the present invention is that downloading the code as and when required has the advantage that many different versions of DSP code can be used depending upon the application being run. In addition, this means that an EPROM is not needed to store code and rather, code can be upgraded by downloading new firmware to the portable data collector and analyzer apparatus. For example, if the present DSP code is reflective of vibration data collection and analyzes the future DSP code can be reflective of, for example, balancing, alignment, motor current or reciprocating compressor data collection and analyzes by downloading the code to the apparatus, as will be explained infra, and then employing the above method of placing the DSP in reset, downloading the desired DSP code into the shared memory and subsequently bringing the DSP out of reset for effecting the DSP to load and run this code. As a result, there is no need to change any of the hardware of the present invention to add new functionality for collecting and analyzing data a variety of different asset types.

Once the DSP code is run, the DSP receives configuration data describing which measurements to take. The DSP then orchestrates the digitization of the conditioned analog signals as delineated hereinabove, processes the digitized data and then writes out the results to the shared memory and informs the microcontroller that new results are available to be read.

The DSP is able to perform several processing tasks in parallel, depending upon what measurements are configured. For example, the DSP can perform a dual channel spectrum and also two channel overall vibration values as well as giving a speed measurement, all in parallel. Additionally, the DSP can calculate dual channel overall vibration, prime spike, rotor region, and gap values in parallel. Furthermore, the DSP can synchronously sample and calculate dual channel overall vibration, prime spike, rotor region, gap values and 1X and 2X vectors in parallel.

The DSP processing greatly benefits from a novel, useful and unobvious frequency shifting and decimation method for spectrum calculation.

Generally, the frequency shifting and decimation method according to the present invention includes the steps of:
(a) defining a resolution of lines of a final output line spectrum;
(b) selecting N digital data samples from the digitized data wherein N is an integer power of two (wherein the value of N is determined by the desired number of lines of resolution (N=2.56*lines of resolution);
(c) frequency shifting said N digital data samples by a predetermined frequency amount to produce a set of N point complex data,
(d) decimating said N point complex data for defining X number of decimated points wherein X is an integer,
(e) performing a Fast Fourier Transform on said X number of decimated points for producing a line spectrum;
(f) storing said line spectrum into memory, and
(g) iteratively repeating steps (c) through (f) for a predetermined integer number of times until said defined resolution of lines of the final output line spectrum is obtained.

The DSP processing also greatly benefits from a novel, useful and unobvious synchronous sampling method.

For background, the outputs of the analog to digital converters provide asynchronous data that can be placed into packets of data having a predetermined number of asynchronous samples contained therein. The DSP stores trigger pulse times in a buffer and once the predetermined number of samples have been received it processes this buffer. Hence, the synchronous sampling method according to the present invention includes the steps of:
(a) determining a start time of a packet of data having a predetermined number of asynchronous samples contained therein;
(b) determining a first trigger time which is later than the determined start time of the packet;
(c) determining a subsequent trigger time which is consecutive to the first trigger time and which is earlier than the determined end time of the packet;
(d) calculating a synchronous sample period by dividing the time between the consecutive trigger pulses by a predetermined synchronous sample rate;
(e) determining a first asynchronous sample that is prior to and closest the first trigger pulse and determining a second asynchronous sample consecutive to the first determined asynchronous sample;
(f) interpolating between the first and the second asynchronous samples for generating a value of a first synchronous sample at the first trigger pulse time,
(g) determining a subsequent synchronous sample time by adding the synchronous sample period to the first trigger pulse time,
(h) determining two asynchronous samples, one sample just before and one sample just after the subsequent synchronous sample time;
(i) interpolating between the two asynchronous samples for generating and storing a value of a subsequent synchronous sample at the subsequent synchronous sample time,
(j) determining a next subsequent synchronous sample time by adding the synchronous sample period to the last subsequent synchronous sample time,
(k) skipping to step (o) if the next subsequent synchronous sample time is after the time of the next trigger pulse;
(l) determining two asynchronous samples, one sample just before and one sample just after the next subsequent synchronous sample time;
(m) interpolating between the two asynchronous samples for generating a value for a next subsequent synchronous sample at the next subsequent synchronous sample time;
(n) iteratively repeating steps (j) through (m);
(o) iteratively repeating steps (j) through (m) if the time of the next trigger pulse is before the end of the asynchronous buffer and replacing the step (k) next trigger pulse value with a next trigger pulse value consecutive to the next trigger pulse value in step (k);
(p) storing the generated synchronous samples as a synchronous sample waveform if the next trigger pulse value in step (k) is after the end of the asynchronous buffer.

Subsequent buffers of asynchronous samples are processed using the above method and by simply replacing the buffer start time with a next subsequent synchronous sample time that is after the last subsequent synchronous sample time used to generate the last synchronous sample of the last synchronous sample waveform generated from the last buffer.

User Input and Display Module

The user input and display module is comprised of a clear touch screen, a quarter VGA display, and an ergonomically designed keypad which provide simple operation by a user with either the left or right hand, even with gloves on. The VGA display is backlit to provide excellent display viewing over a broad range of lighting conditions.

Thus, the clear touch screen overlying the quarter VGA display, the ergonomically designed programmable keypad, and an intuitive user interface allow quick and easy setup for in-field data acquisition and display.

Communications Module

The communications module is comprised of an Ethernet communications link and a serial communications link. These communications links are used to download information such as plant asset routes and application programs to the portable data collector and analyzer apparatus from a host computer. Data transfer is effected by merely coupling a cable between either of the communications links and the host computer. Hence, the present invention is void of a mode switch or similar device as is found in the prior art. Thus, the present invention solves the problem of the user inadvertently forgetting to actuate the mode switch and then leaving the apparatus unattended only to come back to an apparatus that has not effected the asset route download and thus, is not ready for field data acquisition. This delay increases the time spent on collecting data rather then correcting problems. Hence, the present invention provides improvement in speed that directly correlates to cost savings and problem correction.

Once one or more routes are downloaded from the host computer the user simply selects a desired route. The assets of the user selected route are then displayed on the display in a hierarchical manner and also measurements points associated with each selected asset are also displayed on the display in a hierarchical manner for guiding the user through the data collection process. At any time a measurement point may be skipped or additional measurement points not in the route may be added thereto.

After selection of a measurement point, transducer(s) are attached to the asset, such as a machine, and the user initiates the measurement cycle by pressing the appropriate button on the keypad of touching an appropriate on the touchscreen. The portable data collector and analyzer apparatus acquires all the measurement data and this data is automatically saved to memory without requiring any key actuation by the user thereby eliminating this extra time consuming step and eliminating the problem of the user inadvertently forgetting to save the collected measurement data before moving on to the next measurement point. Hence, the present invention is void of the limitation which requires key actuation to cause data to be transferred into memory. After the present invention automatically saves the collected measurement data from the measurement point to memory the user is prompted to the next measurement point.

The Ethernet communications link and the serial communications link also allow easy connection of accessories or peripherals. Furthermore, the present invention includes general purpose ports such as a PCMCIA card slot and keyboard interface that also allow easy connection of accessories or peripherals. For example, the PCMCIA card slot can be used for suitable alignment hardware controlled by software loaded as above.

Power Supply/Charger Module

The power supply/charger module is comprised of a 5 volt power supply, a PCMCIA power supply, a 3.3 volt power supply and a negative 24 volt power supply for meeting the power supply requirements of the portable data collector and analyzer apparatus. Preferably, the power for these supplies is provided by a single re-chargeable Lithium-Ion battery pack fitted inside the housing of the portable data collector and analyzer apparatus. The power supply & charger module also includes a battery charger circuit that couples to a commercially available 15V ac-dc adapter for charging the battery without removing it from the housing.

OBJECTS OF THE INVENTION

Accordingly, a primary object of the present invention is to provide a new, novel, and useful portable data collector and analyzer apparatus and method for collecting and analyzing industrial plant asset data for protecting and managing industrial plant assets including machinery.

A further object of the present invention is to provide a single multi-purpose apparatus and method that permits the preventative and predictive maintenance of a variety of assets typically found within an industrial complex.

Another further object of the present invention is to provide a single multi-purpose portable data collector and analyzer apparatus and method that can collect and analyze a variety of different types of asset data in a variety of different ways.

Another further object of the present invention is to provide a portable data collector and analyzer apparatus and method as characterized above which includes an interface for constant current powered transducers such acceleration and velocity transducers, and which also includes an interface for general purpose signal inputs, including displacement, velocity, acceleration, temperature, pressure and other process variables transducers.

Another further object of the present invention is to provide a portable data collector and analyzer apparatus and method as characterized above which includes an interface for Auto-Point ID devices.

Another further object of the present invention is to provide a portable data collector and analyzer apparatus and method as characterized above which includes an interface for phase reference input from single output devices, such as displacement transducers, optical phase references transducers or magnetic pickup transducers, or from dual output devices, such as encoder transducers.

Another further object of the present invention is to provide a portable data collector and analyzer apparatus and method as characterized above which includes a shared memory device interfaced between and shared by both a digital signal processor and a microprocessor for allowing the microprocessor, which is coupled to DSP, to place the DSP in reset and then download DSP code into the shared memory and subsequently bring the DSP out of reset for effecting the DSP to load and run this code thereby precluding the need of an EPROM which heretofore was required to store this code.

Another further object of the present invention is to provide a portable data collector and analyzer apparatus and method as characterized above which can receive a download of DSP code from a host computer and then employ the above method of placing the DSP in reset, downloading the desired DSP code into the shared memory and subsequently bringing the DSP out of reset for effecting the DSP to load and run this code for adding new functionality to the present invention for collecting and analyzing data of a variety of different asset types with a variety of different measurements and transducers without requiring any type of hardware change of the present invention.

Another further object of the present invention is to provide a portable data collector and analyzer apparatus and method as characterized above which includes a novel, useful and unobvious frequency shifting and decimation method for spectrum calculation that, inter alia, retains the efficient addressing of the DSP and thus increasing the signal processing speed of the present invention.

Another further object of the present invention is to provide a portable data collector and analyzer apparatus and method as characterized above which includes a novel, useful and unobvious synchronous sampling method that generates synchronous sample waveforms from asynchronous sample waveforms.

Another further object of the present invention is to provide a portable data collector and analyzer apparatus and method as characterized above which includes a clear touch screen overlying a quarter VGA display, an ergonomically designed keypad, and an intuitive user interface for allowing quick and easy setup for in-field data acquisition, analysis and display.

Another further object of the present invention is to provide a portable data collector and analyzer apparatus and method as characterized above which includes inspection point and manually keyed in notes and observations.

Another further object of the present invention is to provide a portable data collector and analyzer apparatus and method as characterized above which includes communications links for downloading information such as plant asset routes and application programs to the portable data collector and analyzer apparatus from a host computer which is effected by merely coupling a cable between either of the communications links and the host computer.

Another further object of the present invention is to provide a portable data collector and analyzer apparatus and method as characterized above which includes general purpose ports such as a PCMCIA card slot and keyboard interface that allow easy connection of accessories or peripherals Yet another further object of the present invention is to provide a portable data collector and analyzer apparatus and method as characterized above which includes a variety of power supplies that are powered by a single re-chargeable battery pack fitted inside the housing of the portable data collector and analyzer apparatus.

Still yet another further object of the present invention is to provide a portable data collector and analyzer apparatus and method as characterized above which includes an on board battery charger circuit that couples to a commercially available 15V ac-dc adapter for charging the battery without removing it from the housing.

These and other objects and advantages will be made manifest when considering the following detailed specification when taken in conjunction with the appended drawing figures.

BRIEF DESCRIPTION OF THE DRAWINGS

FIGS. 25 and 26 are schematic views of PCMCIA circuitry according to the present invention.

FIG. 74 is a view of an application manager/data collection display according to the present invention.

FIG. 75 is a table of some of the touchscreen and keypad keys used during the data collection process according to the present invention FIG. 76 is a view of an application manager/analysis display according to the present invention.

FIG. 77 is a table of some of the touchscreen and keypad keys used during the process of configuring the apparatus according to the present invention.

DESCRIPTION OF PREFERRED EMBODIMENTS

Figure 1:
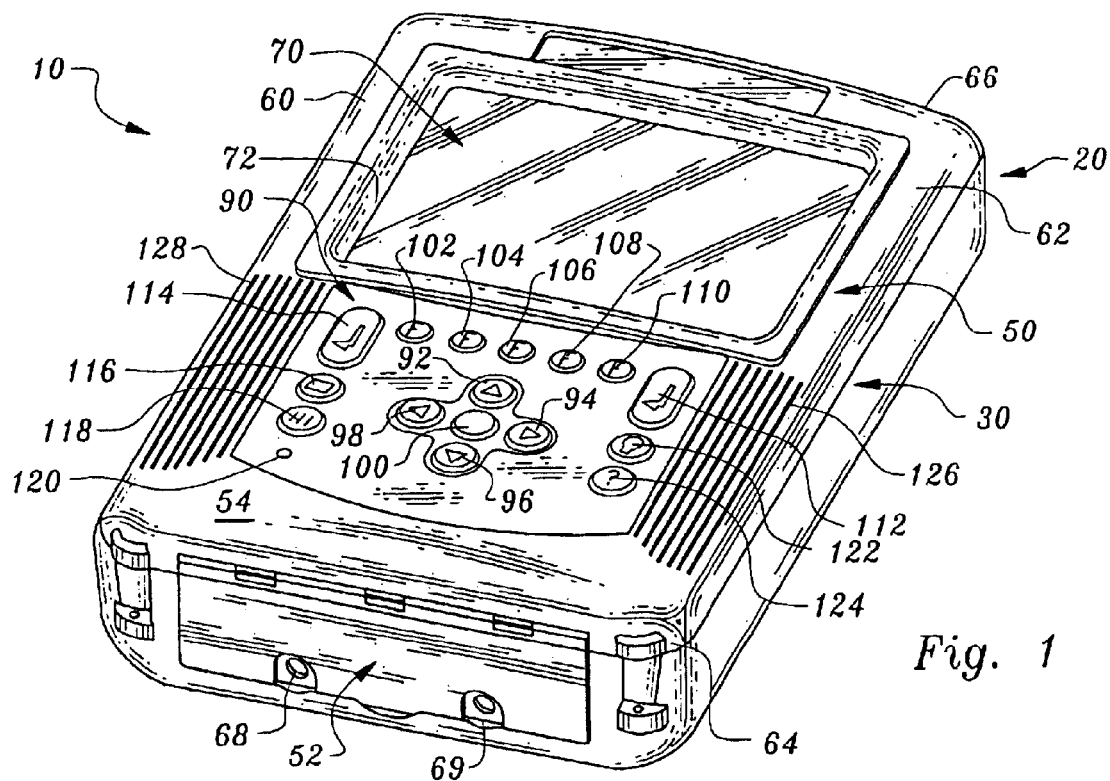
FIG. 1 is an isometric view of a portable data collector and analyzer apparatus according to the present invention.

Considering the drawings, like reference numerals denote like parts throughout the various drawing figures with the exception of resistors, capacitors, transistors and connectors wherein like reference numerals denote like parts for each respective drawing figure.

Reference numeral 10 is directed to the portable data collector and analyzer apparatus according to the present invention.

Figure 2:
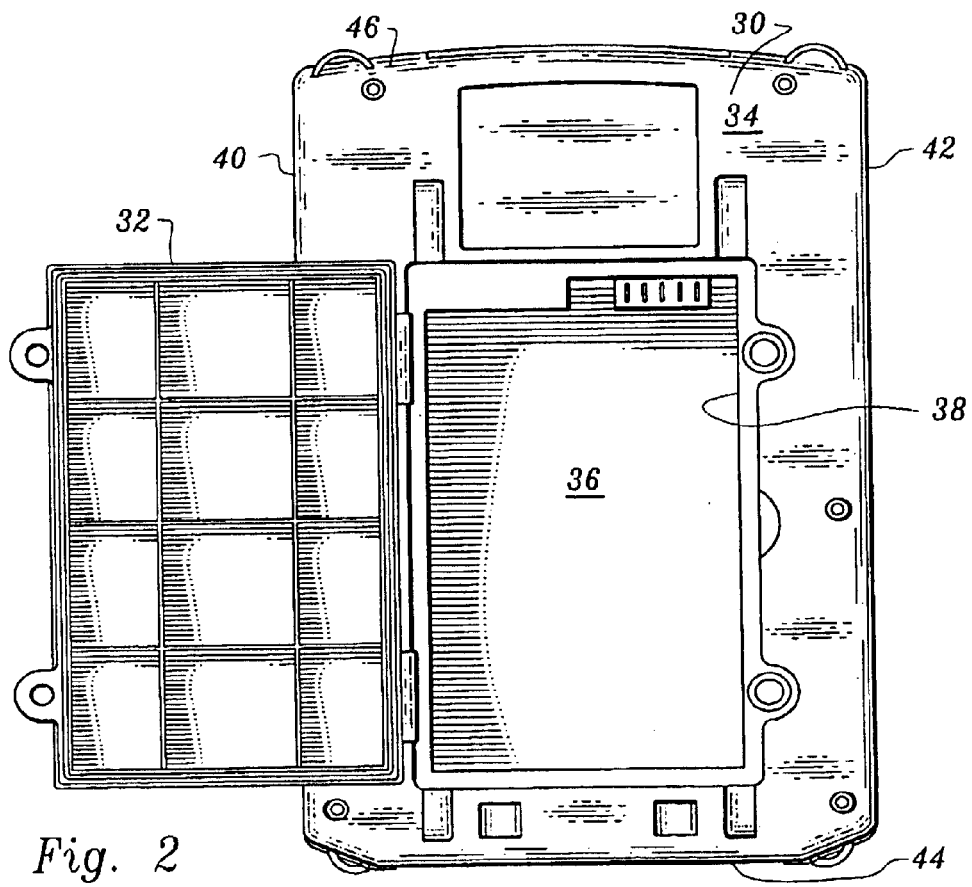
FIG. 2 is a back plane view of the portable data collector and analyzer apparatus according to the present invention and showing a battery cover in an open position.

Referring to the FIGS. 1 and 2, the portable data collector and analyzer apparatus 10 includes an enclosure 20 which is comprised of a lower housing or base 30, a battery cover 32 (FIG. 2), an upper housing or lid 50, and a flap 52. These components are preferably all injection molded using a commercially available polycarbonate/ABS thermoplastic material.

Figure 3:
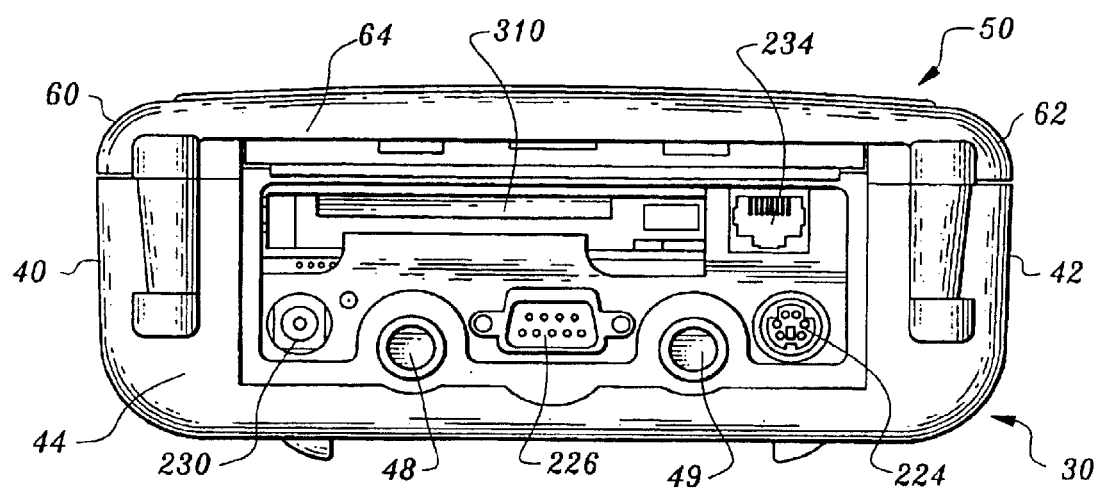
FIG. 3 is a bottom plane view of the portable data collector and analyzer apparatus showing, inter alia, transducer inputs according to the present invention.
Figure 4:
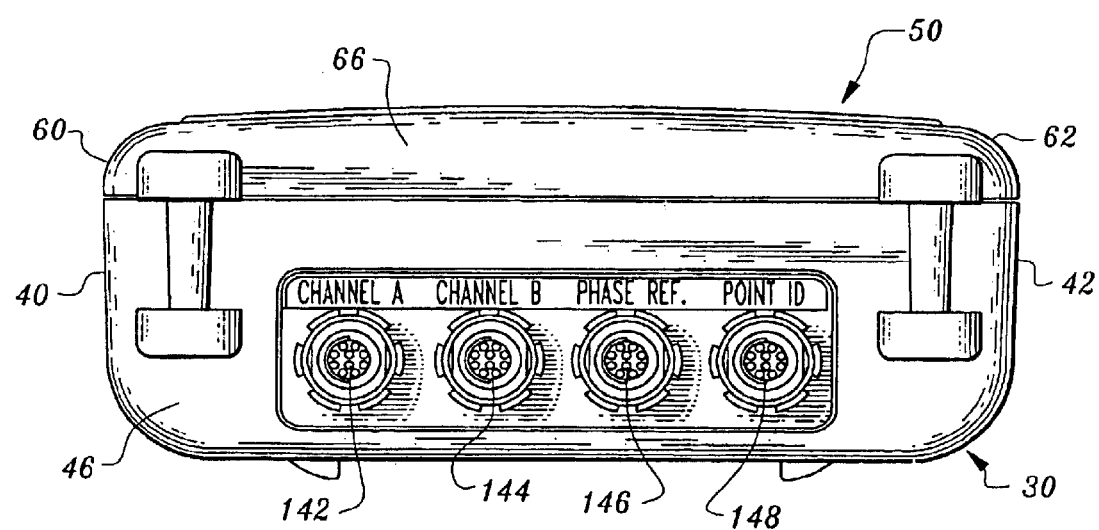
FIG. 4 is a top plane view of the portable data collection and analysis apparatus showing a PCMCIA port, an Ethernet port, a DC power input, a serial port and a keyboard port according to the present invention.

More specifically, and referring to FIGS. 2 through 4, The lower housing 30 includes a substantially planar bottom surface 34 having an outer periphery with upwardly extending sidewalls integrally formed with the periphery, thereby defining an opened top housing. The upwardly extending sidewalls include a pair of spaced apart substantially parallel sidewalls 40, 42, a lower sidewall 44 having an opening as shown in FIG. 3 and an upper sidewall 46 also having an opening as shown in FIG. 4. The lower housing 30 further includes an opening within its bottom surface 34 for receiving a battery 36 within a well 38 of the lower housing 30. The battery cover 32 closes the bottom surface opening and secures the battery 36 in place.

Referring back to FIG. 1 and to FIGS. 3 and 4, the upper housing 50 includes a top surface 54 having an outer radiused periphery with downwardly extending sidewalls that complementally engage the sidewalls of the lower housing 30. Specifically, the downwardly extending sidewalls include a pair of spaced apart substantially parallel sidewalls 60, 62, an upper sidewall 66, and a lower sidewall 64 having an opening as shown in FIG. 3. The flap 52 is hinged to the lower sidewall 64 of the upper housing 50 via an integral hinge and is secured in a closed position with fasteners 68, 69 extending through the flap and into receiving means 48, 49 (FIG. 3) disposed in the lower housing thereby closing the lower sidewall opening of the lower housing. The fasteners may be in the form of screws and the receiving means may be in the form of threaded bores formed within the lower housing 30.

Additionally, the top surface 54 of the upper housing 50 includes a display window or opening 72 that allows a user to have both visual and tactile access to a both liquid crystal display (LCD) and touch screen device 70. In one preferred form, the liquid crystal display and touch screen device 70 is a single module such as that which is manufactured by Densitron under part number TS4033BG-WF.

A sealed keypad 90 having tactile feedback is disposed on the top surface 54 of the upper housing 50 at a location below the display opening 72 and is designed to be used with either hand. The keypad 90 includes four directional keys 92, 94, 96, 98 disposed in a cruciform configuration and a home key 100 disposed in the middle of the directional keys. Five function keys 102, 104, 106, 108, and 110 are disposed in a latitudinal array located above the directional keys. One oversized enter key 112 flanks the five functional keys on the right hand side and another oversized enter key 114 flanks the five functional keys on the left hand side. A menu key 116, an on/off key 118 and a light indicator 120 are columned below the left oversized enter key 114 and are substantially aligned therewith, one after the other. Similarly, a backlight key 122 and a help key 124 are columned below the right oversized enter key 112 and are substantially aligned therewith, one after the other. Longitudinal griping ribs 126, 128 flank each side of the keypad 90.

The four directional keys 92, 94, 96, and 98 are used to navigate around the screens displayed on the liquid crystal display and touch screen device 70. The home key 100 returns to an application manager screen from any level of the software hierarchy. The function of the five function keys 102, 104, 106, 108, 110 change depending on the application in use and the screen displayed. Hence, the five context-sensitive function keys provide quick access to numerous timesaving functions that change automatically as the application changes. Because of their varied functionality they are also known as soft keys. The oversized enter keys 112, 114 are similar in function to the enter keys found on a typical computer keyboard and primarily serve to confirm an action or enter inputted data. The menu key 116 is used to display a list of available options for the currently displayed screen. The on/off key 118 turns the portable data collector and analyzer apparatus 10 on and off or places it in a standby mode. The light indicator 120 indicates the present mode of the portable data collector and analyzer apparatus 10. The backlight key 122 turns a LCD backlight on or off. The help key 124 displays the context sensitive help for a currently displayed screen.

Figure 5:
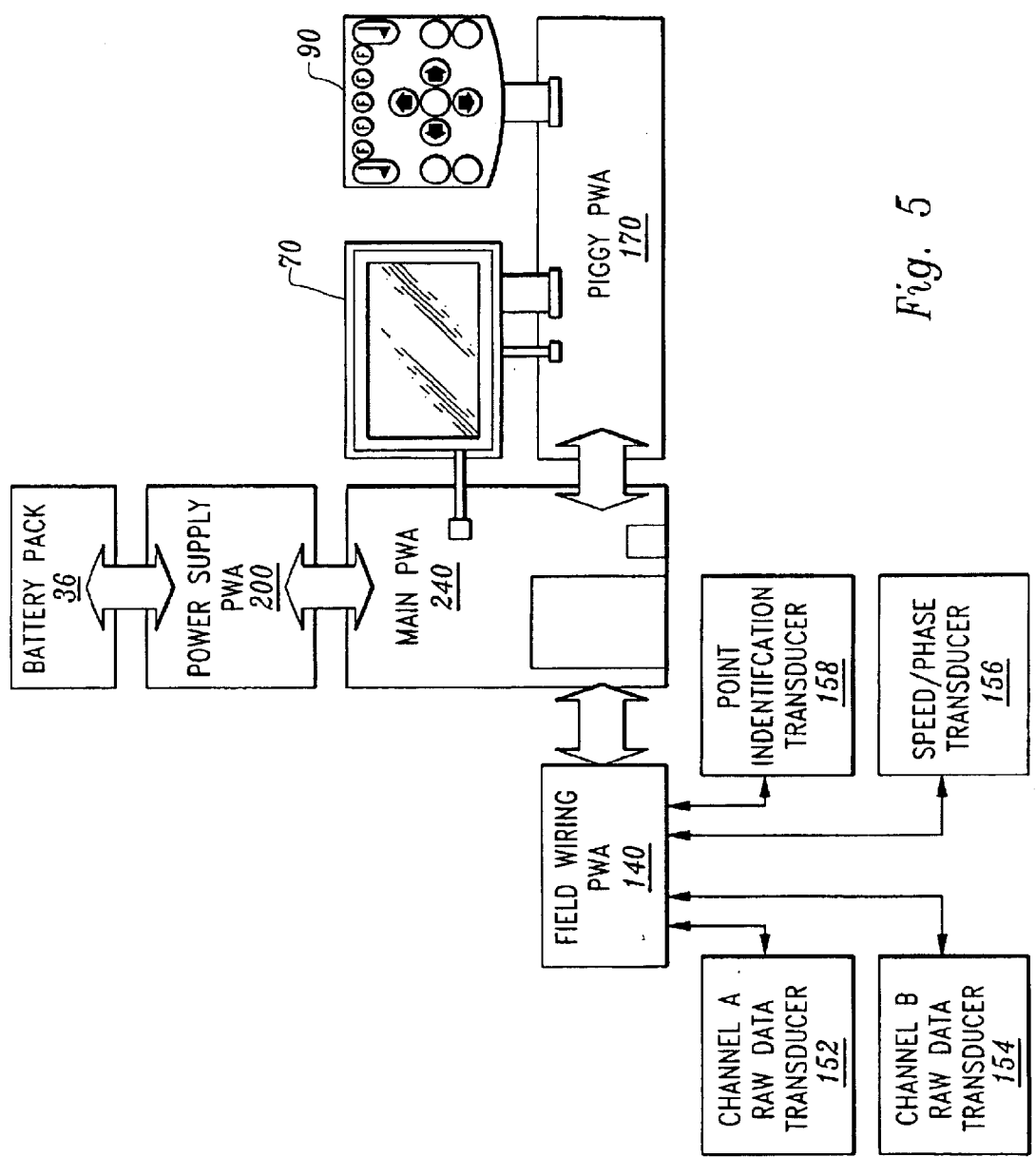
FIG. 5 is a block diagram of printed wire assembly boards, a display/touchscreen, a keypad and transducers according to the present invention.

Referring to FIG. 5, the portable data collector and analyzer apparatus 10 includes a Field Wiring printed wiring assembly (PWA) 140, a Piggy printed wiring assembly (PWA) 170, a Power Supply & Charger printed wiring assembly (PWA) 200, and a Main printed wiring assembly (PWA) 240. The Main PWA 240, the Power Supply & Charger PWA 200, and the Field Wiring PWA 140 are mounted in the lower housing 30 while the Piggy PWA 170, along with both keypad 90. and display/touch screen device 70 are mounted in the upper housing 50.

Field Wiring PWA

Figure 6:
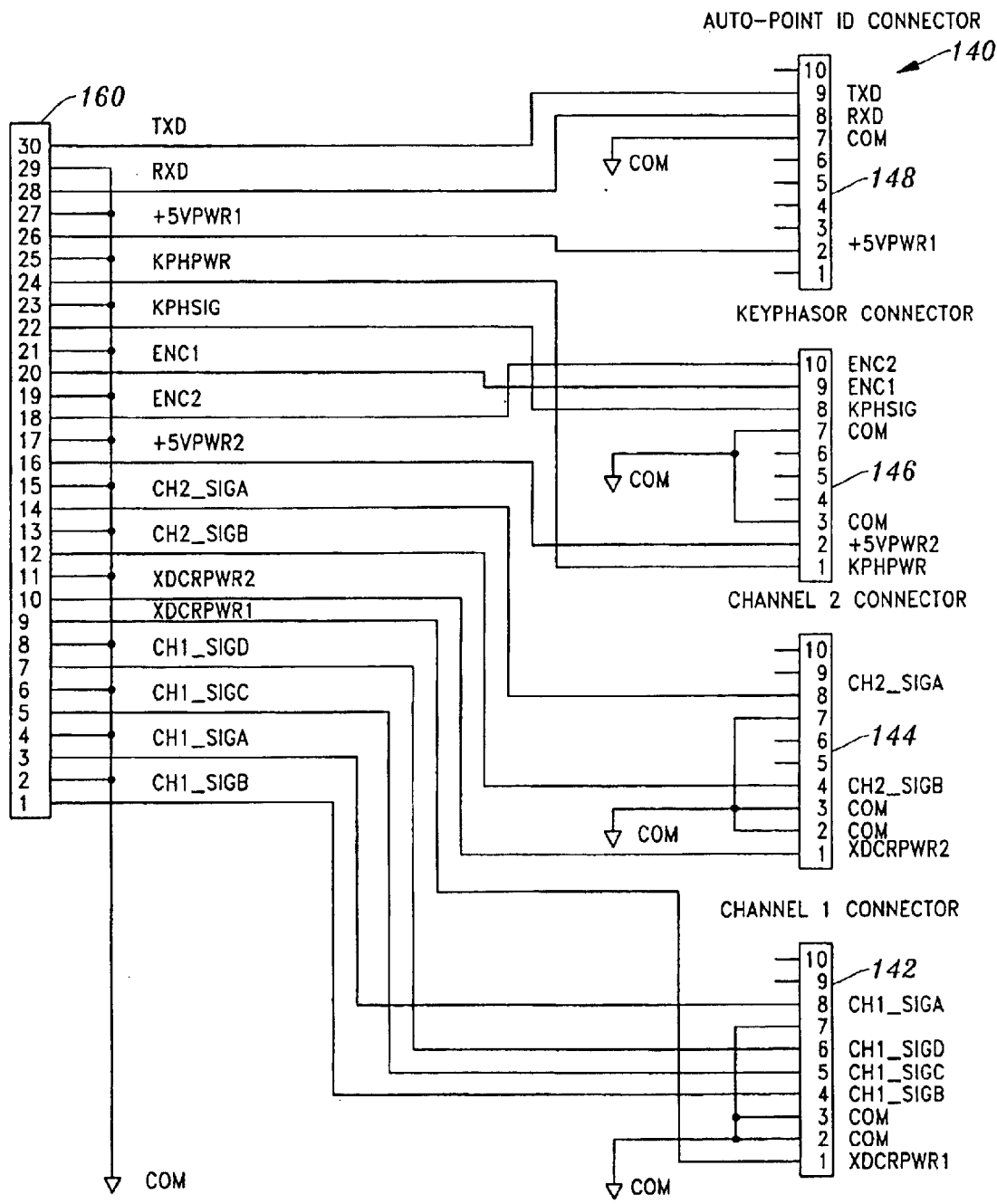
FIG. 6 is a detailed schematic diagram of a field wiring board shown in FIG. 5 and according to the present invention.

FIG. 6 is a schematic showing the details of the Field Wiring PWA 140. The Field Wiring PWA 140 transfers input and output signals between transducers and the Main PWA 240. Preferably, the field wiring PWA includes a first channel connector 142 (a channel A or channel 1 connector), a second channel connector 144 (a channel B or channel 2 connector), a phase reference input connector 146, and a point identification (ID) connector 148 (please also see FIG. 4). Connectors 142, 144, 146 and 148 couple to connector J1 or 160 which, in turn, couples to a connector on the Main PWA 240 as delineated hereinbelow.

More specifically, and referring to FIGS. 5 and 6, the channel A/channel 1 connector and the channel B/channel 2 connector couple to transducers 152 and 154 respectively for extracting raw asset data, the reference input connector 146 couples to a speed/phase transducer 156 and the point ID connector 148 couples to a point ID transducer 158. Examples of these Transducers (152, 154, 156 and 158) will be delineated in detail infra.

Piggy PWA

Figure 7:
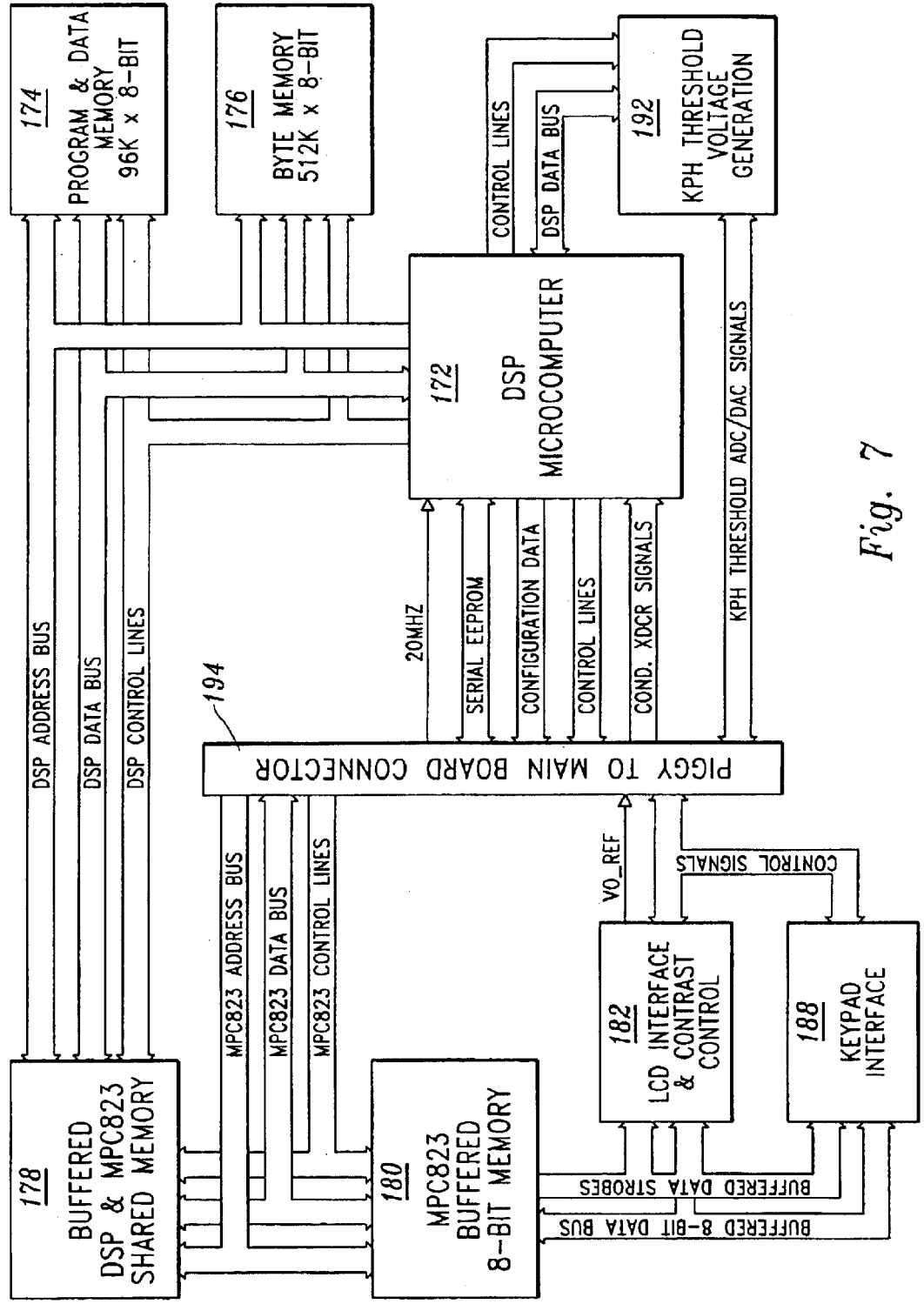
FIG. 7 is a functional block diagram of a piggy printed wiring assembly board shown in FIG. 5 and according to the present invention.

FIG. 7 shows a functional block diagram of the Piggy PWA 170 which includes a Digital Signal Processor (DSP) 172, a DSP memory including program and data memory 174 and byte memory 176, a shared memory 178, microcontroller memory 180, LCD interface and contrast control circuitry 182, keypad interface circuitry 188, phase threshold voltage generation circuitry 192 and a piggy to main board connector 194. Each block of FIG. 7 will be delineated in detail infra.

Power Supply & Charger PWA

Figure 8:
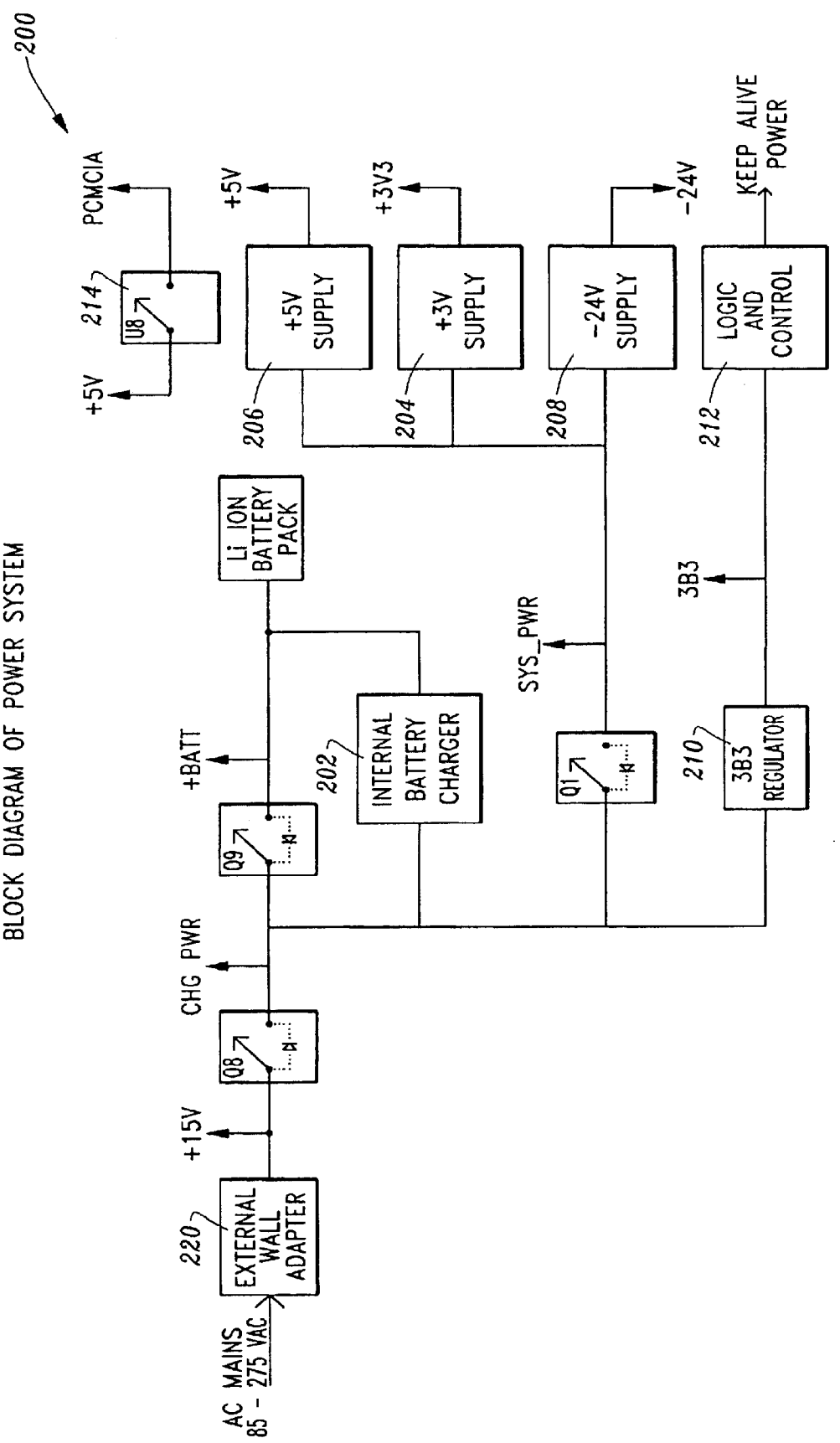
FIG. 8 is a functional block diagram of a power supply printed wiring assembly board shown in FIG. 5 and according to the present invention.

FIG. 8 shows a functional block diagram of the Power Supply & Charger PWA 200 which includes a battery charger circuit 202, a positive three point three volt (3.3V) supply 204, a positive five volt (5V) supply 206, a negative twenty four volt (−24V) supply 208, a regulator 210, a keep alive logic and control circuit 212, and a PCMCIA power source 214. Each functional block of FIG. 8 will be delineated in detail infra.

Main PWA

Figure 9:
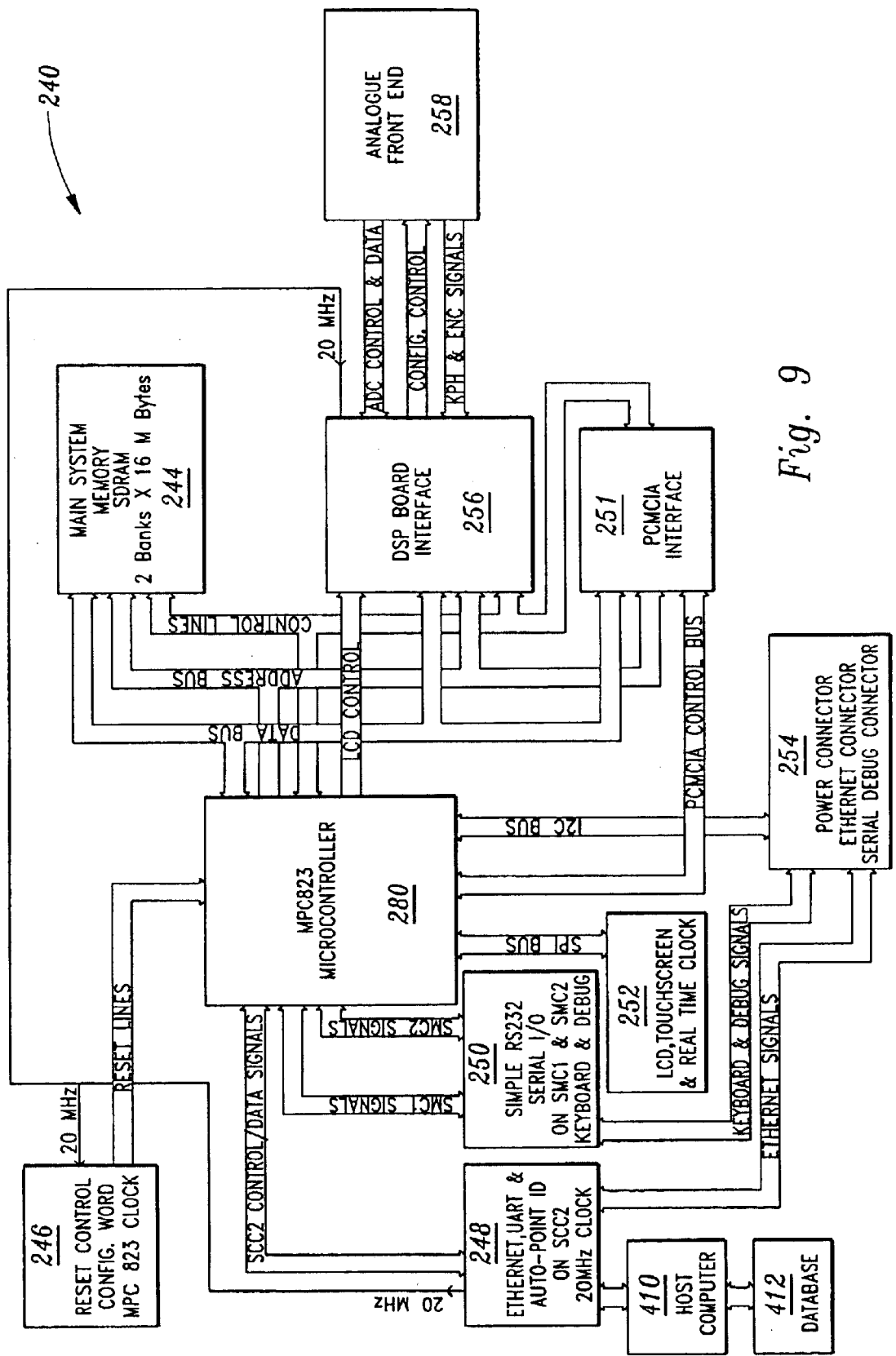
FIG. 9 is a functional block diagram of the main printed wiring assembly board shown in FIG. 5 and according to the present invention.

FIG. 9 shows a functional block diagram of the Main PWA 240 which is comprised of the following blocks: a Microcontroller 242; memory (SDRAM) circuitry 244; Reset Control Configuration and Microcontroller clock generator circuitry 246; Ethernet, UART, auto-point ID, and 20 MHz clock circuitry 248; serial input/output circuitry 250 (including serial input/output lines for keyboard and debug signals), LCD, Touch screen and real time clock circuitry 252; power, Ethernet and Serial debug connector circuitry 254, PCMCIA interface circuitry 251; DSP Board interface circuitry 256; and analogue front end circuitry 258.

Figure 10:
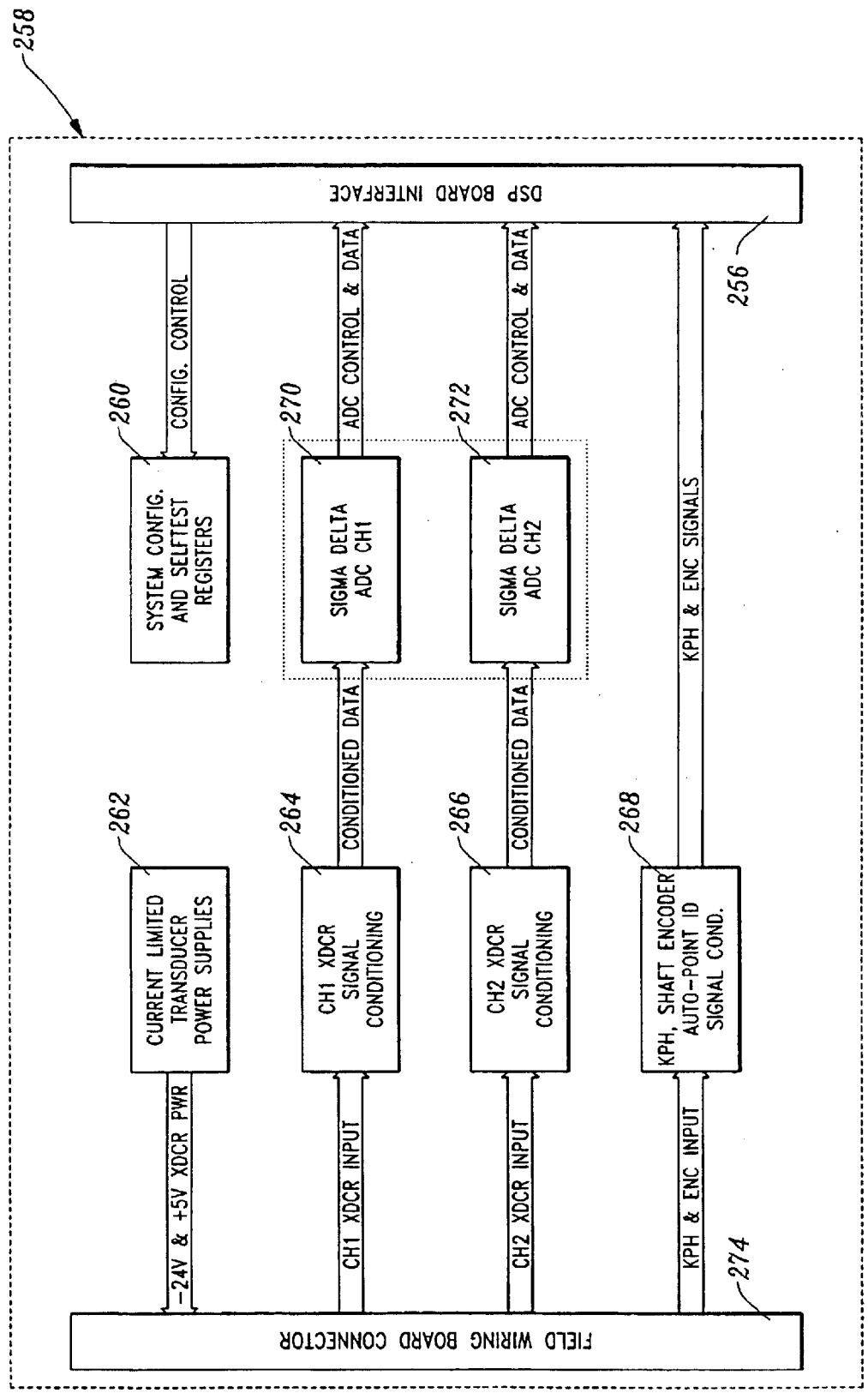
FIG. 10 is a functional block diagram of an analogue front-end block shown in FIG. 9 and according to the present invention.

FIG. 10 shows a functional block diagram that further details the analogue front end circuitry 258. As shown, the analogue front end circuitry 258 is comprised of the following: system configuration and self test registers circuitry 260, current limited transducer power supply circuitry 262, first channel analog signal conditioning circuitry 264, second channel analog signal conditioning circuitry 266, phase reference signal conditioning, shaft encoder, and auto-point ID signal conditioning circuitry 268; a first channel anti-alias filtering and sigma-delta analog to digital converter circuitry 270; a second channel anti-alias filtering and sigma-delta analog to digital converter circuitry 272; field wiring board connector 274 and the DSP board connector 276 also shown in FIG. 9.

The Main PWA 240 is interfaced to all the other PWA's (i.e., the Piggy PWA 170, the Field Wiring PWA 140, and the Power and Supply & Charger PWA 200).

Figure 11:
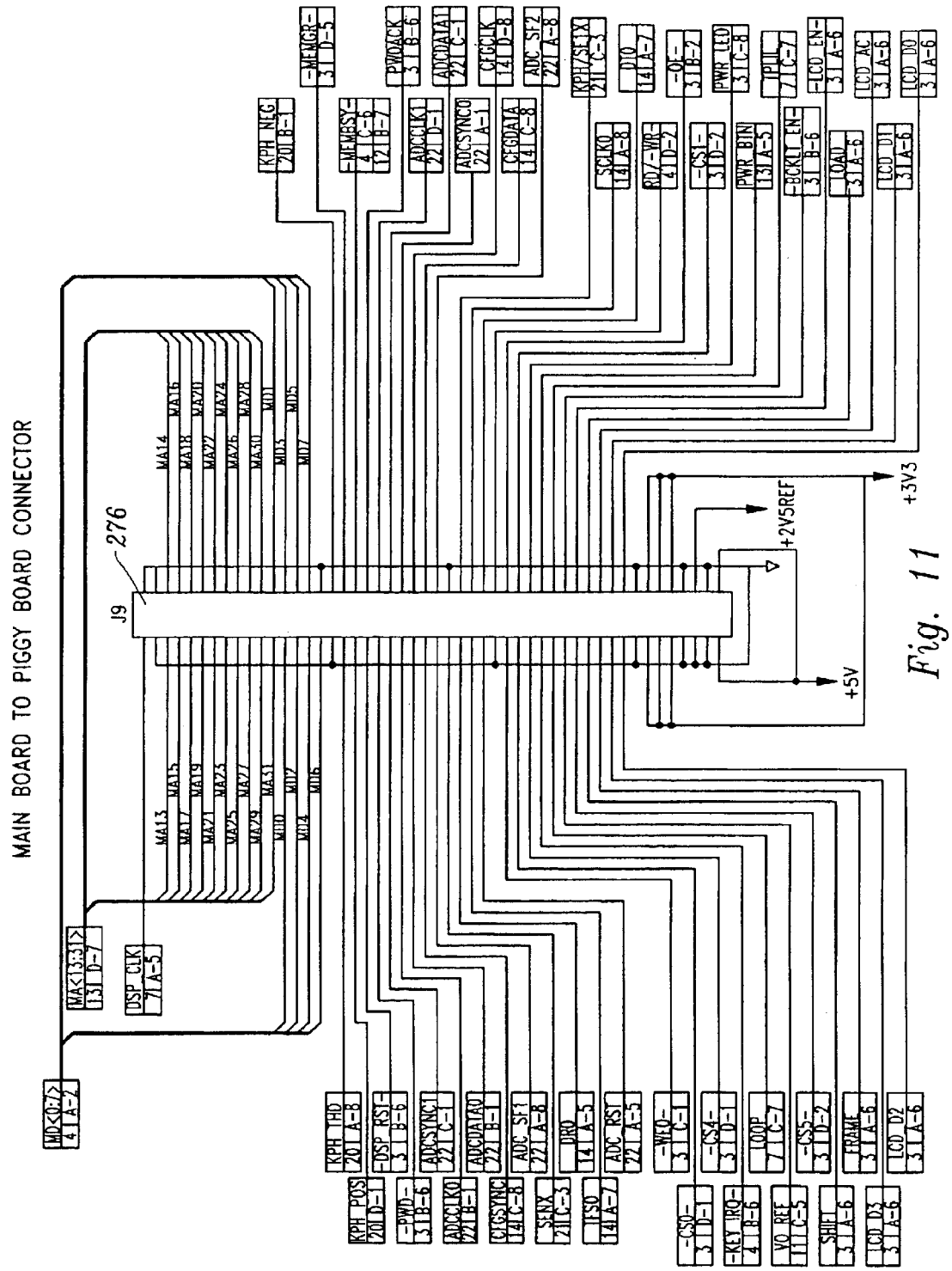
FIG. 11 is a schematic view of a main board to piggy board connector according to the present invention.
Figure 12:
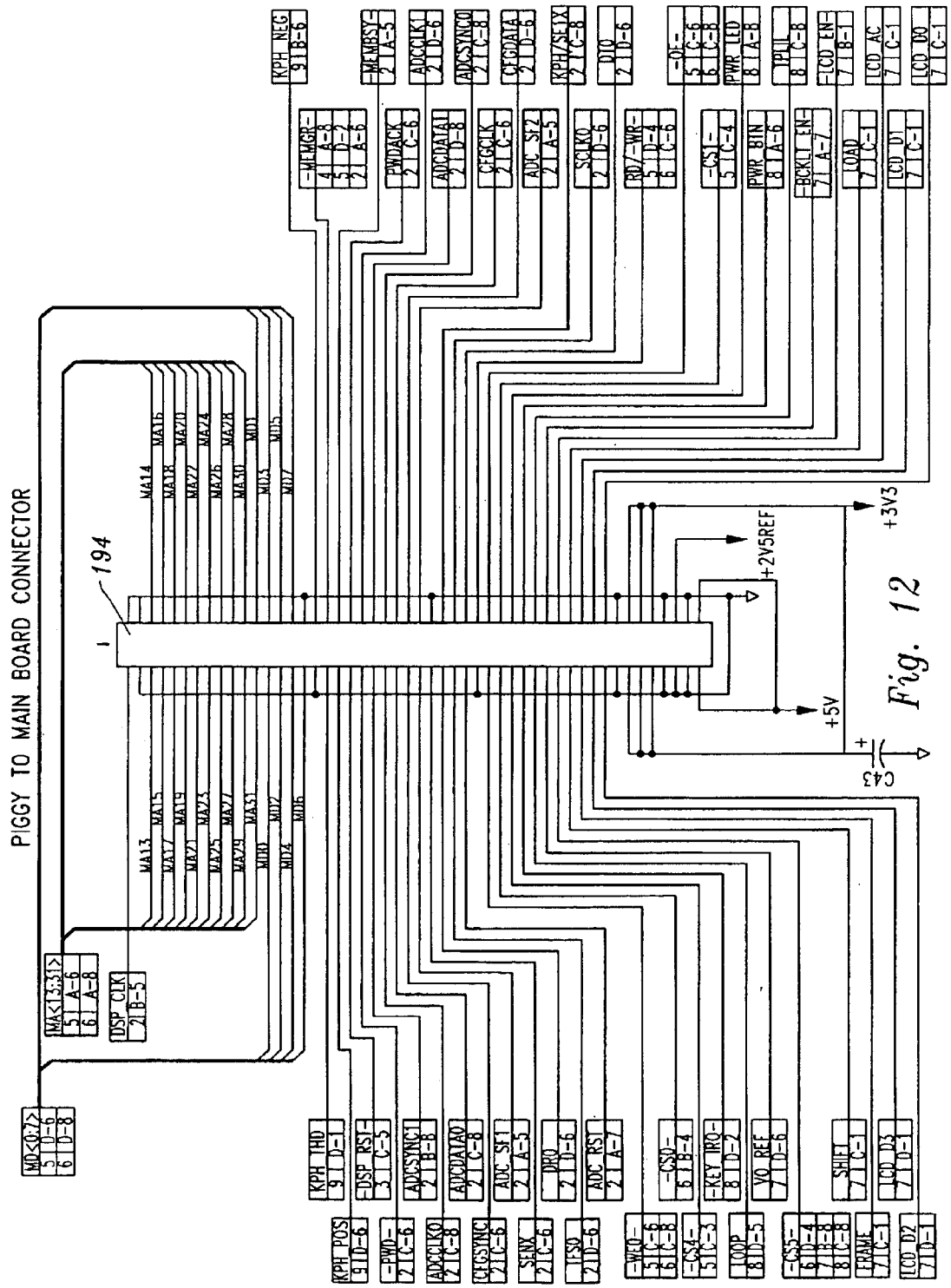
FIG. 12 is a schematic view of a piggy board to main board connector according to the present invention.

Specifically, the Main PWA 240 is interfaced with the Piggy PWA 170 by way of the DSP board interface 256 that includes a main board to piggy board connector 276 (schematically shown in FIG. 11) that is coupled to the piggy board to main board connector 194 (schematically shown in FIG. 12). The interface between the Main PWA 240 and the Piggy PWA 170 is used for providing power to the Piggy PWA, providing display control signals to the Piggy PWA, providing keypad control signals to the Piggy PWA, and providing access to memory shared between the microcontroller 280 and the Digital Signal Processor (DSP) 172.

Figure 13:
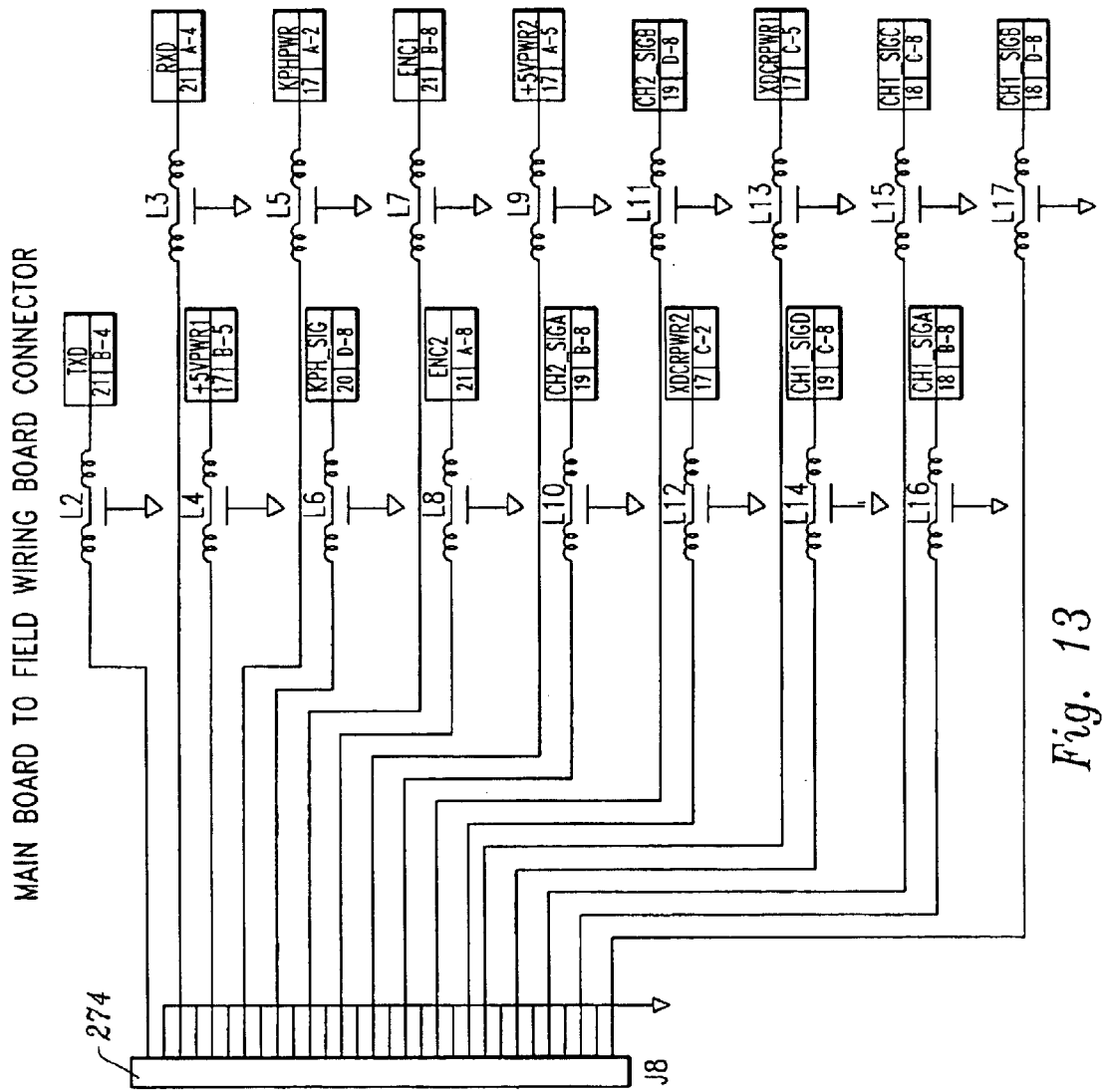
FIG. 13 is a schematic view of a main board to field wiring board connector according to the present invention.

The Main PWA 240 is also interfaced with the Field Wiring PWA 140 by way of a main board to field wiring board connector 274 (schematically shown in FIG. 13) that is coupled to the field wiring board connector 160 (schematically shown in FIG. 6). The interface between the two provides a means of transferring input and output signals from cables that interface to the transducers (152, 154, 156 and 158) to the Main PWA 240.

Figure 14B:
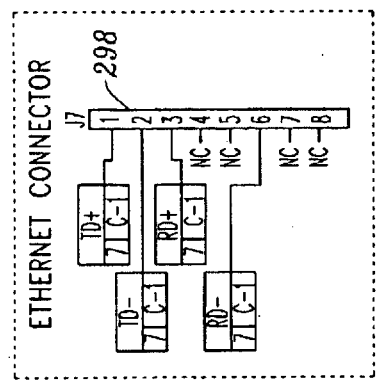
FIG. 14B is a schematic view of an Ethernet connector according to the present invention.
Figure 14C:
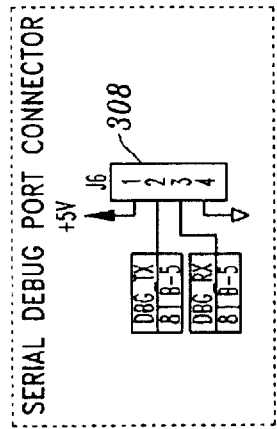
FIG. 14C is a schematic view of a serial debug port connector according to the present invention.
Figure 14A:
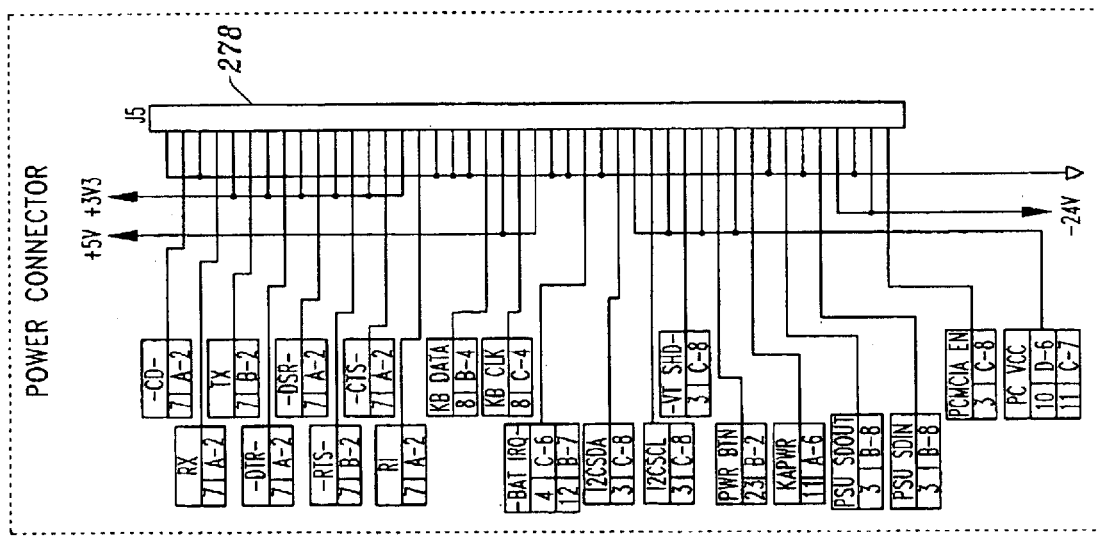
FIG. 14A is a schematic view of a main board to power supply & charger board connector according to the present invention.
Figure 15:
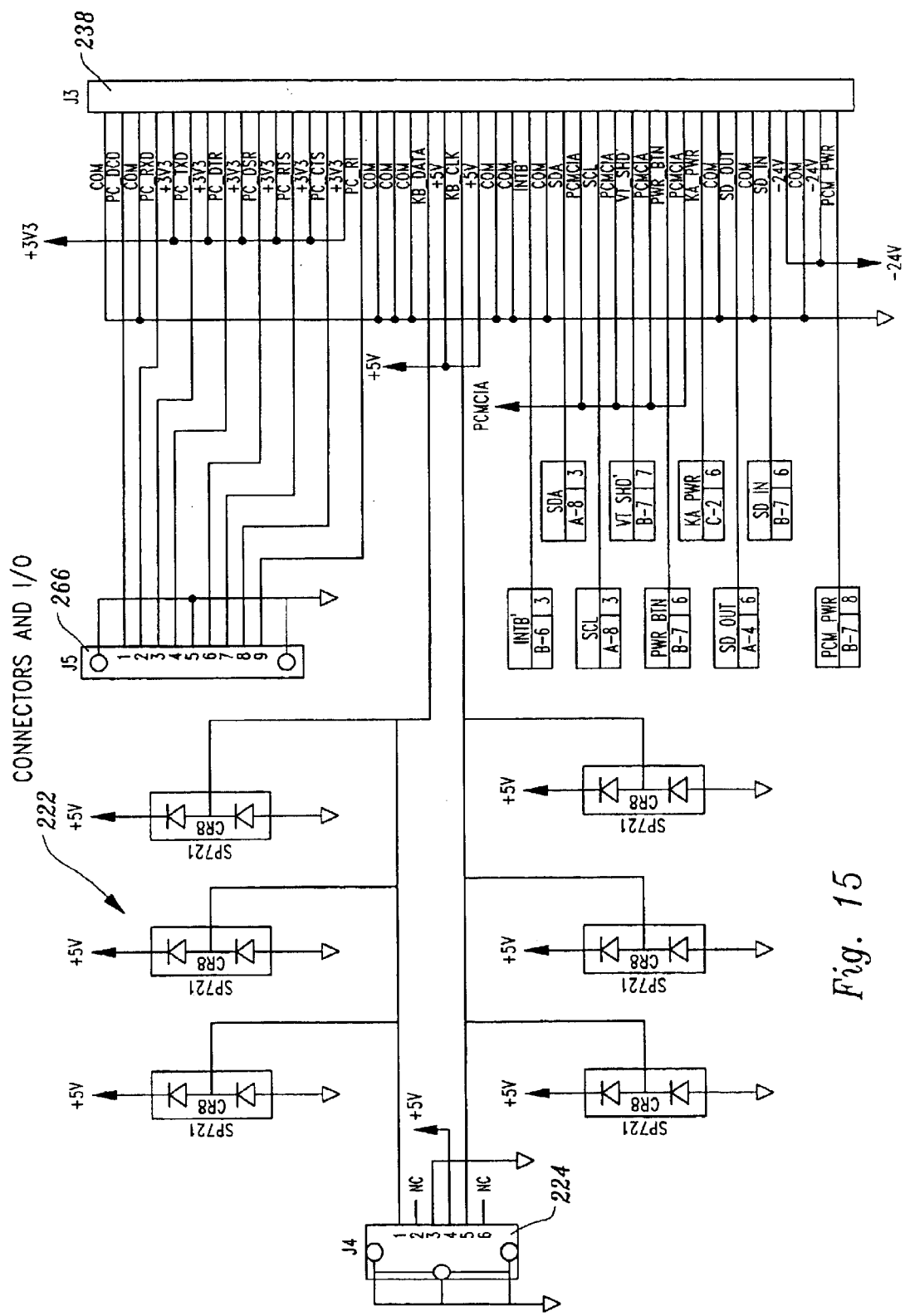
FIG. 15 is a schematic view of a power supply & charger board to main board connector according to the present invention.

Furthermore, the Main PWA 240 is interfaced with the Power Supply & Charger PWA 200 by way of a main board to power supply & charger board connector 278 (schematically shown in FIG. 14) that is coupled to a power supply & charger board to main board connector 238 (schematically shown in FIG. 15). The interface between the Main PWA 240 and the Power Supply & Charger PWA 200 is used for providing power to the Main and Piggy PWAs, allowing the microcontroller to control a plurality power supplies, allowing the microcontroller to control a battery charger, routing serial communications signals to a connector or interface 226 on the Power Supply & Charger PWA, and routing keyboard signals to a connector or interface 224 on the Power Supply & Charger PWA.

Microcontroller

Referring back to FIG. 9, the microcontroller 280 is preferable a versatile one-chip integrated microprocessor and peripheral combination that has been specifically designed for use in systems in which advanced Graphical User Interfaces (GUIs), communications, and high-level real-time operating systems are used. The portable data collector and analyzer apparatus 10 is just such a system and one example of just such a microcontroller is that which is manufactured by Motorola and sold under part number MPC823. Hence, the following detailed description of the microcontroller 280 will on the attributes of the MPC823 for the purpose of satisfying the best mode requirement. However, it should noted that a variety of microcontrollers share the attributes of the MPC823 and thus, can be substituted for the MPC823 without departing from the scope and fair meaning of the present invention.

Figure 16:
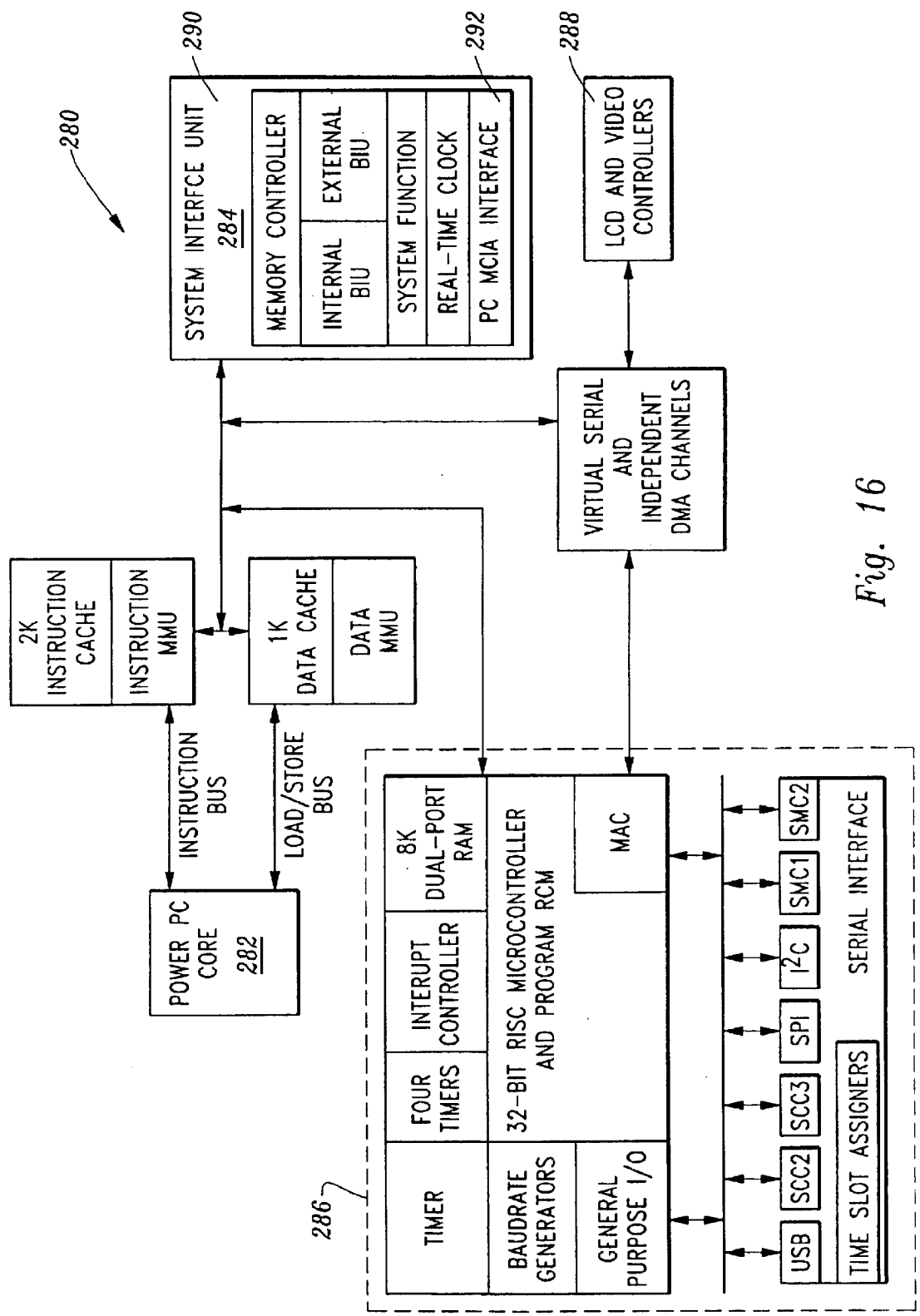
FIG. 16 is a functional block diagram of one embodiment of a microcontroller according to the present invention.
Figure 17A:
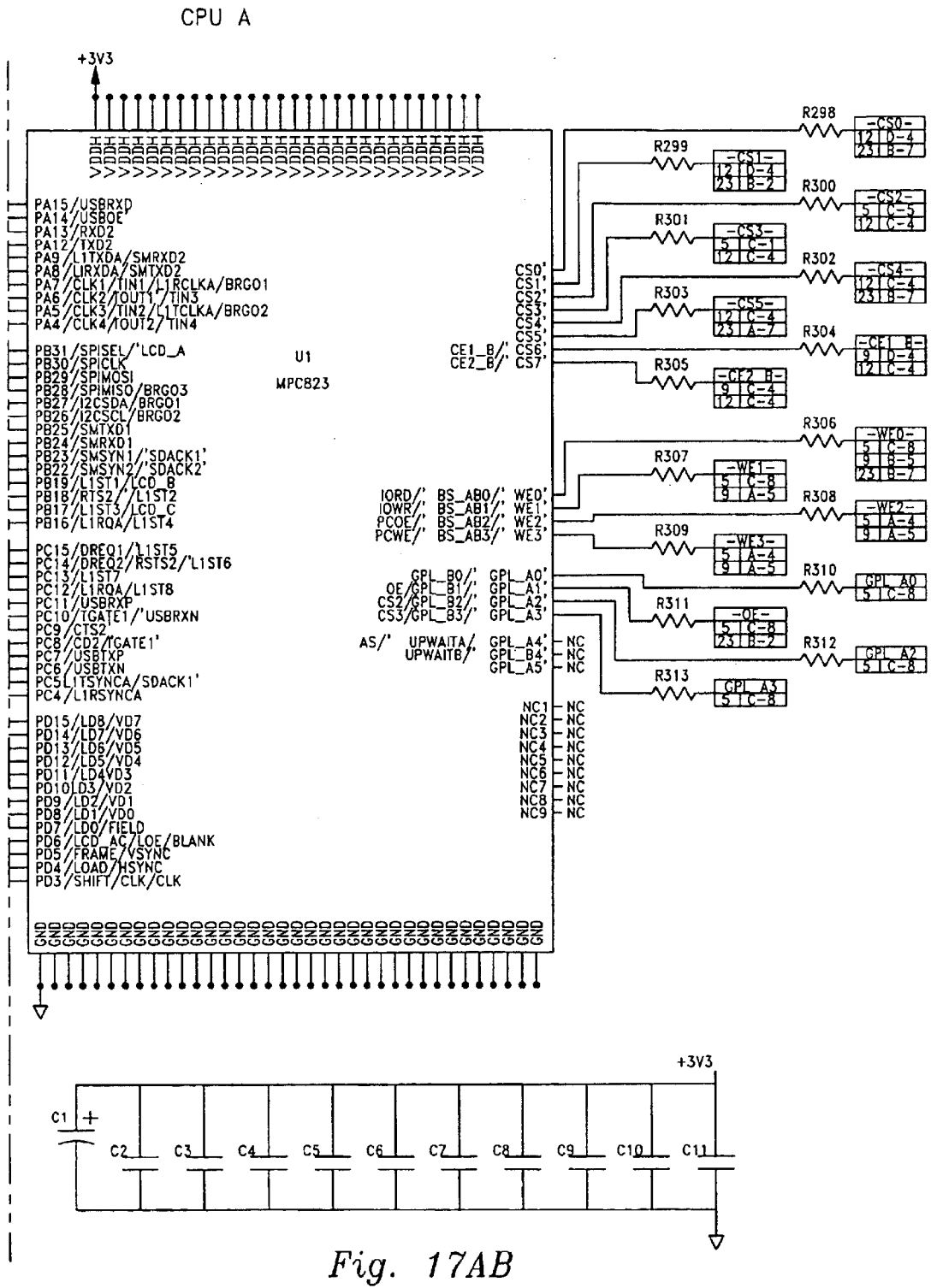
FIGS. 17A and 18A are schematic views which cover one embodiment of a microcontroller according to the present invention.
Figure 18A:
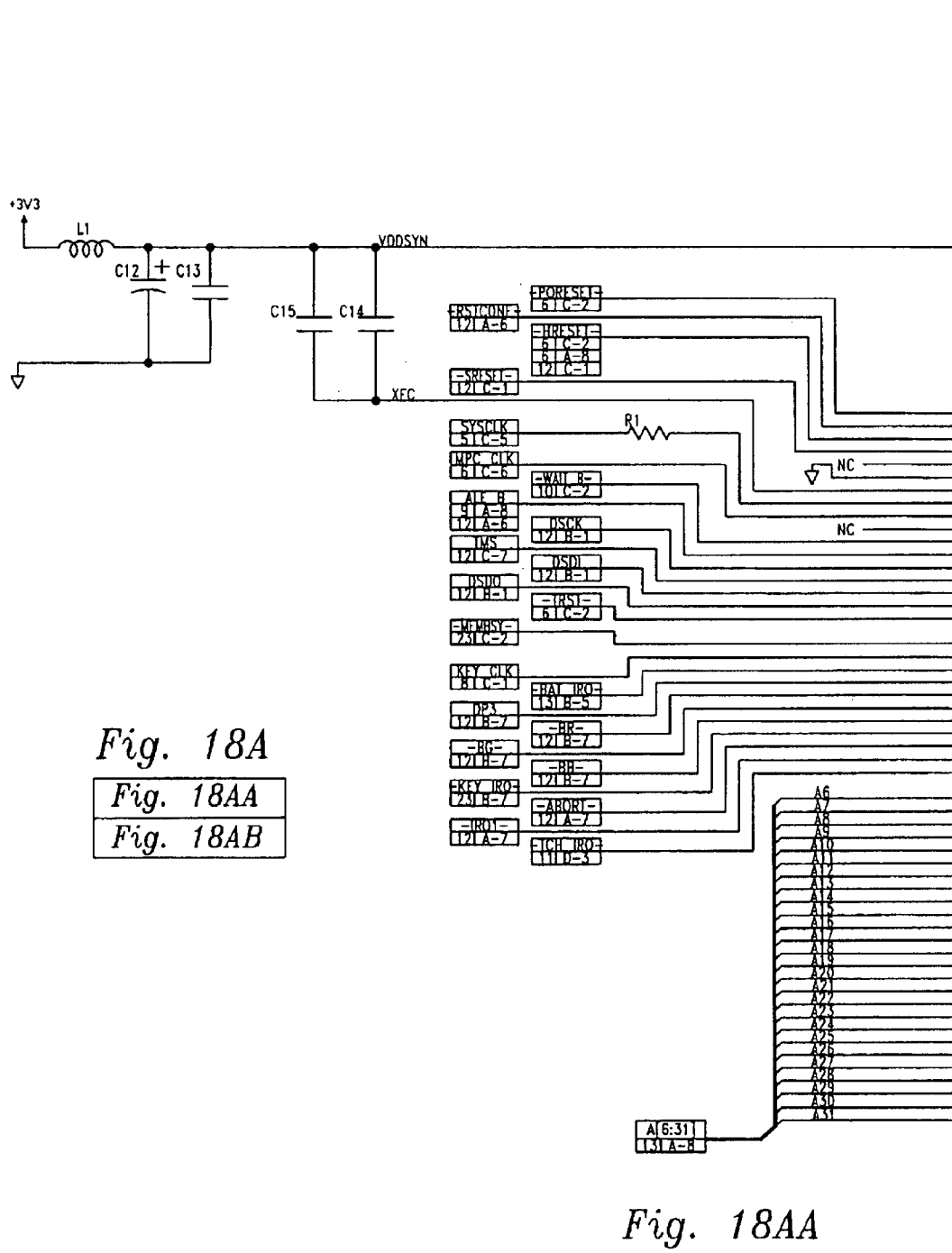
Figure 18A:
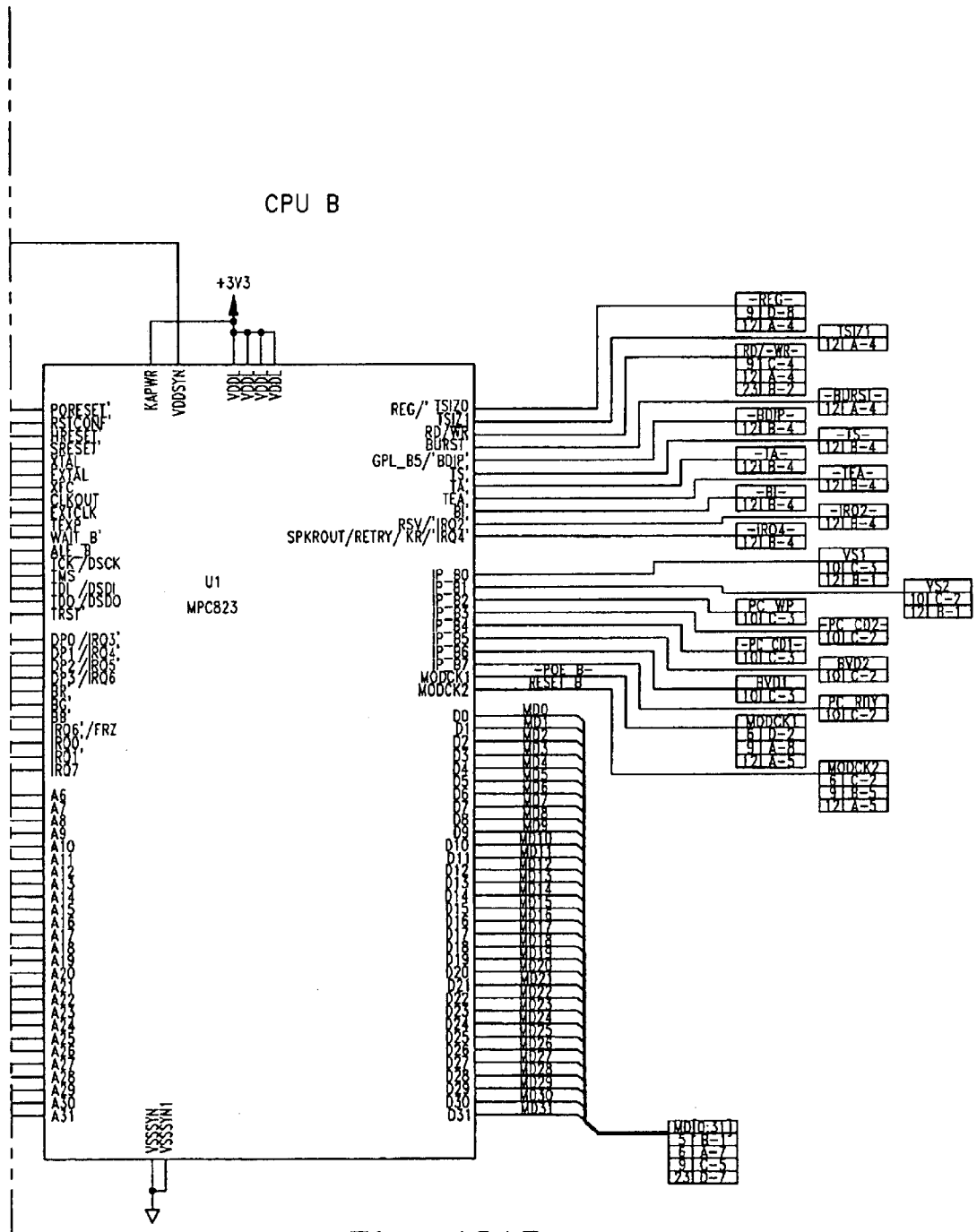

FIG. 16 shows a functional block diagram and of the MPC823 form of microcontroller 280 while FIGS. 17A and 18A schematically show the MPC823 form of microcontroller 280. Referring to FIG. 16, the microcontroller 280 is comprised of the following major functional blocks: an embedded PowerPC core 282, a system interface unit (SIU) 284, a communications processor module (CPM) 286, and a LCD controller 288.

The SIU 284 controls system startup, initialization and operation, protection, as well as the external system bus. A memory controller 290 within the SIU provides a glueless interface to many types of memory devices and peripherals and it supports up to eight memory banks, each with their own device and timing attributes. A PCMCIA interface 292 within the SIU provides a master controller that is compliant with Version 2.1. The interface supports one independent PCMCIA socket.

The CPM 286 contains two serial communications channels (SCC2, SCC3), two serial management channels (SMC1, SMC2), one dedicated universal serial bus (USB) channel, one inter-integrated circuit (I²C) channel, and a serial peripheral interface (SPI) channel. In this application the USB channel may be used as simple I/O.

SPI Channel

Figure 28:
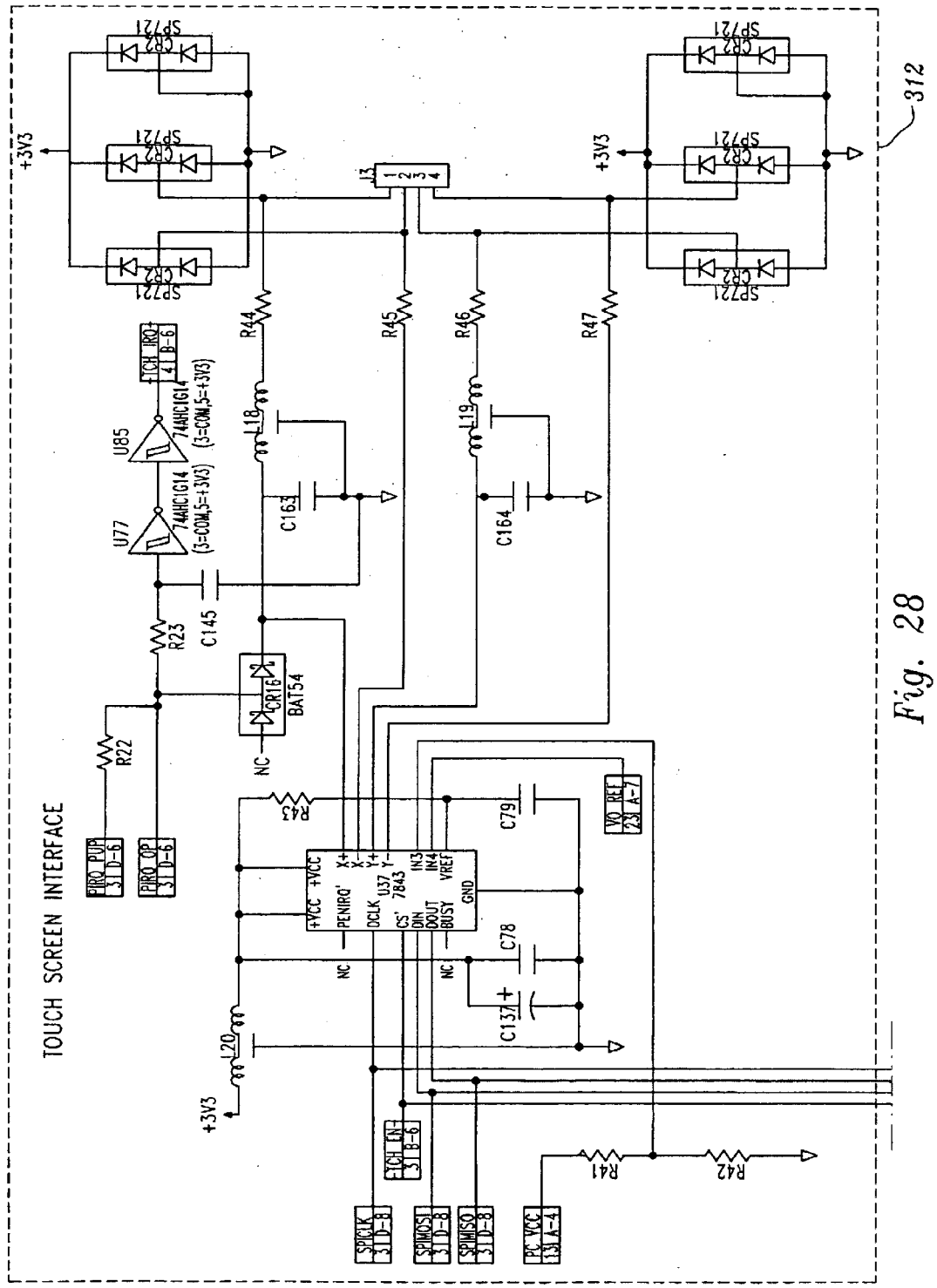
FIG. 28 is a schematic view of a touch screen interface according to the present invention.
Figure 29:
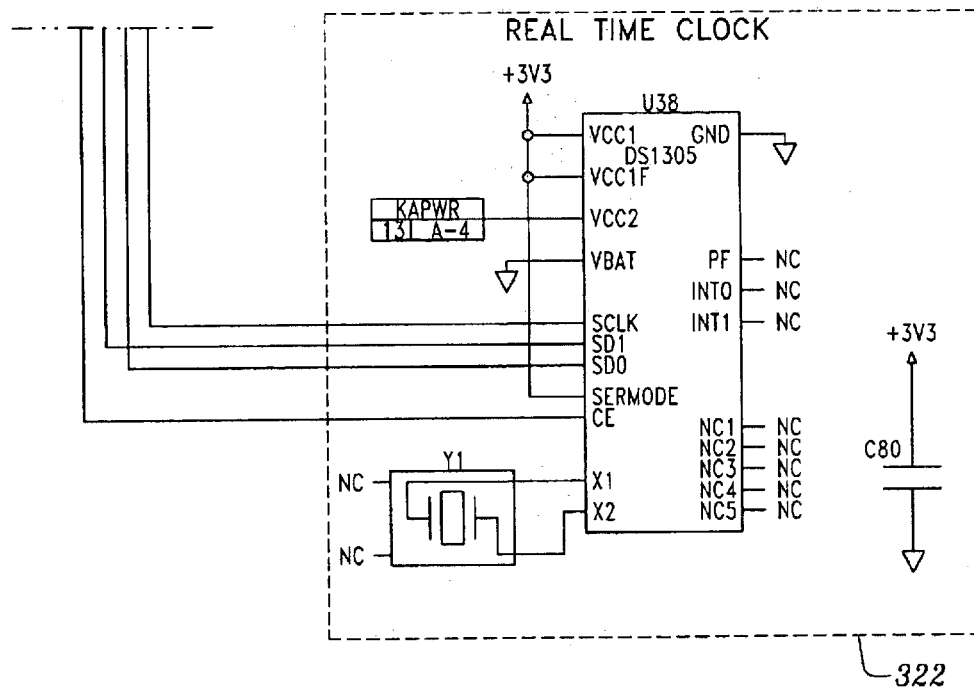
FIG. 29 is a schematic view of a real time clock circuit according to the present invention.

The SPI (serial peripheral interface) channel is used to control and communicate with the touch screen controller 312 and the real time clock 322 (shown in FIGS. 28 and 29, respectively). These devices have enable inputs with opposite sense and can thus be controlled by one I/O line. In addition to the three SPI interface signals the following signal shown below in Table 1 are used to control these devices.

TABLE 1

| Signal | CPU Pin | Function |
| --- | --- | --- |
| -TCH_EN- | PC14 | '0' = touch screen controller<br>'1' = real time clock |
| -TCH_IRQ- | IRQ7 | Touch screen interrupt |
| PIRQ_PUP | PA15 | Interrupt diode pull-up |
| PIRQ_OP | PA14 | Open drain output used to ensure reverse bias on interrupt diode |

The I²C (Inter Integrated Circuit) Controller is used solely to interface to the battery and battery charger circuitry.

The LCD Controller provides extremely versatile support for a wide range of color and monochrome LCD's.

The PCMCIA controller is a master controller that is compliant with Version 2.1. The interface supports one independent PCMCIA socket.

The MPC823 supports a wide range of power management features that allow the portable data collector and analyzer apparatus 10 to conserve the energy stored in its internal battery in order to prolong the use of the portable data collector and analyzer apparatus 10 in its intended application.

Memory Controller

Referring to FIGS. 16 through 18, the memory controller 290 is able to control up to eight memory banks shared between a general-purpose chip-select machine (GPCM) and a pair of sophisticated user-programmable machines (UPM). It supports a glueless interface to many memory types including Flash EPROM, SRAM, and SDRAM. This flexible memory controller allows the implementation of memory systems with very specific timing requirements.

Preferably, the eight memory bank chip-selects are allocated as follows:

1. -CS0-, GPCM, 128 Kbyte Flash EPROM boot memory.
2. -CS1-, GPCM, 24 Mbyte DiskOnChip™ mass storage device.
3. -CS2-, UPMA, 16 Mbyte SDRAM Bank 0.
4. -CS3-, UPMA, 16 Mbyte SDRAM Bank 1.
5. -CS4-, GPCM, 128 Kbyte SRAM shared memory.
6. -CS5-, GPCM, memory mapped keypad latches and contrast control DAC.
7. -CS6-, or -CE_1B-, PCMCIA even byte transfers.
8. -CS7-, or -CE_2B-, PCMCIA odd byte transfers.

Figures 18B, 18C, 18D:
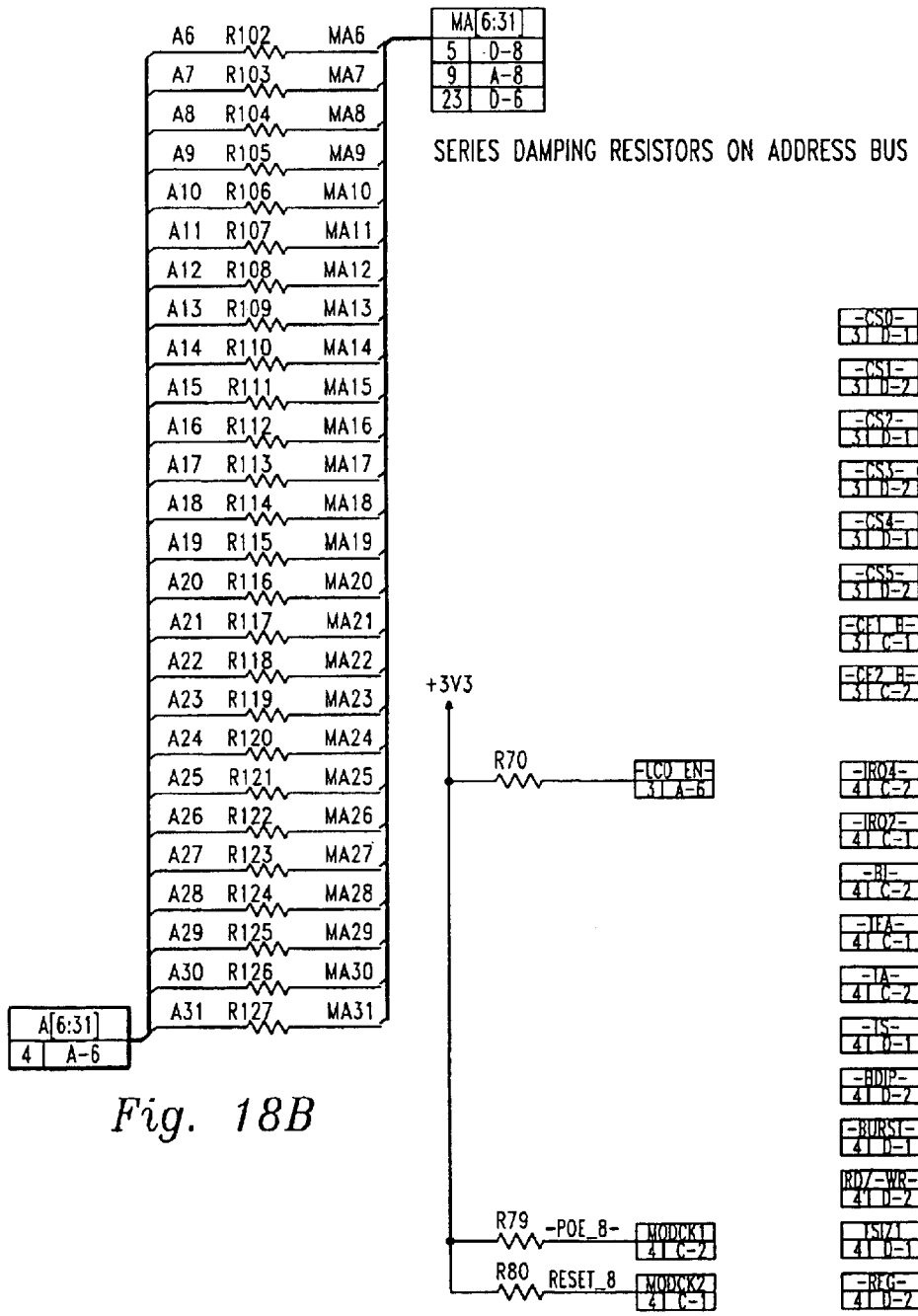
FIG. 18B is a schematic view of series damping resistors employed by the microcontroller according to the present invention.
FIGS. 18C through 18G are schematic views of pull-up and pull-down resistors employed by the microcontroller according to the present invention.
Figure 18E:
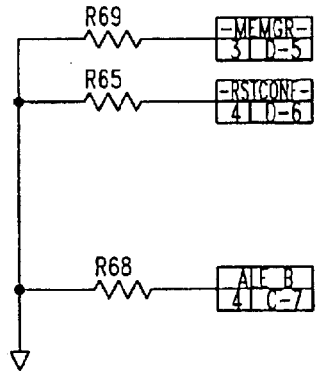
Figure 18F:
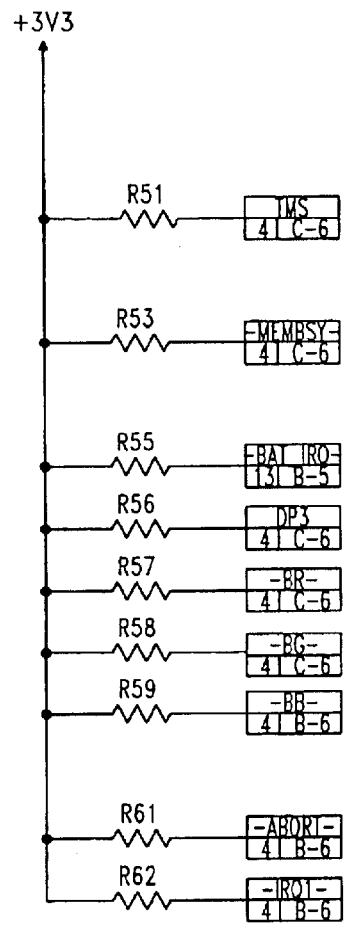

FIG. 18B schematically shows the series damping resistor that are used on the address bus of the microcontroller 280.

Additionally, FIGS. 18C through 18F schematically show the pull-ups and pull-down used in combination with the microcontroller 280.

Figure 18G:
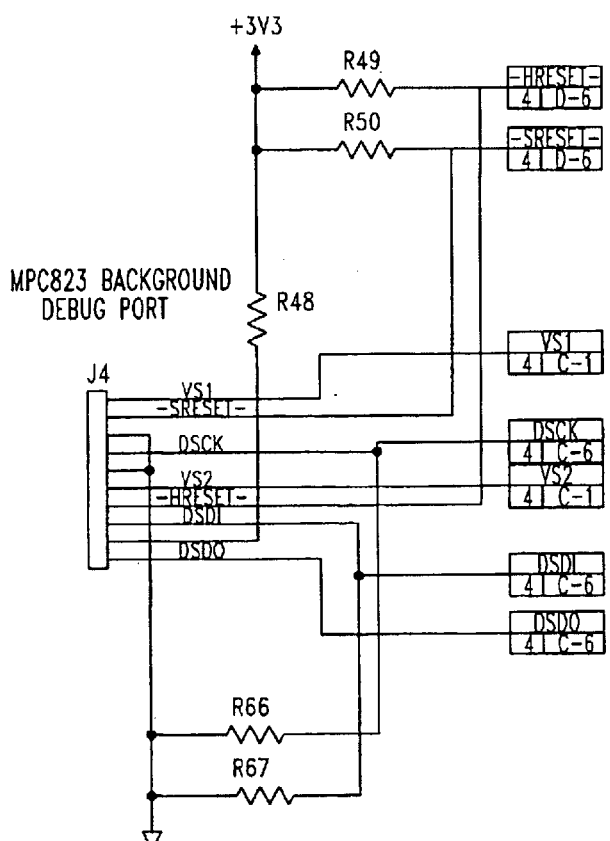

FIG. 18G schematically shows a background debug monitor (BDM) port which provides a full-duplex serial interface for communications between internal development support logic of the microcontroller 280 and an external development tool.

In order to enhance support for development tools the MPC823 form of microcontroller 280 has some of the development support functions implemented internally. Program flow tracking, watch-point and breakpoint generation, and emulation systems that control core activity allow efficient debugging of systems based on this microcontroller.

Main System Memory

Figure 19:
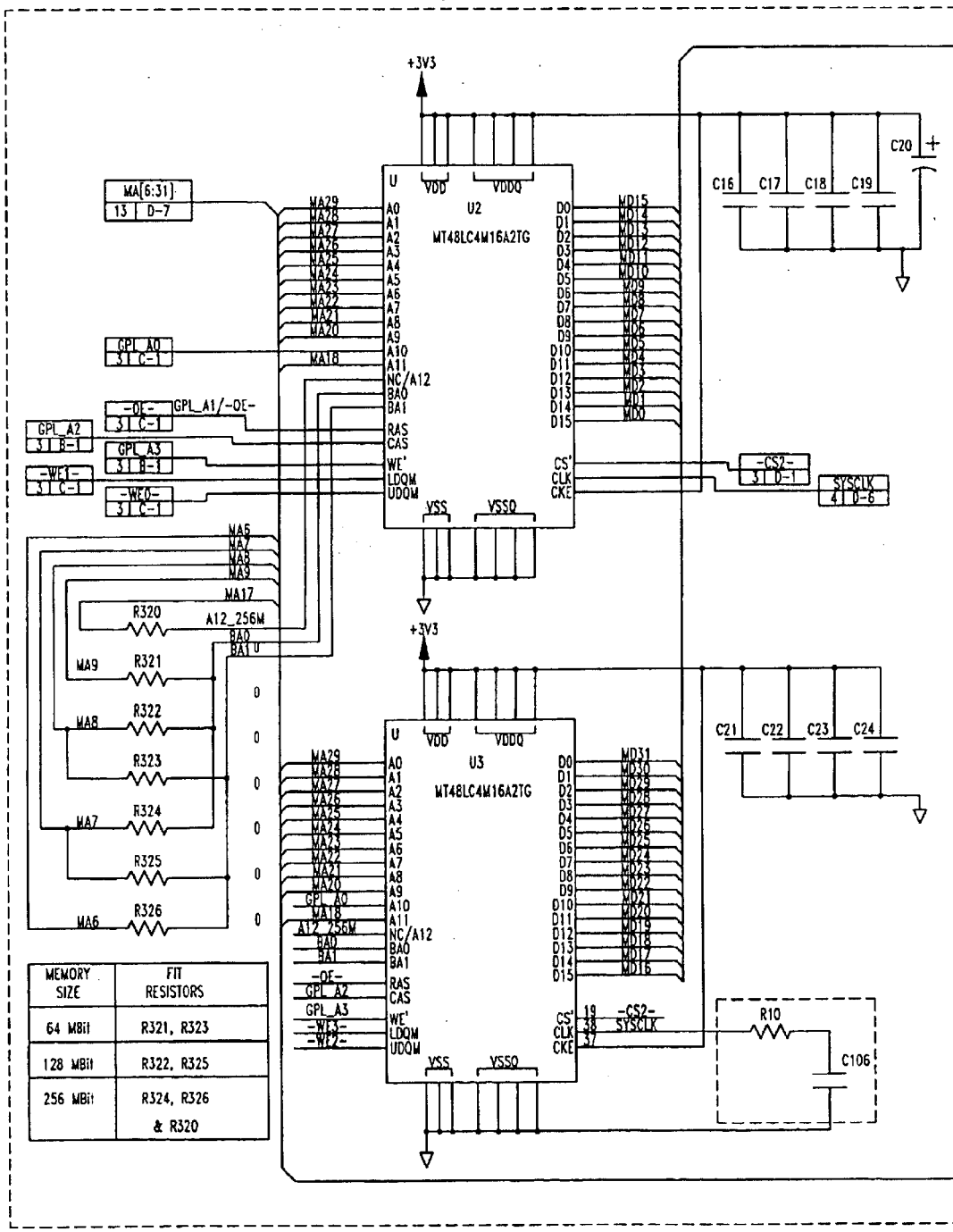
FIGS. 19 and 20 are schematic views which cover one embodiment of a main system memory in accordance with the present invention and as shown in FIG. 9.
Figure 20:
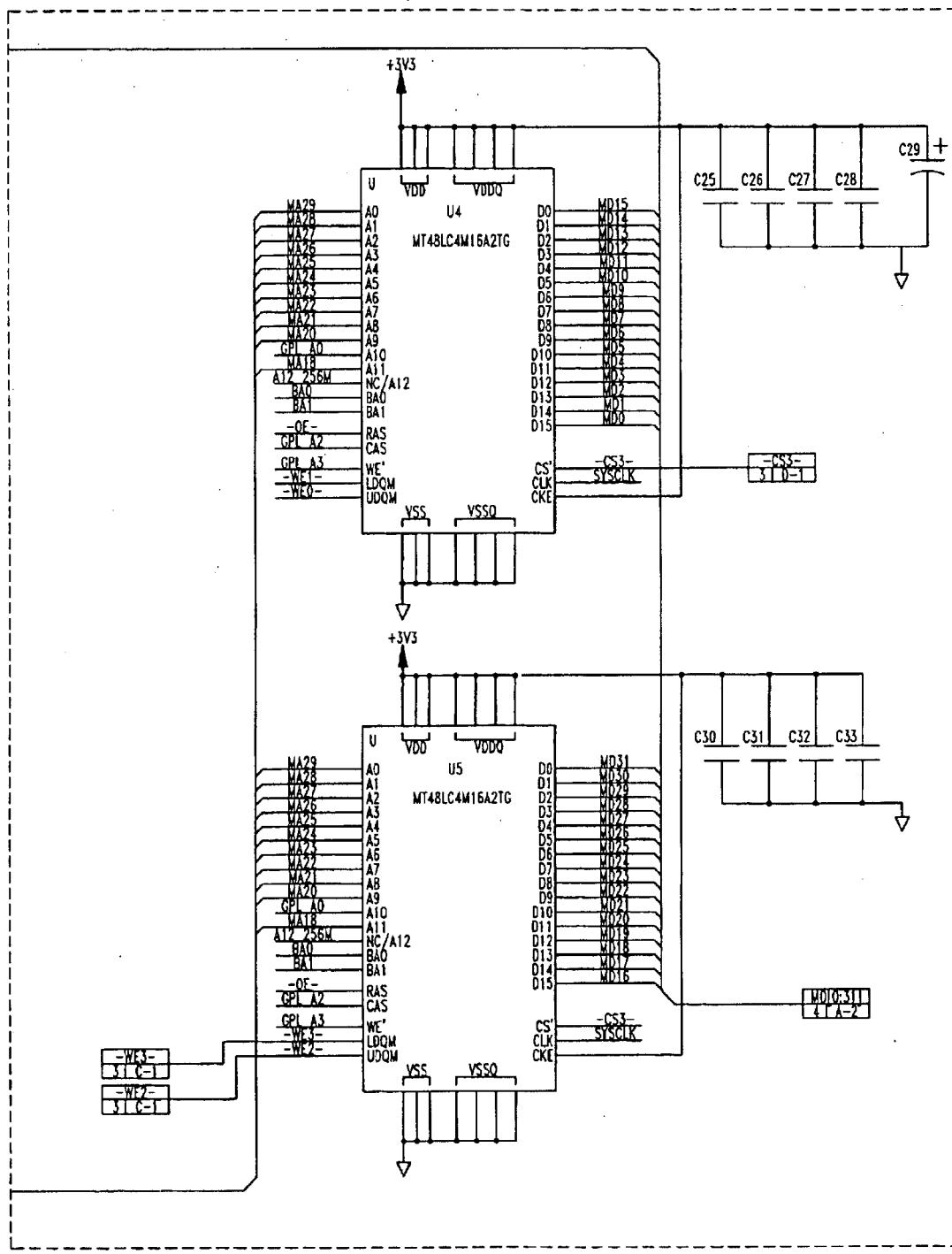

FIGS. 19 and 20 schematically show the main system memory 244 that was shown in FIG. 9 includes four 64 Mbit SDRAM's U2, U3, U4, and U5. Internally these devices are configured as four banks of 1,048,576×16-bits, with each bank being 4096 rows by 256 columns. This configuration results in two 16 Mbyte banks of 32-bit wide memory, giving a total memory size of 32 Mbytes. This is sufficient to allow both the Windows®CE operating system and the application programs of the portable data collector and analyzer 10 to run comfortably, and also have sufficient extra memory for development debugging purposes.

Control of the SDRAM includes of applying particular patterns to the control inputs of the SDRAM on successive system clock edges. This is achieved by programming the correct patterns into the appropriate UPM, in this case UPMA. The UPM also handles the address multiplexing required to define which row and column of the SDRAM are addressed. Table 2 below shows the UPM control signals that are connected to the SDRAM.

TABLE 2

| UPM Signal | SDRAM signal |
|---|---|
| GPL_A0 | A10 |
| GPL_A1(-OE-) | -RAS- |
| GPL_A2 | -CAS- |
| GPL_A3 | -WE- |
| -WEx- | DQM's |

These signals in combination with the chip select signals determine the SDRAM command to be performed by the selected bank.

In order to perform a particular memory access function it is necessary to follow a certain command sequence to ensure that the SDRAM operates as intended. This command sequence is programmed into the UPM RAM Array. The RAM Array includes 64 locations of 32-bit words. Each bit determines how the various control signals are manipulated by the UPM. Some bits are controllable to one-quarter clock cycle. When a particular memory access is required then the RAM word corresponding to the address of that function is 'executed'. Thereafter on every clock cycle the next RAM word is executed until a RAM word with the 'LAST' bit set is executed. This completes the memory access cycle.

Table 3 below shows command sequences that are required by the SDRAM to perform the stated memory accesses.

TABLE 3

| Command | Cycle 0 | 1 | 2 | 3 | 4 | 5 | 6 | 7 | 8 |
|---|---|---|---|---|---|---|---|---|---|
| Single beat Read | NOP | Active | NOP | READ | NOP | PCHG | N/A | N/A | N/A |
| Burst Read | NOP | Active | NOP | READ | NOP | NOP | NOP | NOP | PCHG |
| Single beat Write | NOP | Active | NOP | WRITE | NOP | PCHG | N/A | N/A | N/A |
| Burst Write | NOP | Active | NOP | WRITE | NOP | NOP | NOP | PCHG | N/A |
| Auto-refresh | NOP | PCHG | NOP | ARFSH | NOP | NOP | NOP | N/A | N/A |

The extra 'NOP' 0 at the start of each command sequence is required to ensure that the set up times of the SDRAM are met. In the last phase of this 'NOP' command the next command is set up and so on for subsequent commands. Due to the way the UPM works there is a clock cycle inserted between back-to-back memory accesses. This effectively increases the number of cycles required for any memory access by one cycle.

In order to ensure that no data is lost it is necessary to perform a refresh on both banks within sixty-four milliseconds. A full device refresh requires 4096 refresh cycles. A total of 8192 refresh cycles are required within sixty-four milliseconds to ensure that both banks are properly refreshed. Thus, one refresh cycle is required every 7.8125 microseconds ($\mu$s) alternating between banks. The UPM Periodic Timer can be set up to ensure that this timing requirement is met.

This memory sub-system has been designed to accommodate memory devices of 128 and 256 (Mbits) as technological advances result in the production of larger capacity devices. This can be achieved by selectively fitting specific combinations of resistors R320 through R326. For example, 64 (Mbit) memory devices are accommodated by fitting resistors R321 and R323, 128 (Mbit) memory devices are accommodated by fitting resistors R322 and R325, and 256 (Mbit) memory devices are accommodated by fitting resistors R324, R326 and R320.

Clock Generation

The Reset Control Configuration and Microcontroller clock generator circuitry 246 shown in FIG. 9 is comprised of a microcontroller or CPU clock generator circuit 300 and a microcontroller clock configuration and reset circuit 400.

Figures 21A, 21B:
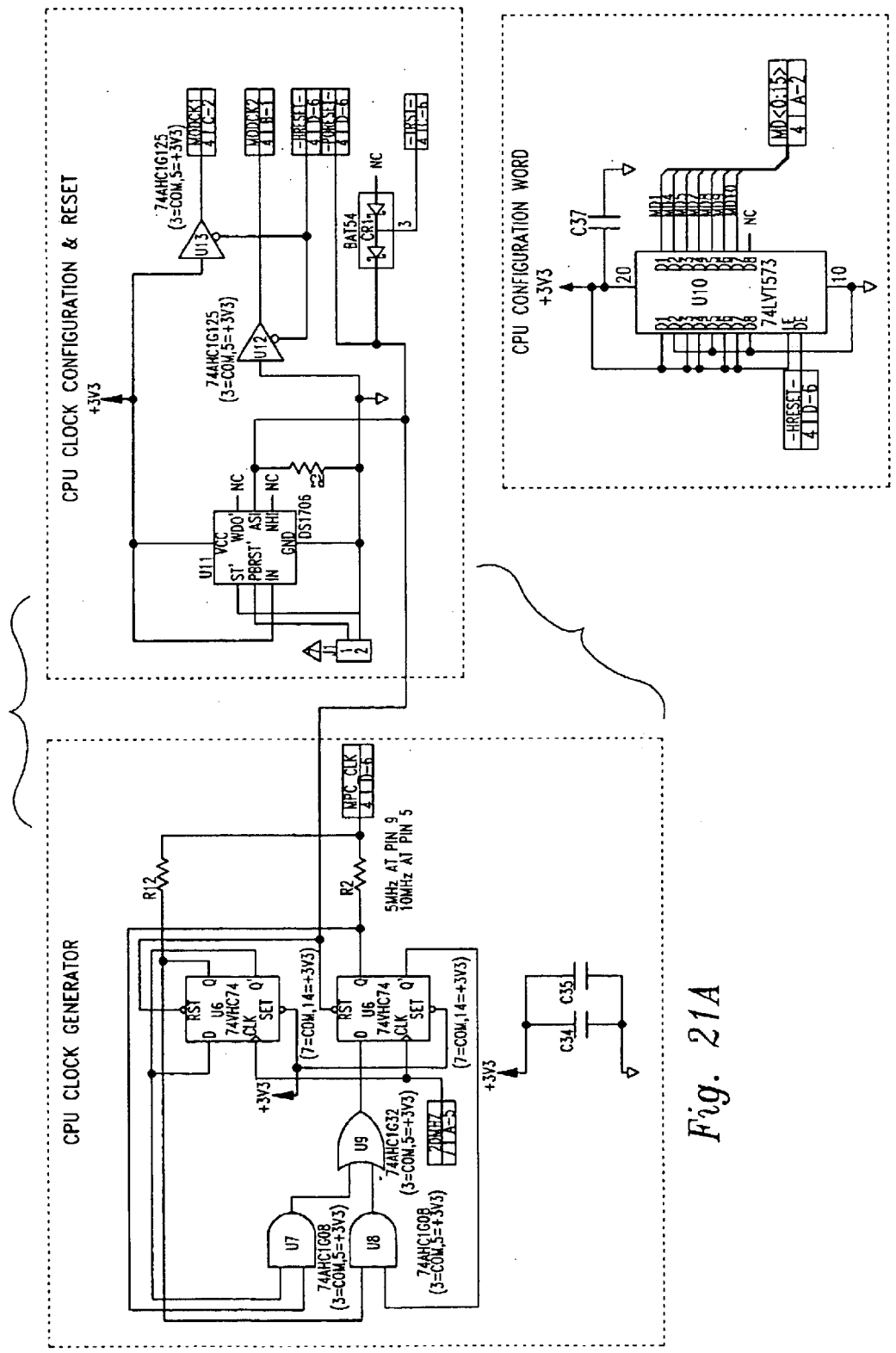
FIG. 21A is a schematic view of a microcontroller clock generator circuit and a microcontroller clock configuration and reset circuit according to the present invention.
FIG. 21B is a schematic view of a microcontroller configuration word circuit according to the present invention.
Figure 22A:
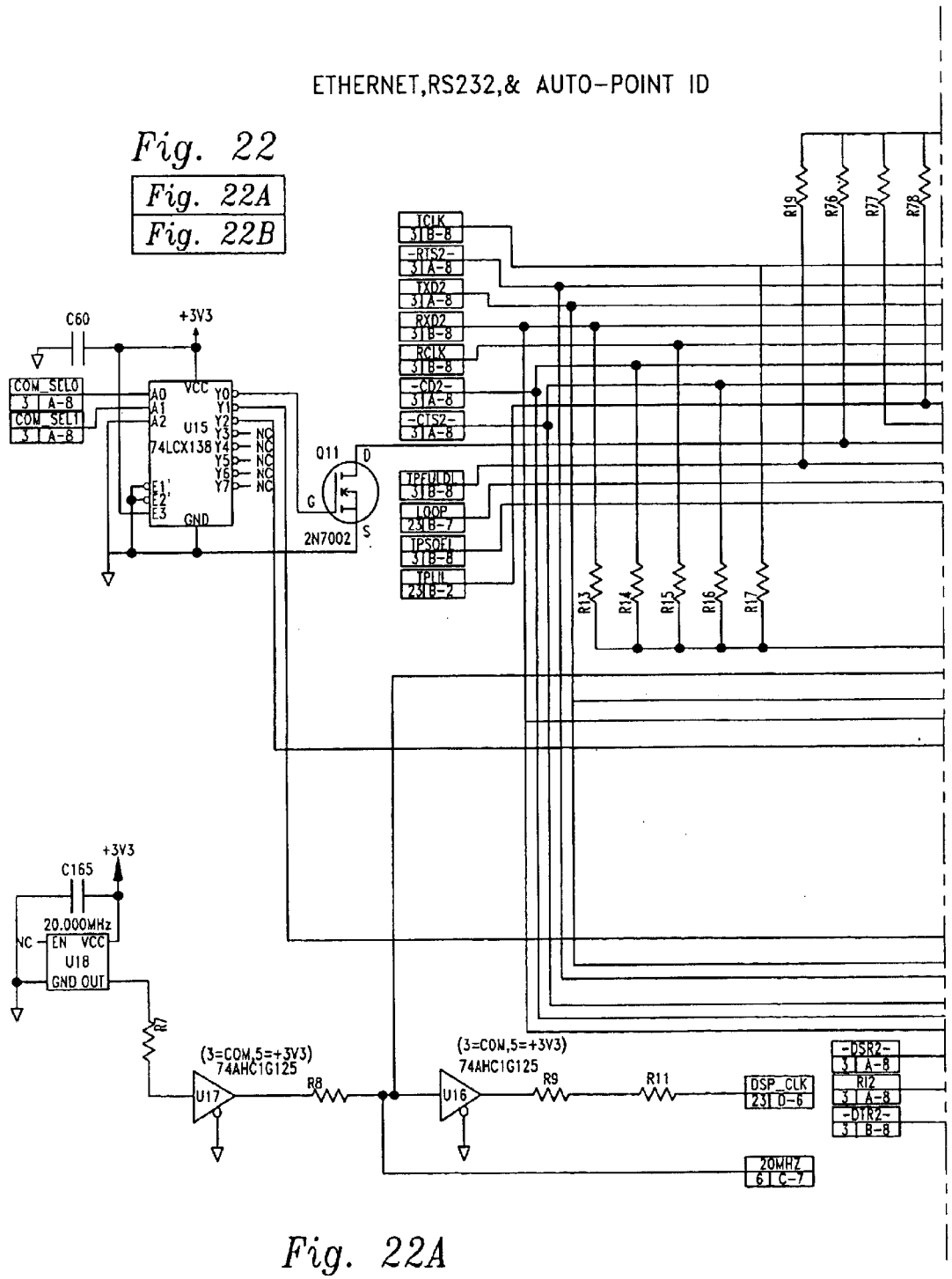
FIG. 22 is a schematic view of Ethernet, UART and Auto-Point ID circuitry in accordance with the present invention and as shown in FIG. 9.
Figure 22B:
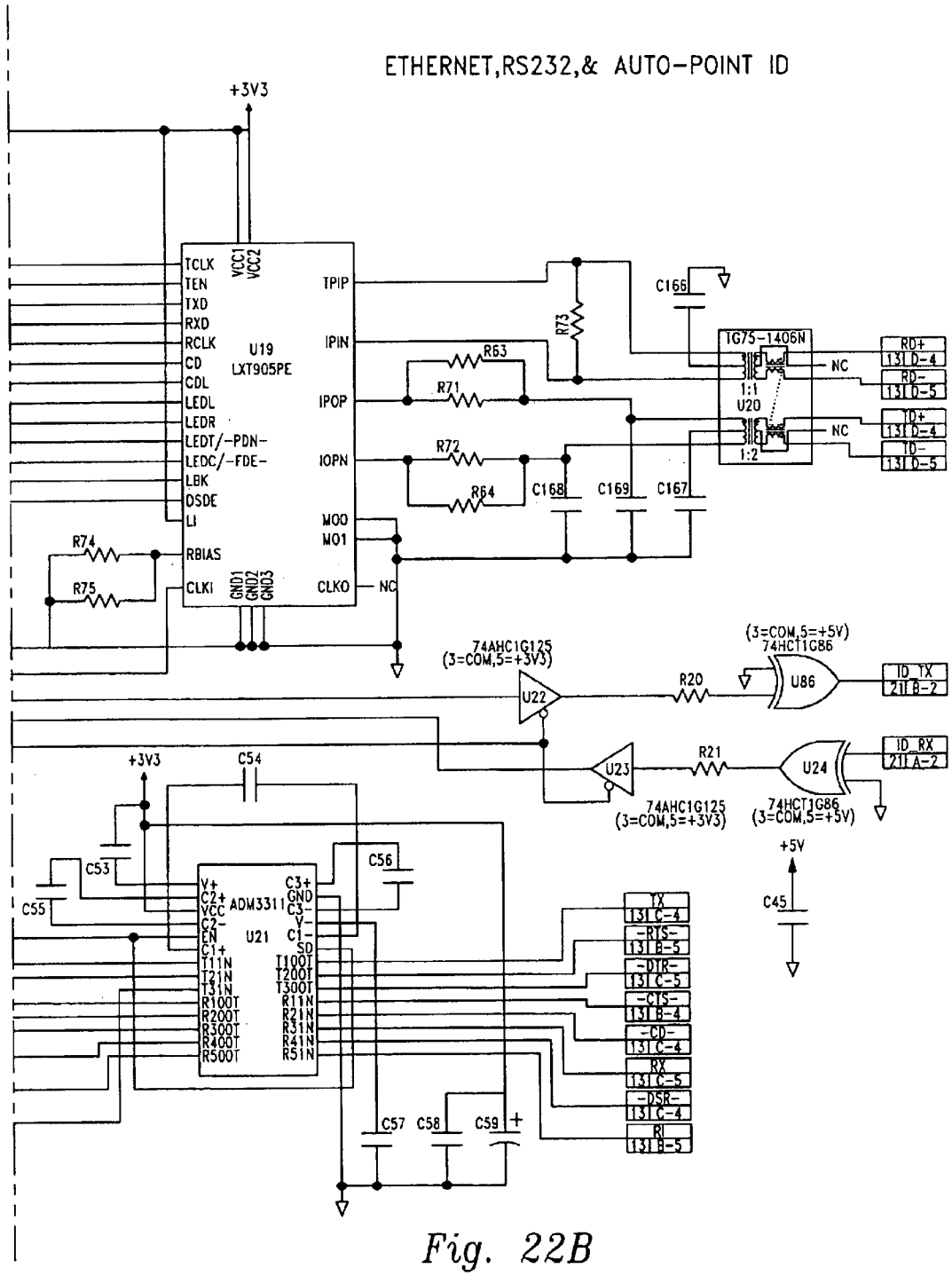

Referring to FIGS. 21A and 22, the main clock source is a 20.0 MHz crystal oscillator module U18 which was shown in FIG. 9 as being part of circuitry 248. The output of the oscillator module is buffered by U17 (U17 can be, for example, a 74AHC1G125 buffer) to ensure adequate drive for the subsequently connected circuits that include the Ethernet transceiver U19 via the CLKI line, the microcontroller clock generator circuit 300 via line 302 and buffer U16 for the DSP clock. Series damping resistors are included at the oscillator output R7 and the buffered output R8 to ensure that overshoot in these signals is well controlled.

The DSP clock line (DSP_CLK) is separately buffered by U16 (U16 can be, for example, a 74AHC1G125 buffer) to ensure that any reflections from the clock input of the DSP chip can be adequately removed by use of series damping resistors R9 and R11 at the output of the buffer U16. This ensures a clean signal at the DSP chip U3A at the expense of a certain amount of "stair-stepping" at the output of the buffer U16. Without buffer U16 this would affect both the Ethernet and microcontroller clock generator clock signals and cause undesirable effects.

Microcontroller Clock

The microcontroller clock generator circuit is a synchronous divide by four state machine that is clocked by the buffered 20 MHz clock U18. It comprises a pair of D type flip-flops U6 and some decode logic U7, U8, U9 that perform the state machine function and resistors R2 and R12 to allow selection of either a 5 MHz (R2 fitted, R12 omitted) or a 10 MHz (R12 fitted, R2 omitted) clock signal that is delivered to the microcontroller via an MPC_CLK line.

System Clock

The system clock or SYSCLK line (see FIG. 18A) is the output from an internal phase-locked-loop of the microcontroller 280. Various internal registers define the operation of this clock. In this application it is configured to multiply the input clock of 5 MHz, which is received via the MPC_CLK line, by a factor of ten during normal operation and to reduce this to a factor of one for low power modes of operation. This gives maximum performance during normal operation of the portable data collection and analysis apparatus 10 and optimum power saving during idle periods.

The system clock is the main internal timebase of the microcontroller and all other timings are related to it, including memory accesses, internal timers, baud rate generation for serial communications, and LCD timing. Only the basic Ethernet timing is not directly related to the system clock, although the interface to the Ethernet transceiver is partly timed by the microcontroller.

Microcontroller Reset Control and Configuration

The microcontroller 280 needs to be held in a reset condition during power supply voltage fluctuations, whether they are power on, power off, or brownout events. This will ensure that the microcontroller does not behave in a spurious fashion.

Referring to FIG. 21A, the microcontroller clock configuration and reset circuit 400 includes a monitoring device U11 that provides the required protection from power supply fluctuations and also provides the option of an external override. When this device detects an out of specification power supply it asserts an active low output. This remains low for at least one hundred thirty milliseconds after an in-tolerance voltage is detected. This signal connects to the microcontroller 280, via a PORESET line (power reset line) and via a diode to a TRST line (test reset line) of the microcontroller and ensures that the microcontroller remains in reset while these signals are asserted.

Additionally, it is important to ensure that the microcontroller powers up in the correct mode of operation. When -PORESET- is asserted the microcontroller drives the hardware reset signal low (-HRESET-). When the -HRESET- is low, buffers U10 (e.g., a 74LVT573 buffer) (please see FIG. 21B), U12 (e.g., a 74AHC1G125 buffer), and U13 (e.g., a 74AHC1G125 buffer) drive configuration information on a data bus MD[0, 31], on MODCK1 line and on MODCK2 line. Since the reset configuration input or line -RSTCONF- is pulled low via R65 then after -PORESET- input or line and subsequently -HRESET- input or line are de-asserted then this configuration is sampled and defines how the microcontroller will be initially configured. This includes the size of the boot device, the debugging mode, base memory address, and clock mode. One example of the monitoring device U11 is manufactured by Dallas Semiconductor and sold under part number DS1706.

Table 4 below shows the data bit and configuration word field parameters with other bits defaulting to zero.

TABLE 4

| Data Bit | Configuration Word Field |
|---|---|
| 1 | IIp (1) |
| 4, 5 | BPS (0, 1) |
| 7, 8 | ISB (1, 0) |
| 9, 10 | DBGC (1, 1) |

Ethernet Controller, UART and Auto-Point ID

FIG. 22 shows a detailed schematic of the Ethernet, UART and Auto-Point ID circuitry 248 shown in FIG. 9. FIG. 14B shows a schematic view of an Ethernet connector for the Ethernet circuitry.

These interfaces are controlled by the SCC2 serial communications controller of the microcontroller 280 (please see FIGS. 16 through 18). This can be configured to implement several different serial communication protocols. The SCC2 does not include the physical interface, but is the logic that formats and manipulates the data obtained from the physical interface.

The 3 to 8 line decoder (U15) activates one of these interfaces by setting an appropriate pattern on the COM_SEL0 and COM_SEL1 outputs from the Microcontroller 280. Table 5 below shows the appropriate patterns that are placed on the COM_SEL0 and COM_SEL1 outputs from the Microcontroller 280.

TABLE 5

| COM_SEL1 (PB16) | COM_SEL0(PB17) | Communications channel |
|---|---|---|
| 0 | 0 | Ethernet |
| 0 | 1 | UART |
| 1 | 0 | Auto-point ID |
| 1 | 1 | None, low power |

Ethernet

More specifically, and referring to FIG. 22, when the SCC2 is in Ethernet mode it performs the full set of IEEE802.3/Ethernet CSMA/CD media access control and channel interface functions. With the addition of an Ethernet transceiver and isolation transformer, a complete Ethernet physical layer interface is created. A Universal 10-Base-T Transceiver U19, an Isolation Transformer U20 and their associated components as detailed in FIG. 22 perform this function. One example of the Universal 10-Base-T Transceiver U19 is manufactured by Level One Communications and sold under part number LXT905. Additionally, one example of the Isolation Transformer U20 is manufactured by Halo Electronics and sold under part number TG75-1406N.

In addition to the standard Ethernet connections provided by the microcontroller 280, and as shown below in table 6, there are some additional I/O pins used to control the following features of the Ethernet transceiver. Specifically, TPFULDL line is an input and is used to enable full duplex (external loop-back) mode of operation. This function is enabled when LOW. TPSQEL line is an input and is used to control the Signal Quality Error (SQE) function. This function is enabled when LOW. TPLIL line is an open drain output and when LOW it indicates that the link integrity test has been passed. LOOP line is an input and is used to enable an internal loop-back test when HIGH. For normal operation this pin would be driven LOW.

TABLE 6

| Signal | Port pin |
|---|---|
| TPFULDL | PB31 |
| TPSQEL | PC11 |
| TPLIL | Keypad read bit MD4 |
| LOOP | Keypad write bit MD0 |

RS232C UART

The portable data collector and analyzer apparatus 10 also includes an RS232 interface that preferably provides three transmit and five receive channels for RS232C signals. This can be accomplished with a driver/receiver device U21. One example of the driver/receiver device U21 is manufactured by Analog Devices and sold under part number ADM3311E. As shown in FIG. 22, U21 and capacitors C53 through C59 define the physical layer of this communications channel. This interface allows the implementation of a full duplex modem channel to provide a communications link between the portable data collector and analyzer apparatus 10 and an external computer system, either directly or via an external modem, with a view to exchanging data between the two systems.

Auto-point Identification

The portable data collector and analyzer apparatus 10 includes an auto-point identification circuit which is preferably comprised of a very simple 5 V TTL compatible interface connectable to an external barcode reader or some other form of automatic identification with a serial data stream output.

This simple interface provides level shifting U24, U86 (e.g., a 74AHC1G125 chip and a 74HCT1G86 chip, respectively) and tri-state buffering U22, U23 (e.g., a 74AHC1G125 chip and a 74HCT1G86 chip, respectively) between the 3.3 V microcontroller and the connected 5 V reader.

Serial Debug Interface and Keyboard Interface

The serial input/output circuitry 250 shown in FIG. 9 is comprised of serial debug interface or port and a keyboard interface or port.

Figure 23:
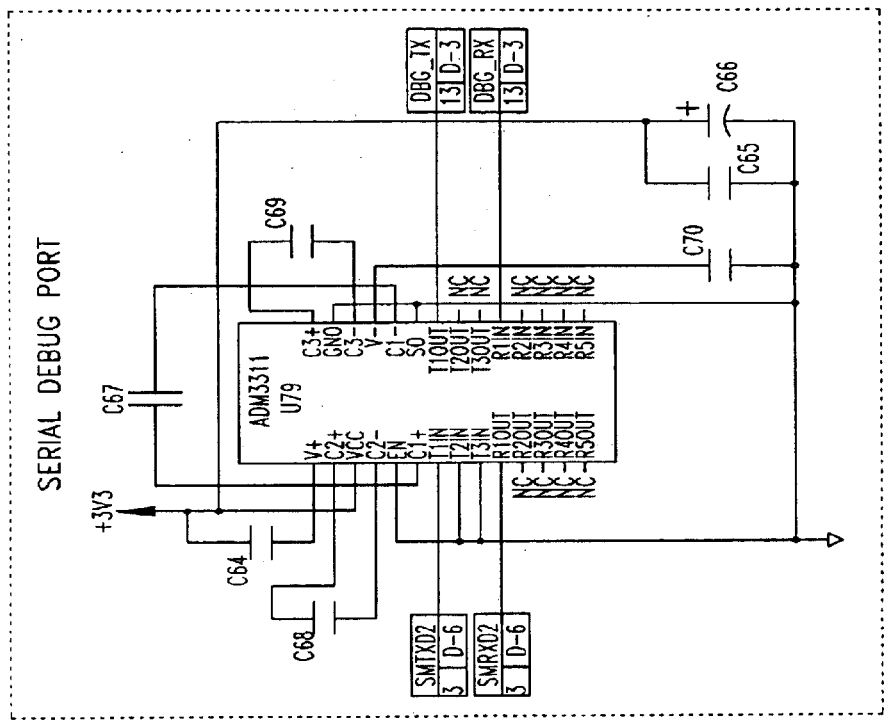
FIG. 23 is a schematic view of a serial debug circuit according to the present invention.

Referring to FIG. 23, the serial debug interface is provided to allow software debugging and has only transmit and receive functionality via the SMC2 channel (please see FIG. 16). This can be accomplished with a driver/receiver device U79. One example of the driver/receiver device U79 is manufactured by Analog Devices and sold under part number ADM3311. As shown in FIG. 23, U79 and capacitors C64 through C70 define the physical layer of this communications channel. FIG. 14C shows a schematic view of a serial debug port connector for the serial debug interface.

Figure 24:
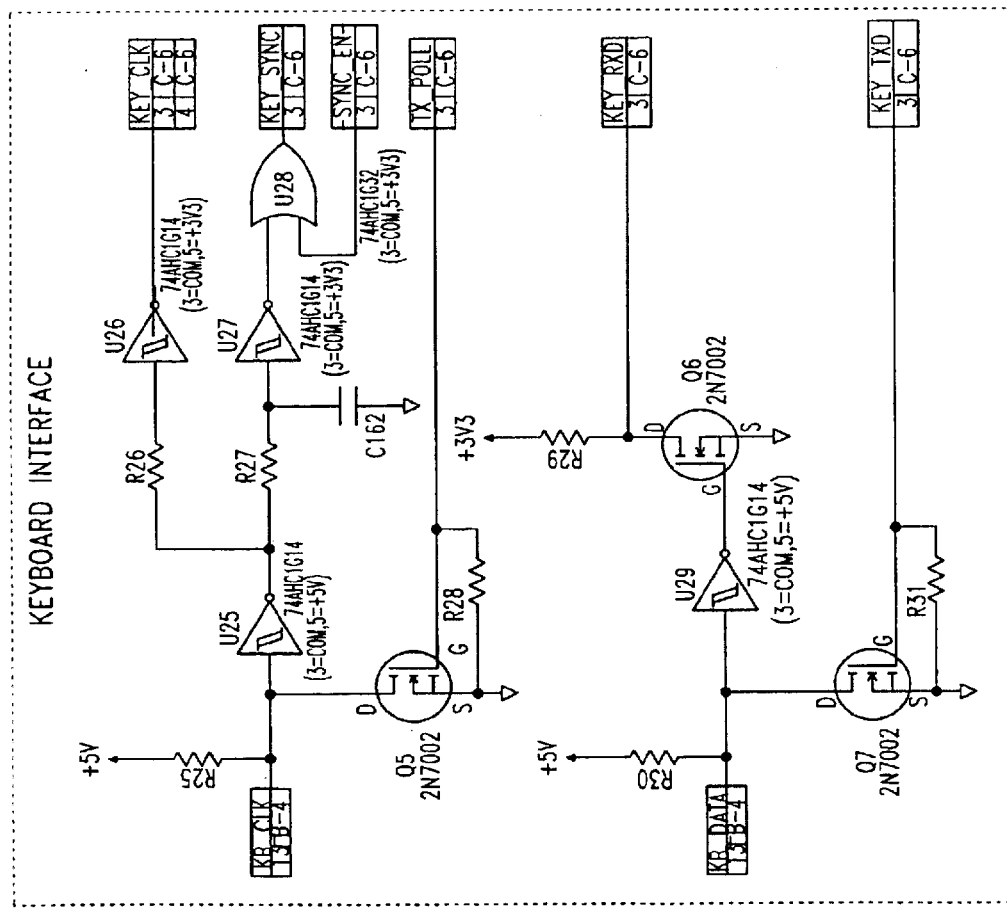
FIG. 24 is a schematic view of a keyboard interface circuit according to the present invention.

Referring to FIG. 24, and FIGS. 17 and 18, the keyboard interface is designed to emulate a PC keyboard. There are two signal lines connected to the keyboard, these are the clock line, KB_CLK and the data line, KB_DATA. This port also supplies power to the keyboard.

Communications is by a synchronous serial bi-directional channel on SCC1 (please see FIG. 16). The channel is configured in Transparent Mode of operation. The keyboard is always the source of the clock, which has a period of approximately 80 μs. The data format is 1 start bit, 8 data bits (LSB first), 1 odd parity bit, and 1 stop bit.

When a key is pressed the keyboard transmits a 'make' code and, when the key is released, a 'break' code. The make code includes of an 8-bit scan code denoting the key pressed. The break code includes of the same scan code preceded by a special hexadecimal code F0. When handling control keys such as e.g. SHIFT, ALT, CTRL etc., then the key combination is handled as a number of individual key presses. For example, to make 'A' it is necessary to press the SHIFT and A keys together. This sequence will be reported as SHIFT-MAKE, 'A'-MAKE, SHIFT-BREAK, and 'A'-BREAK. Thus it is necessary to track the presence or absence of any prior SHIFT-MAKE or other control key combination.

The KEY_CLK line, is used to generate a synchronization pulse on the KEY_SYNC line, for the communications channel. A SYNC_EN signal on the SYNC_EN line is used to gate the synchronization pulse. The KEY_SYNC pulse on the KEY_SYNC line is delayed somewhat from the KEY_CLK signal to ensure that data set-up and hold times for the SCC1 are met. Keyboard data, (KEY_RXD) at line 47, is latched into the SCC1 port on the rising edge of the clock. The KEY_CLK signal is routed to one of the clock inputs of the microcontroller 280. Additionally it is also connected to an interrupt pin to enable the microcontroller to service keyboard requests.

Keyboard writes are handled in firmware by manipulating the port pins TX_POLL connected to the TX_POLL line and KEY_TXD connected to the KEY_TXD line. In order to initiate a write to the keyboard the TX_POLL signal is driven high. This pulls the KB_CLK signal low, which is recognized by the keyboard as the start of a write transaction. When TX_POLL is released the keyboard will drive the clock and will latch data internally on the clock's rising edge. Data can be set-up on the KB_DATA line by manipulating KEY_TXD line. A logic '1' on KEY_TXD line will result in a logic '0' at the keyboard. Below, table 7 shows keyboard signals and corresponding port pins of the microcontroller 280 shown in FIGS. 17 and 18.

TABLE 7

| Signal | Port pin |
|---|---|
| KEY_CLK | PA5 & IRQ4 |
| KEY_SYNC | PB23 |
| -SYNC_EN- | PC15 |
| TX_POLL | PC4 |
| KEY_TXD | PB25 |
| KEY_RXD | PB24 |

PCMCIA

Figure 25:
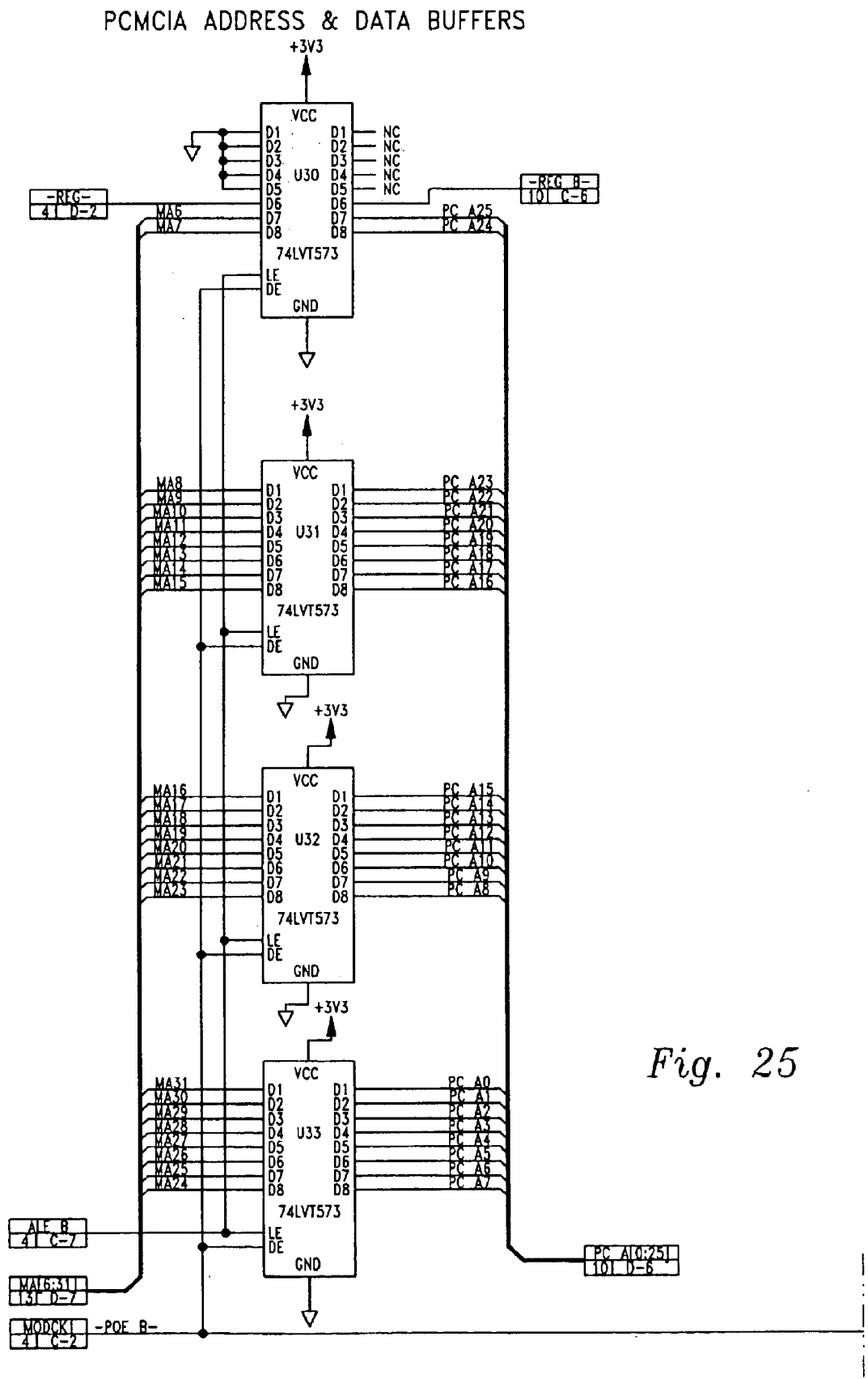

FIGS. 25 and 26 schematically show the microcontroller PCMCIA circuitry 251 shown in FIG. 9. The microcontroller PCMCIA circuitry implements a Host Adapter Interface that is fully compliant with PCMCIA Standard, Release 2.1+. It supports only one PCMCIA socket. There is some address and data bus buffering and power switching to allow for 'hot' insertion of a PCMCIA card. Preferably, the port is designed to use 5 V cards only and the PCMCIA socket is keyed to prevent the insertion of other cards. In one preferred form the address and data bus buffering employs the Texas Instruments 74LVT573 (U30, U31, U32, U33, and U36) and the Texas Instruments 74LVT245 (U34 and U35) devices and power switching to allow for 'hot' insertion of a PCMCIA card.

Figure 27:
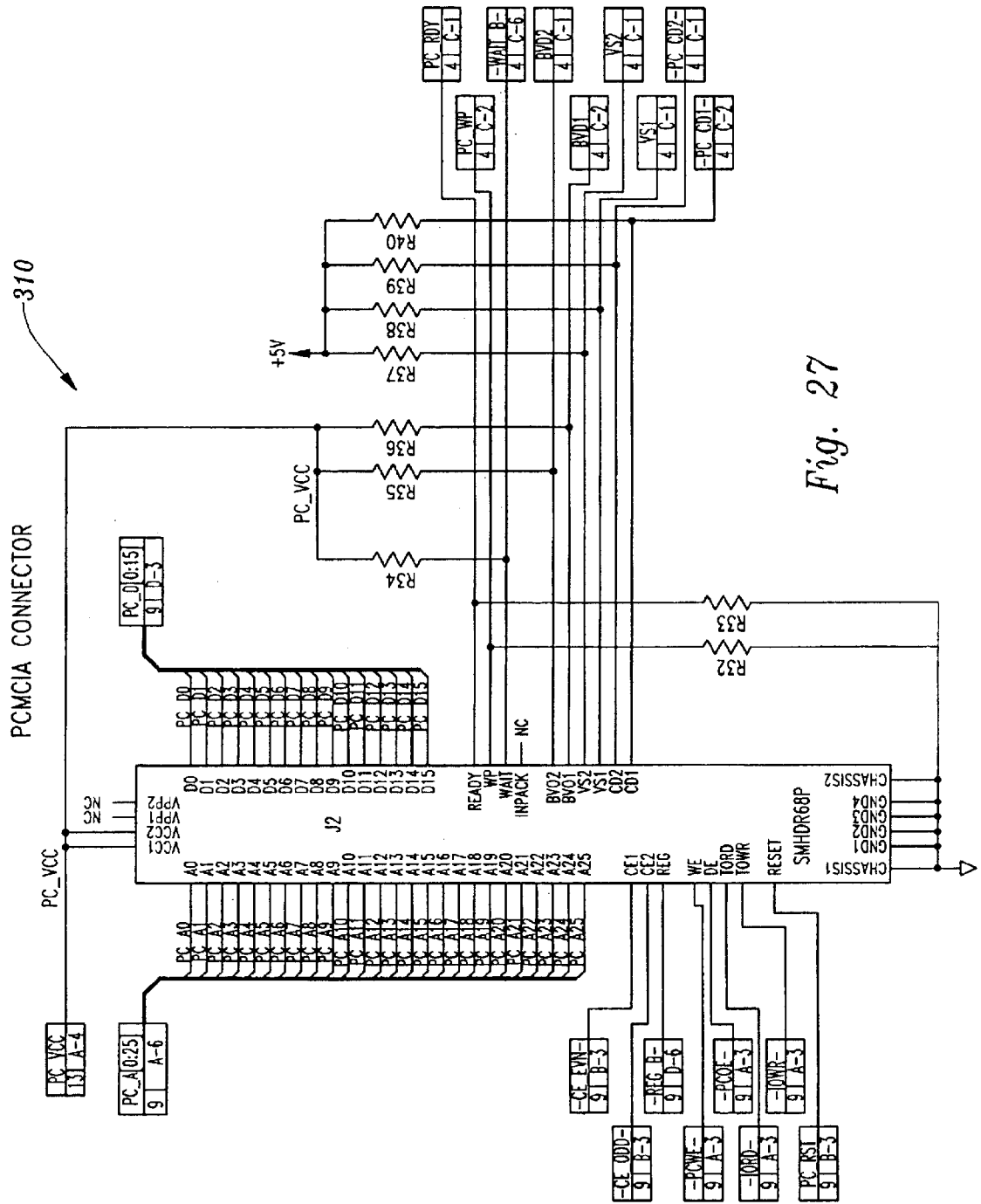
FIG. 27 is a schematic view of a PCMCIA connector according to the present invention.

FIG. 27 schematically shows one preferred from of the PCMCIA socket connector 310 that is keyed to prevent the insertion of other cards. This connector is manufacture by AMP and sold under part number AMP 535657-1.

Initially the PCMCIA port should be high impedance, and powered down. Below, table 8 shows the available card status outputs of connector 310.

TABLE 8

| PCMCIA status signal | PDC signal name | Function |
|---|---|---|
| READY | PC_RDY | Driven low when PC Card is busy |
| WP | PC_WP | Write protect status |
| -WAIT- | -WAIT_B- | Allows the PC Card to extend the memory or I/O cycle |
| BVD2 | BVD2 | Battery voltage detect |
| BVD1 | BVD1 | Battery voltage detect |
| VS2 | VS2 | Voltage sense pin |
| VS1 | VS1 | Voltage sense pin |
| -CD2- | -PC_CD2- | Card sense pin |
| -CD1- | -PC_CD1- | Card sense pin |

The PCMCIA interface status change register (PSCR) will reflect changes in these inputs when a card is present and this can be used to generate a PCMCIA interrupt for a specific event. In this application the function of the voltage sense pins can be ignored as we have a 5 V only PCMCIA socket.

When a card insertion event is detected (both card sense pins low) power can be applied to the card. This is achieved by outputting a logic '1' on the PCMCIA_EN line. The ExCA standard recommends the following power on sequence: 1) card detect valid to card power applied, 50 ms, 2) card power applied to PCMCIA port enabled, 300 ms, 3) card reset pulse, active high, 10 μs, 4) card reset inactive to card access permitted, 20 ms.

Note that the supply voltage to the card can be monitored via a touch screen interface (described below) to ensure that it has established correctly before the PCMCIA interface buffers are enabled. It is also possible to monitor a PC_RDY signal on a PC_RDY line, to determine that the PC Card's internal initialization is complete. However, not all cards will support this so it is best to combine this with the ExCA recommendations outlined above.

LCD, Touch screen and real time clock circuitry 252; power, Ethernet and Serial debug connector circuitry 254, DSP Board interface circuitry 256; and analogue front end circuitry 258.

Touch Screen Interface and Real Time Clock

The LCD, Touch screen and real time clock circuitry 252 shown in FIG. 9 is comprised of the LCD controller (shown in FIG. 16 and delineated hereinabove), a touch screen interface 312 and a real time clock circuit 322 which will be delineated hereinbelow.

FIG. 28 schematically shows the touch screen interface 312 which preferable includes a fully integrated touch screen controller U37 and interrupt generation logic as shown. One example of the fully integrated touch screen controller U37 is manufactured by Burr-Brown and sold under part number ADS7843. The touch screen controller U37 includes a 12-bit sampling analog to digital converter (ADC), a synchronous serial interface and some low on-resistance switches for driving the touch screen of device 70. Connector J3 is used to couple interface 312 with the touch screen of device 70. There are also two additional analogue inputs. One input is used to monitor the PCMCIA power supply voltage at PC_VCC line while the other is used to monitor the LCD module contrast control voltage reference signal via the VO_REF line.

The ADC can be operated in two modes, namely single ended reference and differential reference or ratiometric mode. It is also possible to specify 12-bit or 8-bit conversions and various power-down modes of operation. For this application the touch screen controller U37 will be used in the 12-bit ratiometric mode. Power-down between conversions with the pen interrupt request output enabled will be selected so that conversions can be performed on request, rather than by polling.

The following control bytes are used:
Y axis conversion 100100xx
X axis conversion 110100xx
PCMCIA power 10100100
LCD contrast reference 11100100

Note that the PCMCIA power and LCD contrast reference voltages are always converted in single ended reference mode due to the design of the controller.

'xx' denotes the power down mode. Only mode '00' and '11' are used, see below.

A complete conversion cycle requires 24 clock cycles to complete. The controller U37 is capable of operating at a throughput rate of 125 kHz, assuming back to back conversions in 16 clock cycles with overlapping of output data and the next control byte. This equates to an SPI clock frequency of 2 MHz. In this application it is difficult to operate the controller U37 in this way and hence the maximum throughput rate would be 83.333 kHz with a 2 MHz SPI clock. Since the microcontroller 280 can only support data transfers up to 16 bits in length then it is suggested that three 8-bit transactions be conducted. Alternatively, a firmware 8-bit and 16-bit transaction could be implemented.

The touch screen controller U37 clocks data in on the rising edge of the SPI clock and thus the CI and CP bit in the SPI Mode Register should be set to '0'. The first 8 clock cycles transfer the control byte and sets up the touch screen controller for the subsequent conversion. The next 12 clock cycles perform the conversion, with a thirteenth cycle required to clock out the LSB. This is required since the data from the conversion is valid after the first falling edge after the first cycle of the conversion and thus the next rising edge clocks valid data in to the microcontroller. The last three cycles complete the conversion process and the data output is set low during these cycles. The MSB of the result in the CPU of the microcontroller 280 will be invalid data, the next 12 bits will be valid, and the remaining bits should be zero.

In order for the interrupt to function correctly it must be operated as follows: 1) Perform a 'dummy' conversion to ensure that the controller enters the power-down mode with the interrupt enabled; 2) PIRQ_OP line should be configured as an open drain output, initially open; and 3) PIRQ_PUP line should be set to logic '1'. This is a pull-up for the interrupt diode.

When the touch screen is pressed output on the TCH_IRQ line should become active, indicating to the microcontroller 280 that the screen has been activated. The following procedure should be performed to ensure that the conversion is as accurate a possible: 1) PIRQ_PUP and PIRQ_OP should both be set to logic '0'. This ensures that the interrupt diode is reverse biased and thus there will be no additional current flow at the ADC input to cause any additional errors; 2) Perform a conversion sequence on each axis; and 3) Set up for the next interrupt.

The conversion sequence should be comprised of the following: 1) Perform a dummy conversion to power up the touch screen for the subsequent conversions and then allow time for the input filter to settle (about 200 μs). The touch screen must remain powered up until the end of this conversion sequence. Power down mode '11' allows this; 2) Take a suitable number of conversions to get a good average position on the screen; and 3) The final conversion of the sequence must put the screen in to the low power mode of operation where the interrupt diode circuit is active, i.e. mode '00'.

The following timing requirements should also be met: 1) $t_{CSS}$, CS falling to first DCLK rising 100 ns; and 2) $t_{TR}$, CS rising to DOUT disabled 200 ns.

The other timings meet the specifications of the SPI port of the microcontroller 280 providing that the SPI clock is less than 2 MHz.

FIG. 29 schematically shows the real time clock circuit 322. The real time clock circuit is built around device U38 and provides a full BCD clock/calendar with seconds, minutes, hours, day, date, month, and year with leap year compensation valid up to 2100. One example of the real time clock device U38 that provides these features is manufactured by Dallas Semiconductors and sold under part number DS1305. In addition, DS1305 includes two time of day alarms that are not used in this application and 96 bytes of non-volatile RAM.

The SPI interface has the ability to detect the idle state of the SPI clock as it is sampled when the device is activated. Thus either clock polarity can be accommodated. The data input is sampled on an internal strobe edge and output data is shifted out on the shift edge of the SPI clock. This means that the data format is not compatible with that used for the touch screen. The CP bit will have to be set to '1' in order to be able to conduct transactions with the RTC. The maximum clock frequency is 2 MHz when 5 volts power the device, and 0.6 MHz when powered by 2 volts. Thus it is suggested that the clock be set at 1 MHz as the device is powered from 3.3 volts in this application.

The following timing requirements should be met: 1)$t_{cc}$, CE to CLK set up time 4 μs; 2) $t_{cch}$, CLK to CE hold time 240 ns; and 3) $t_{cwh}$, CE inactive time 4 μs.

The other timings meet the specifications of the SPI port of the microcontroller 280 providing that the SPI clock is 1 MHz or less.

The power, Ethernet and Serial debug connector circuitry 254 that was shown in FIG. 9 is comprised power connector 278, Ethernet connector 298 and Serial debug connector 308 which respectively shown in FIGS. 14A, 14B and 14C. The Ethernet connector 298 interfaces with port 234 and the Serial debug connector 308 interfaces with ports 226 (please see FIG. 3).

System Configuration Registers and EEPROM

The analogue signal conditioning circuitry 262 through 268 shown in FIG. 10 must be configured to suit the transducer or signal input to be measured.

Figure 30:
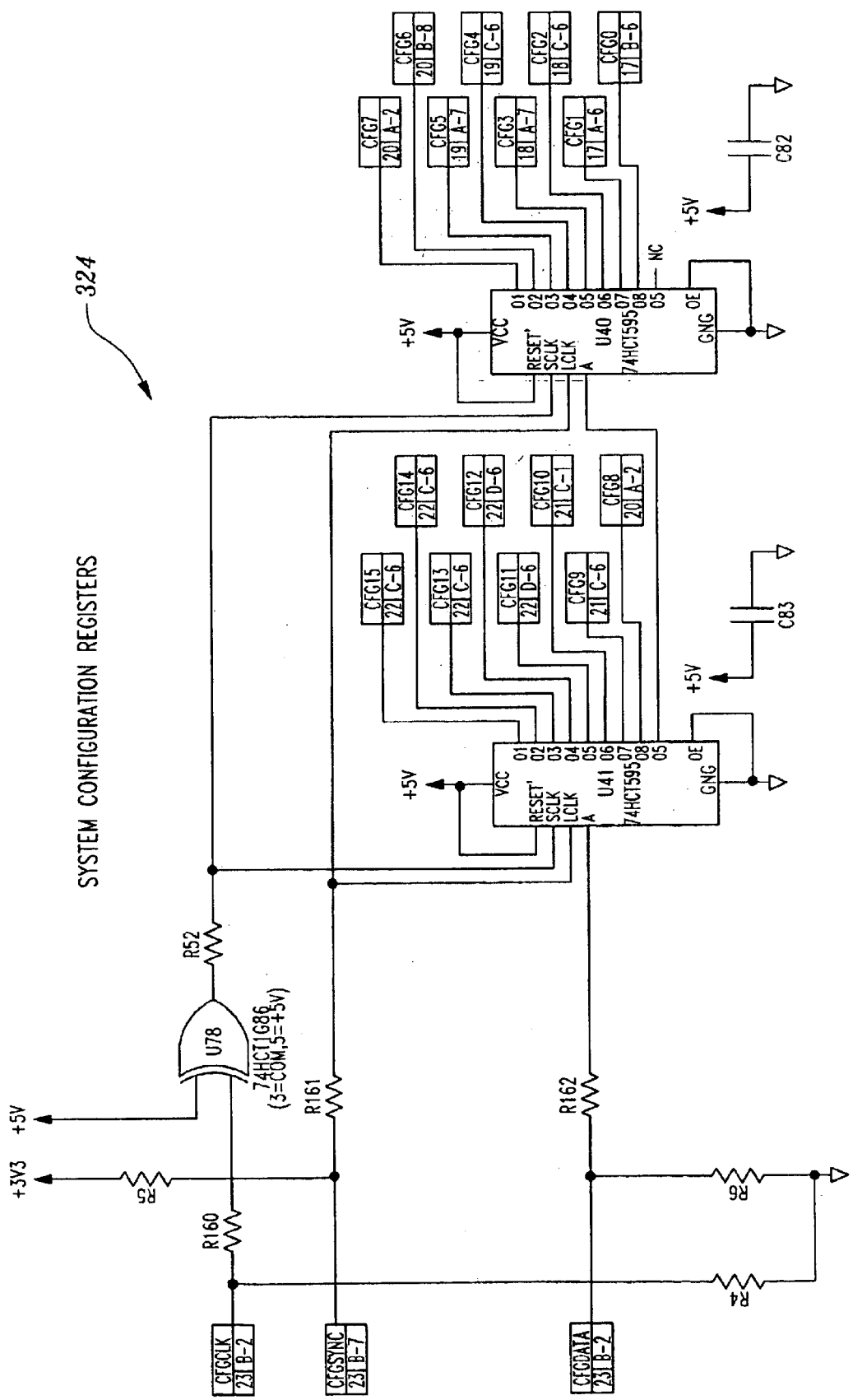
FIG. 30 is a schematic view of a system configuration circuit according to the present invention.

FIG. 30 schematically shows the a system configuration circuit employed for this task. Specifically, this is achieved using system configuration registers U40, U41 and other associated circuitry depicted in FIG. 30. Configuration is carried out by transmitting a 16-bit serial data stream via one of the DSP's full-duplex serial ports (CFGCLK, CFGSYNC & CFGDATA signals), to two daisy-chained serial shift registers (U40 & 41). In one form, the two daisy-chained serial shift registers U40 and U41 are 8-bit serial shift registers which are manufactured by Philips and sold under part number 74HCT595. The DSP serial port transmits data synchronously using CFGCLK and CFGDATA lines. The CFGSYNC line is used to signify the start and end of the data transmission. The outputs of which (CFG0 to 15 signals) are used to control the setup of various analogue switches and multiplexers (see below). This allows the DSP to configure the signal paths as required, turn on/off power supplies and perform self-test functions.

Figure 31:
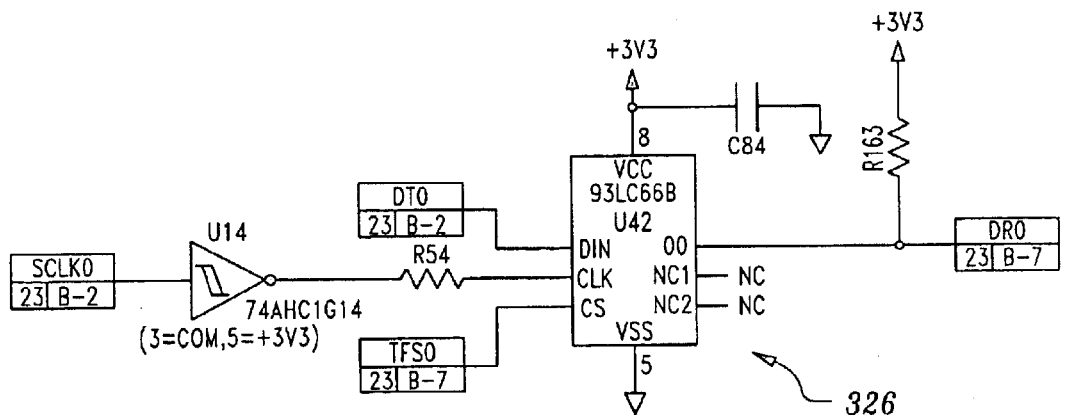
FIG. 31 is a schematic view of a serial EEPROM circuit for storing gain and offset calibration values for the DSP according to the present invention.

Referring to FIG. 31, circuit 326 includes a serial EEPROM device U42 and associated components for storing gain and offset calibration values used by the DSP 172 to ensure accurate measurements. SCLK0, DT0, TFS0 and DR0 lines connect to one of the DSP serial ports. Data is transmitted and received synchronously using DT0 and DR0 lines respectively. A TFS0 line is used to signify the start and end of the data transfer. During manufacturing tests a calibration procedure is performed during which correction factors for each signal path are determined and stored in this memory. One example of the serial EEPROM device U42 is manufactured by Microchip Technology and sold under part number 93LC66.

Current Limited Transducer Power Supplies

Figure 32:
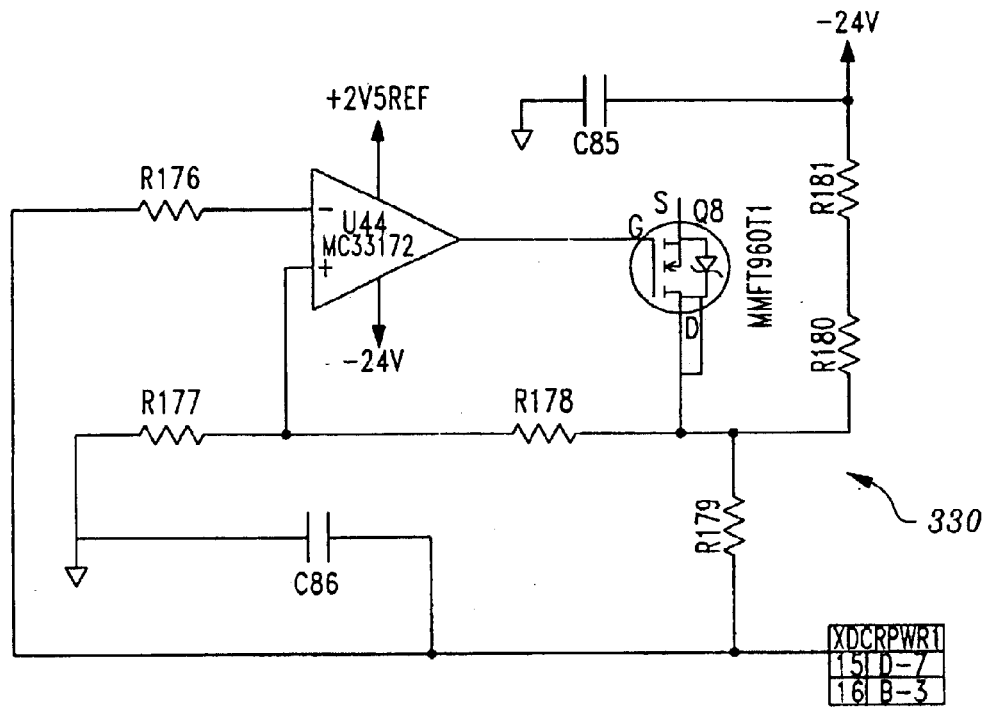
FIGS. 32 through 34 are schematic views of current limited transducer power supply circuits according to the present invention.
Figure 33:
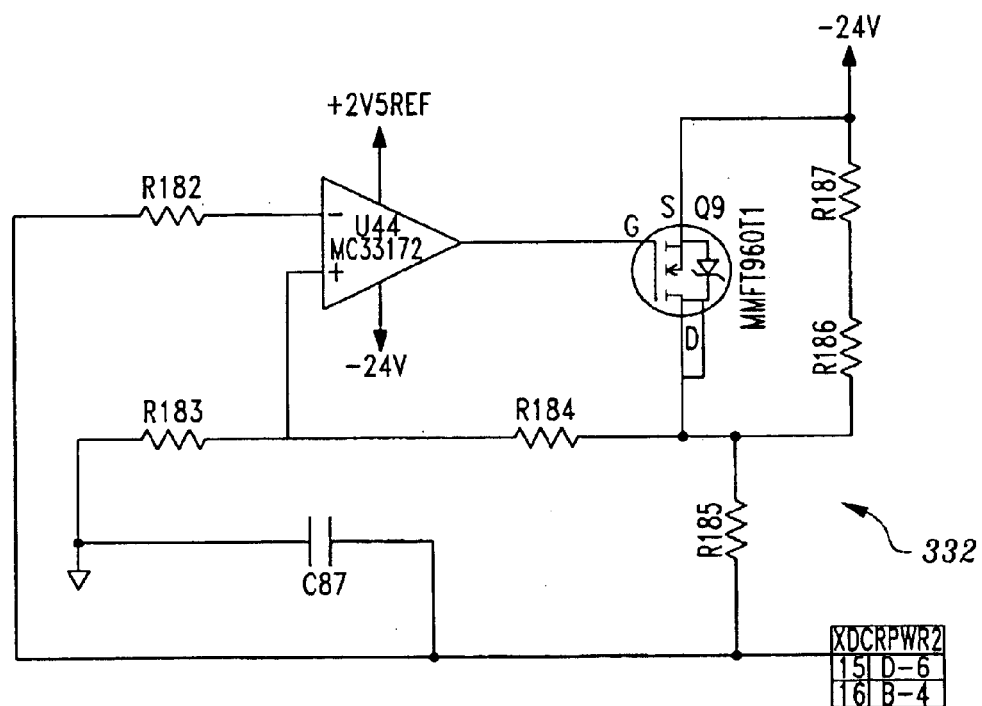
Figure 34:
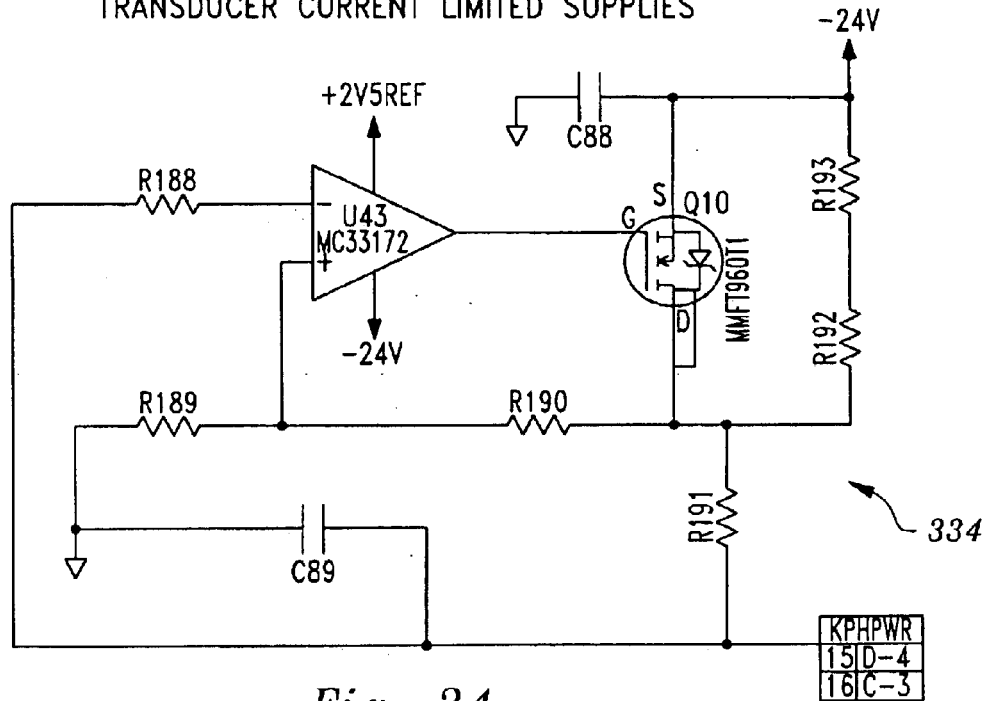

FIGS. 32 through 34 schematically depict the current limited transducer power supply circuitry 262 shown in FIG. 10. The power supply circuitry 262 is comprised of current limited power supply circuits 330, 332, and 334.

Referring to FIG. 32, the current limited power supply circuit 330 outputs current on the XDCRPWR1 line and is comprised of an op-amp U44, transistor Q8 and associated components as schematically shown for current limiting the power supply used to power external transducers. In one example, op-amp U44 is a Motorola MC33172 device and the transistor Q8 is a Motorola MMFT960 device. The current limit is set by R177 to R179 to a value sufficient to ensure that transducers power up correctly, but low enough to ensure that, under fault conditions, no damage to the transducer or the instrument can occur. R180 and R181 determine the short circuit current supplied by the circuit 330. Thus, for displacement and acceleration transducers a negative 24 volt dc current limited supplies are provided via lines XDCRPWR1, XDCRPWR2 and KPHPWR.

FIGS. 33 and 34 show current limited power supply circuits 332 and 334 that are identical in configuration and function as current limited power supply circuit 334 and thus, the same description used for FIG. 32 is applicable for FIGS. 33 and 34 and will not be repeated so as to not burden the record.

Figure 35:
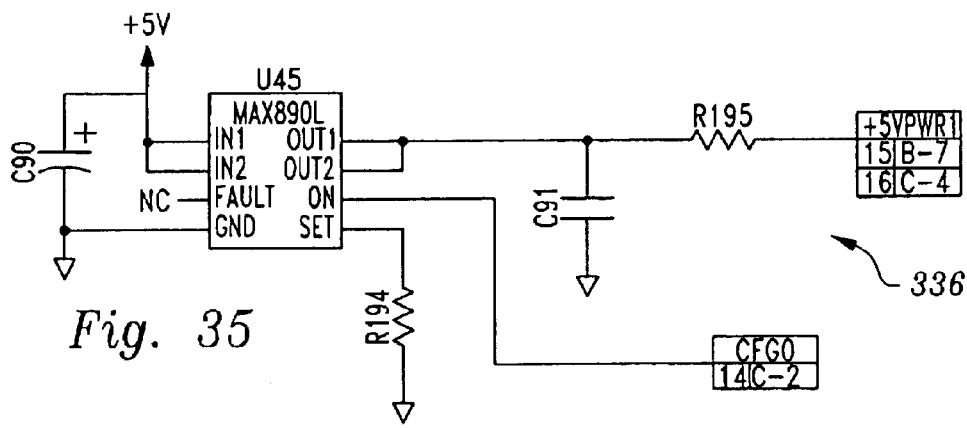
FIGS. 35 and 36 are schematic views of current limited five volt power supply circuits according to the present invention.
Figure 36:
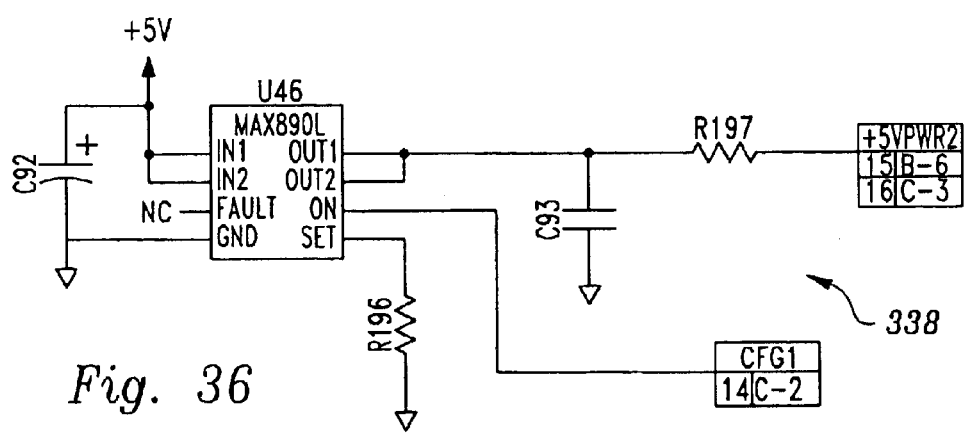

FIGS. 35 and 36 each schematically depict, a current limited positive 5 volt supply that is respectively provided by U45 and U46 and their associated components. These supplies provide a 5 volt power supply to phase reference devices and Auto-point Identification devices via lines +5VPWR1 and +5VPWR2.

Analog Signal Conditioning

Figures 37, 37A, 37B:
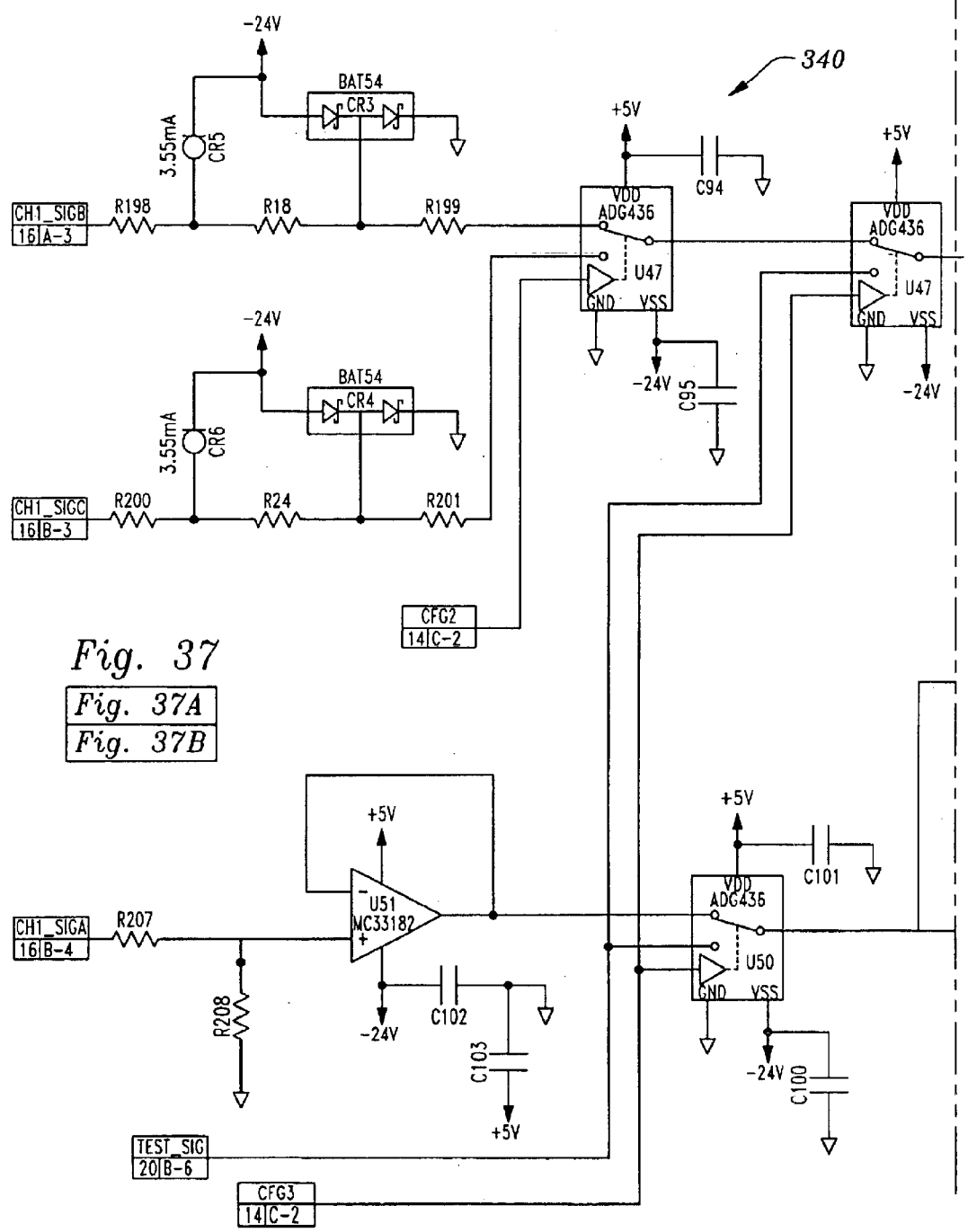
FIG. 37 is a schematic view of a channel one input signal conditioning circuit according to the present invention.
Figure 37B:
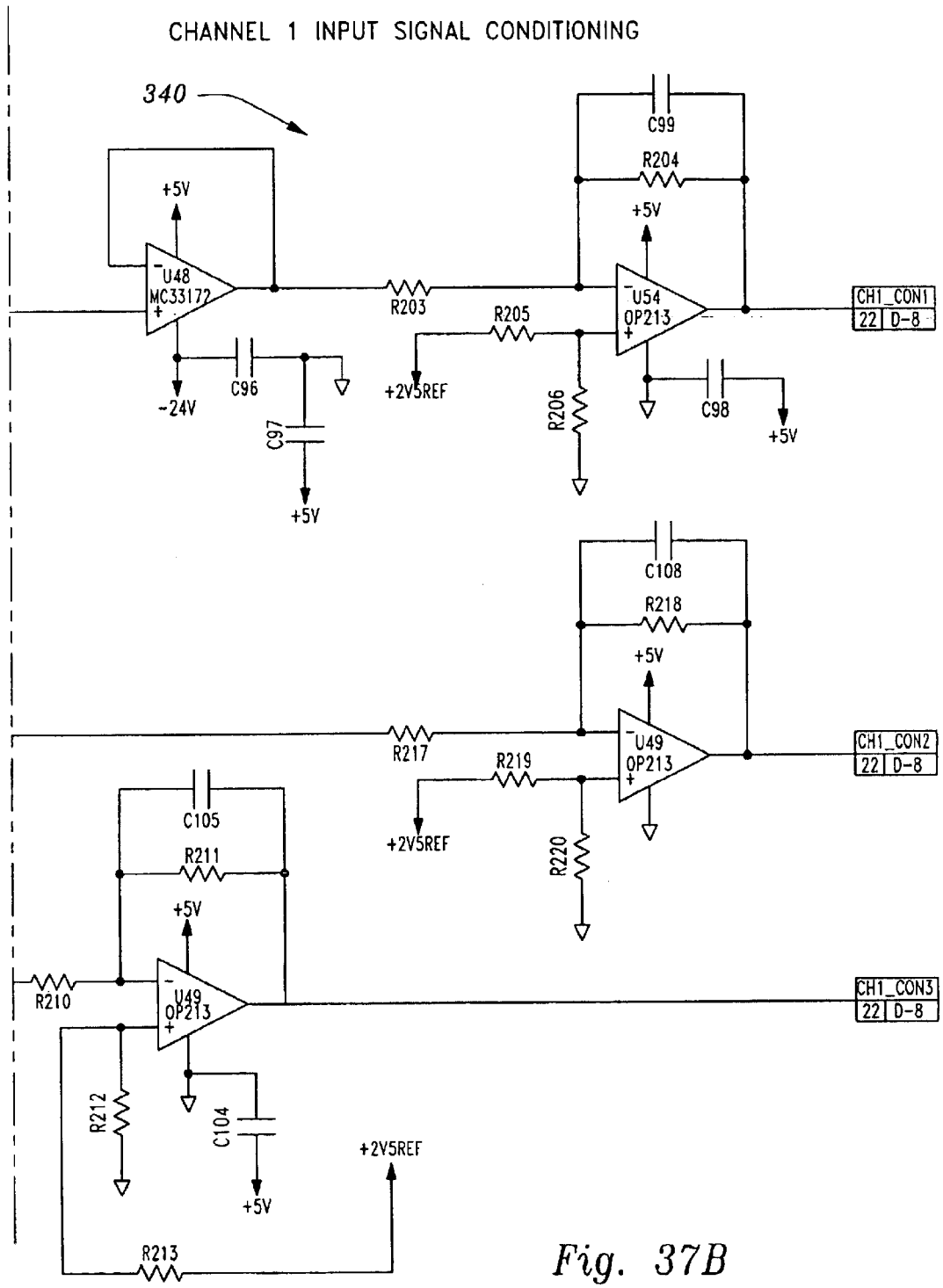
Figure 38B:
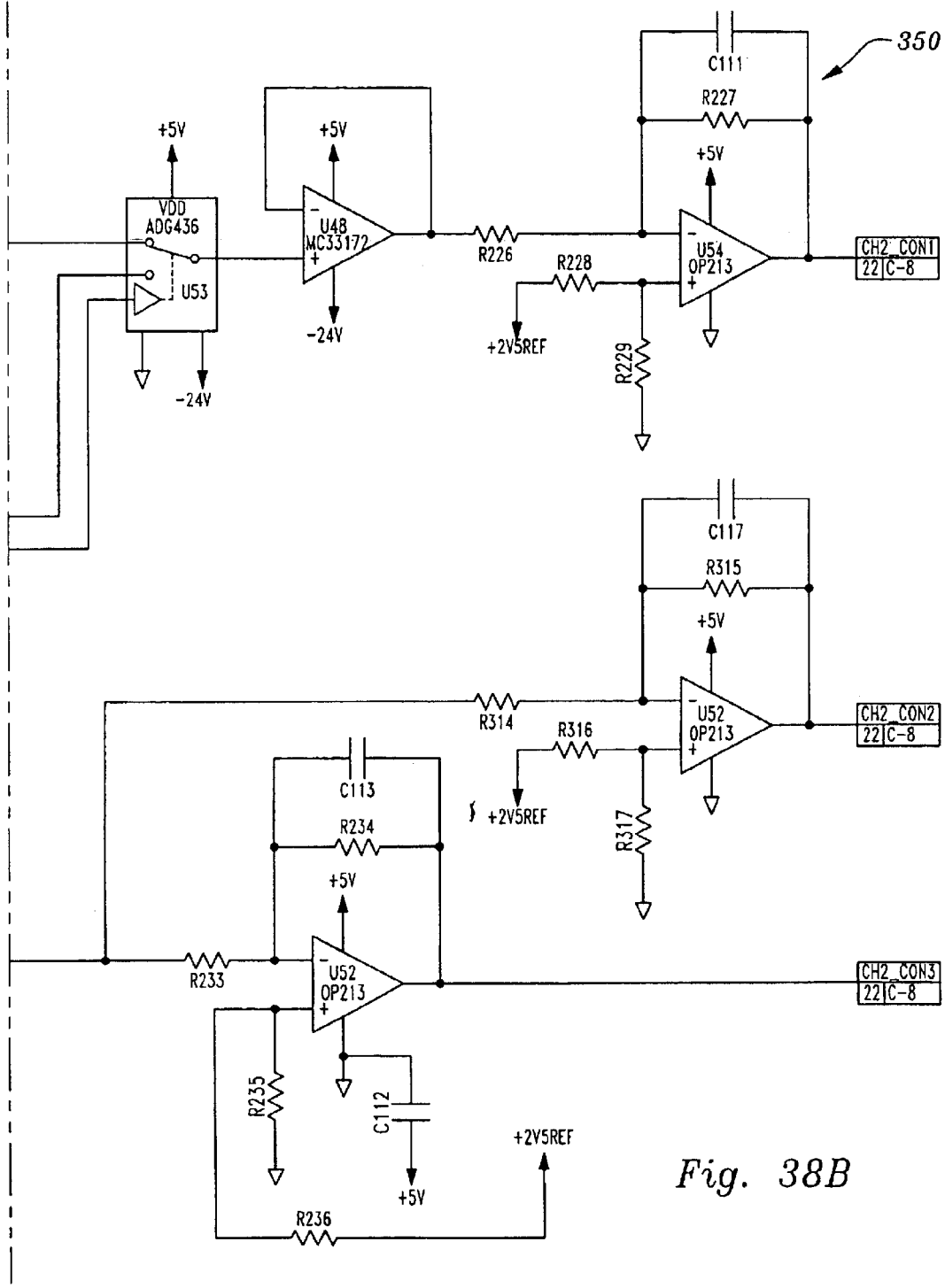
FIG. 38 is a schematic view of a channel two input signal conditioning circuit according to the present invention.

FIGS. 37 and 38 schematically depict the first channel analog signal conditioning circuitry 264 and the second channel analog signal conditioning circuitry 266 shown in FIG. 10.

The first and second channel conditioning circuitry are comprised of circuits 340 and 350 schematically depicted in FIGS. 37 and 38, respectively. Constant current powered acceleration and velocity transducers are supplied by a 3 mA constant current supply that is provided by CR5 and CR6 (FIG. 37) and CR9 and CR10 (FIG. 38).

More specifically, these circuits are identical in function and so as not to burden the record, the description for FIG. 37 will be delineated below with an understanding that it is also applicable for FIG. 38.

There are three external signal input paths: CH1_SIGA, CH1_SIGB and CH1_SIGC. Each of these signal paths is connected via the Field Wiring PWA 140 to a pin on one of the field wiring connectors.

CH1_SIGB and CH1_SIGC are provided for use with constant current powered acceleration and velocity transducers. Selection between the two sources is accomplished using an analog switch U47 such as an Analog Devices ADG436 device, which is controlled by CFG2. CH1_SIGA is used for all general-purpose signal inputs, including displacement, acceleration and velocity transducers that produce voltage outputs in the range negative 24 to positive 10 volts.

Analog switches U47 and U50 controlled by CFG3 are provided as a means of disconnecting the input signal and applying a test voltage, TEST_SIG, to the signal in its place. This is the self-test mechanism wherein a known voltage is applied to each signal path in turn and the measured output is compared against the ideal value to determine whether the signal path is working correctly or not.

CH1_SIGA is passed through U49 such as an Analog Devices OP213 device and its associated components to attenuate it and add an offset to produce CH1_CON2 (for CH1_SIGA in the range of negative 10 to positive 10 volts) and CH1$_{13}$ CON3 (for CH1_SIGA in the range negative 24 to 0 volts). The combination of U48 (e.g., Motorola MC33172), U54 (e.g., Analog Devices OP213) and associated components is used to attenuate the signal from a constant current powered transducer (negative 24 to 0 volts) and add an offset to produce CHl_CON1. This signal conditioning is designed such that the resulting signals are in the range from about plus 1.25 to about plus 3.75 volts. As noted hereinabove, this description is identical for FIG. 38 and thus, one merely need to swap the like nomenclature shown if FIG. 37 for that which is shown in FIG. 38.

More specifically, some transducer types supported by the portable data collector and analyzer apparatus 10 include: proximity sensors or transducers which are non-contacting devices which measure displacement motion and position of an observed conductive target material relative to the probe (e.g., a Proximitor® probe manufactured by Bently Nevada Corporation located in Minden, Nev.), seismic sensors or transducers (e.g., a 9200 Seismic probe manufactured by Bently Nevada Corporation located in Minden, Nev.), velocity sensors or transducers (e.g., a Velomitor® manufactured by Bently Nevada Corporation located in Minden, Nev.), acceleration sensors or transducers (e.g., a 330400 Accelerometer manufactured by Bently Nevada Corporation located in Minden, Nev.), multi-axial acceleration sensors or transducers, generic ICP acceleration sensors or transducers, third party temperature sensors or transducers, buffered transducer signals and generic sensors or transducer inputs (+10 to −24 Vdc).

Figure 39A:
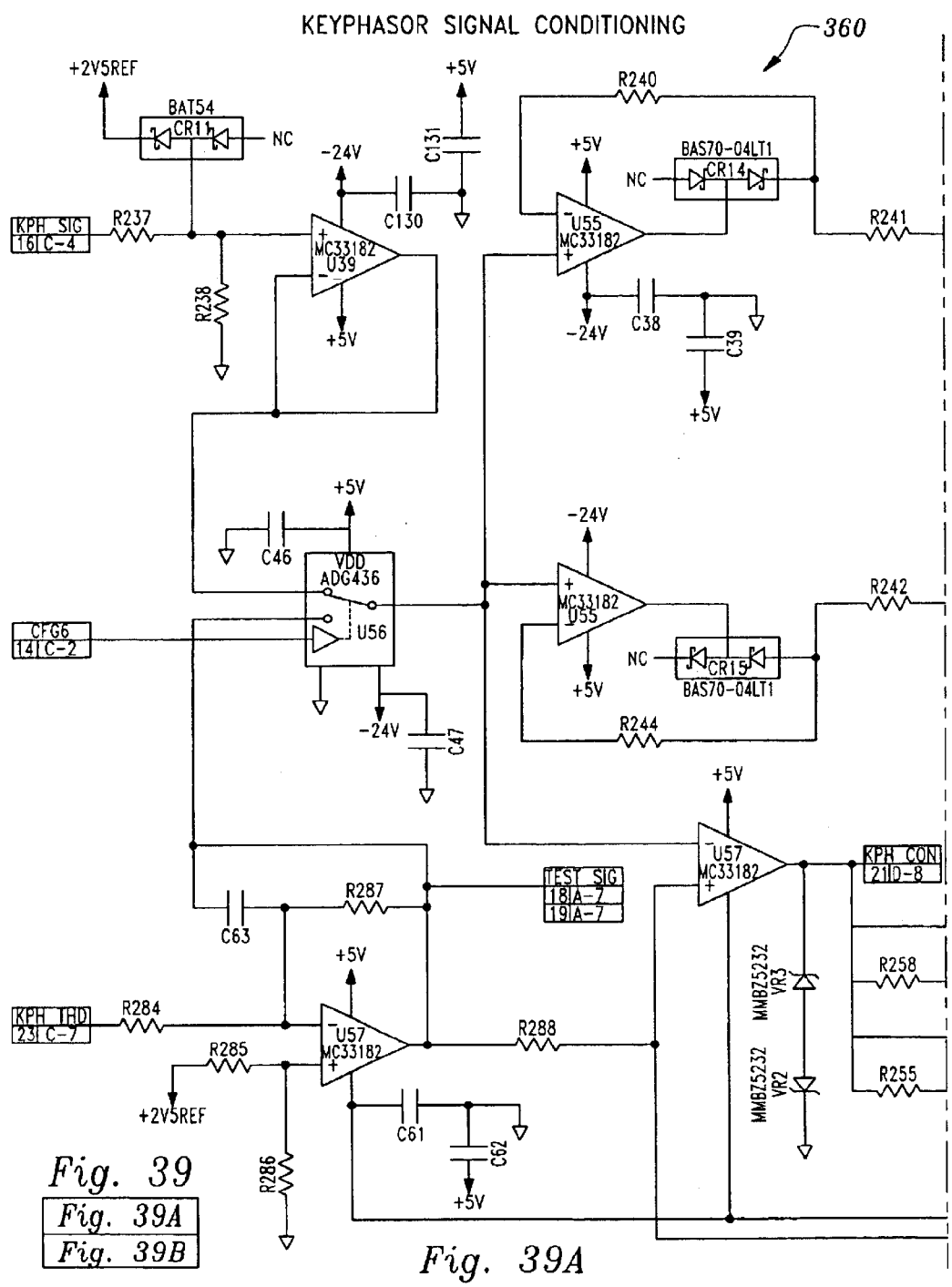
FIGS. 39 and 40 are schematic views of phase reference, shaft encoder, and auto-point ID signal conditioning circuitry according to the present invention.
Figure 39B:
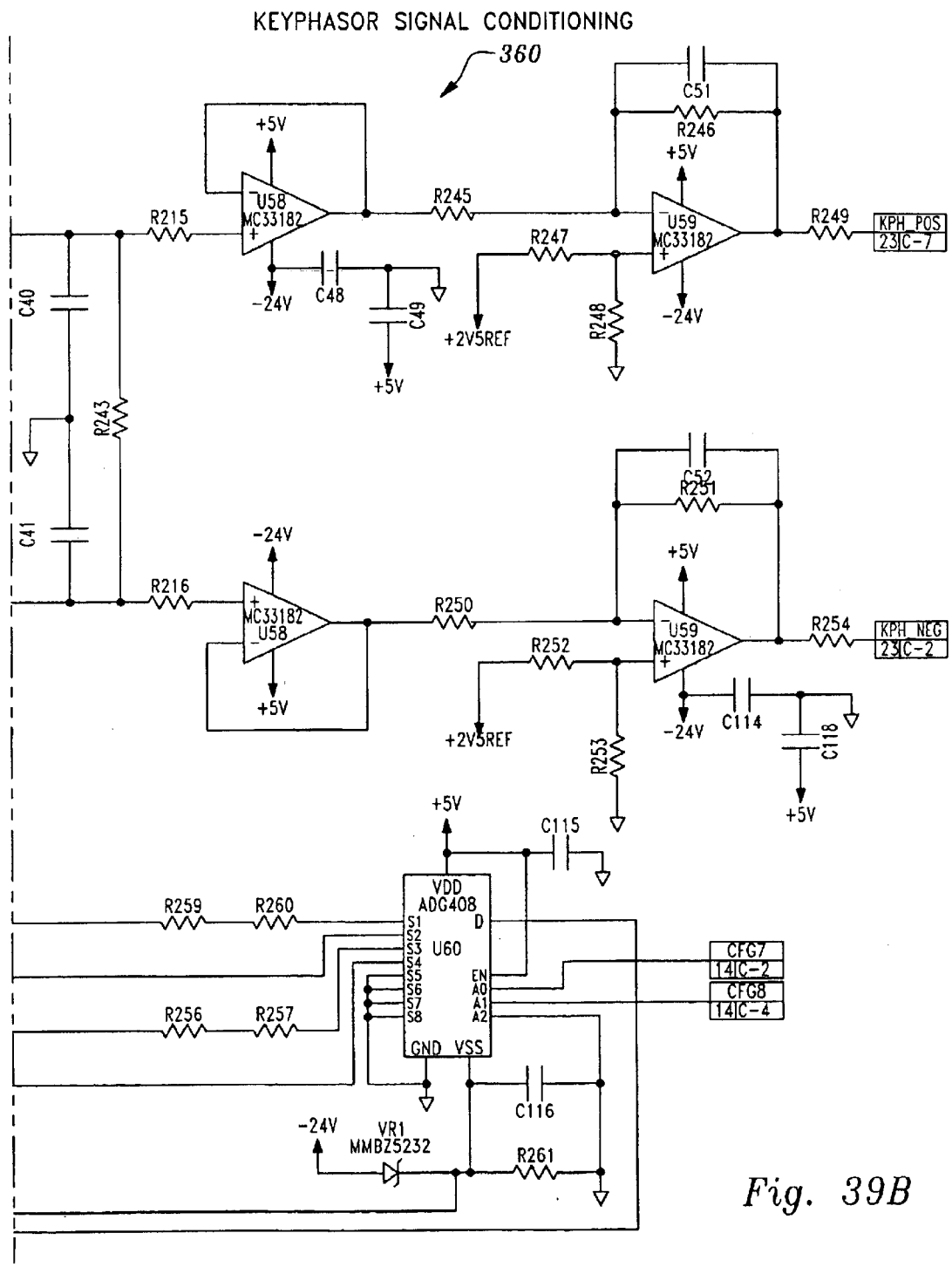
Figure 40:
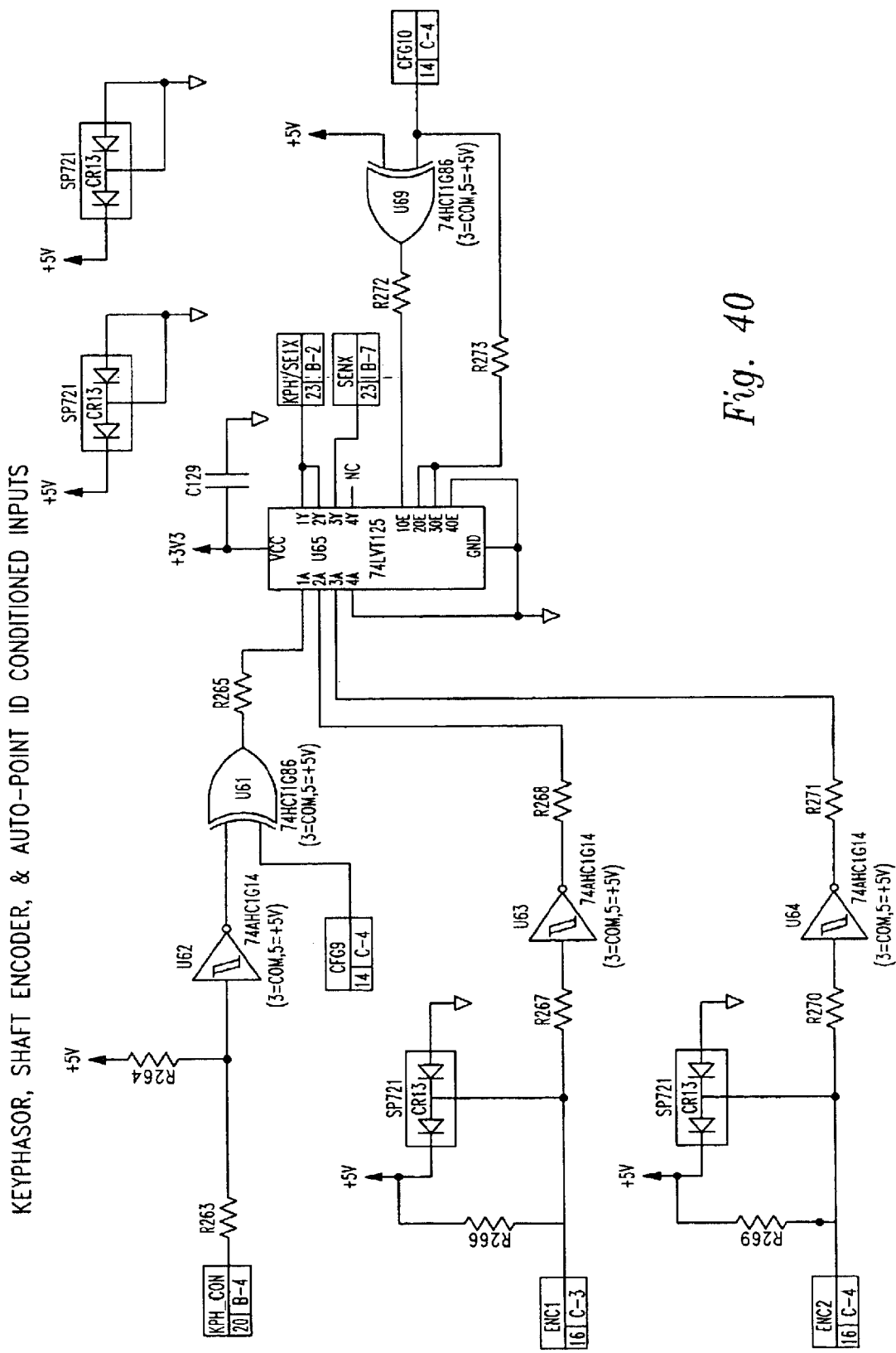

FIGS. 39 and 40 schematically depict the phase reference, shaft encoder, and auto-point ID signal conditioning circuitry 268 shown in FIG. 10.

Phase Reference & Auto-Point ID Signal Conditioning

FIG. 39 schematically depicts a phase signal conditioning circuit 360 that supports phase reference input from single output devices, such as displacement transducers, optical phase references or magnetic pickups, or from dual output devices, such as encoders. Single output devices connect to KHP_SIG line via the Field Wiring PWA 140.

KHP_SIG is attenuated by R237 & R238 and buffered by U39 (e.g., a Motorola MC33182). Analog switch U56 (e.g., an Analog Devices ADG436), controlled by CFG6, is used to disconnect KHP_SIG from the phase signal conditioning circuit 360 so that test voltage, TEST_SIG, can be applied in its place. By applying a known voltage to the signal conditioning circuit, its functionality can be verified.

KPH_THD is the output from a D/A Converter located on the Piggy PWA 170. The DSP 172 controls this D/A Converter. KPH_THD is amplified and an offset applied to produce the variable, DSP controlled, voltage, TEST_SIG.

The output of analog switch U56 is passed through a positive peak detector circuit formed by U55 (e.g., a Motorola MC33182), CR14, R240, R241 and C40. It is also passed through the negative peak detector circuit formed by U55 (e.g., a Motorola MC33182), CR15, R242, R244 and C41. R243 is used to discharge the peak detectors at such a rate that the circuit responds to input signal amplitude changes quickly, while retaining charge for sufficient time to allow the attenuated and level shifted outputs KHP_POS and KHP_NEG to be sampled accurately by the A/D Converters on the Piggy PWA 170. KHP_POS and KPH_NEG are conditioned such that, for an input voltage in the range of about a negative 24 to about a positive 10 volts, they are in the range 0 to plus 2.5 volts.

The output of analog switch, U56, is also passed through comparator U57. Analog Multiplexer U60 (e.g., Analog Devices ADG408) in conjunction with R255 to R260 and associated components allows the introduction of a hysteresis voltage level selectable using CFG7 and CFG8. Zener diodes VR2 and VR3 prevent the comparator output voltage exceeding plus or minus 6.5 volts so that amplified speed limitations do not affect the overall circuit frequency response. The output of the comparator, KPH_CON, passes through R263 and R264 to ensure that the voltage level at the input of a Schmitt Inverter U62 (e.g., a Texas Instruments 74AHC1G14 device) is within the allowable range. A XOR gate U61 (e.g., a Texas Instruments 74HCT1G86 device) and CFG9 allow the output of U57 to be selectively inverted or buffered.

Referring to FIG. 40, dual output devices connect to ENC1 and ENC2 lines. The ENC1 and ENC2 lines, which are typically open drain outputs from an encoder type phase transducer, are pulled up to plus 5 volts using R266 and R269. CR13, R267 and R270 provide transient over-voltage protection for U63 and U64 (74AHC1G14 devices). R265, R268 and R271 protect U65 (e.g., a Texas Instruments 74LVT125 device) from latching up if plus 5 volts power and plus 3.3 volts power are not applied simultaneously. Buffer U65, controlled by CFG10 in conjunction with U69, is used to select either KPH_CON or ENC1 and ENC2 as the sources of KPH/SEIX and SENX. These signals are routed to the Piggy PWA 170 where they are connected to two of the DSP interrupt inputs.

Shaft encoder transducers are typically used with reciprocating compressor type machines thereby allowing the present invention to perform condition monitoring of this machine type.

Figure 41:
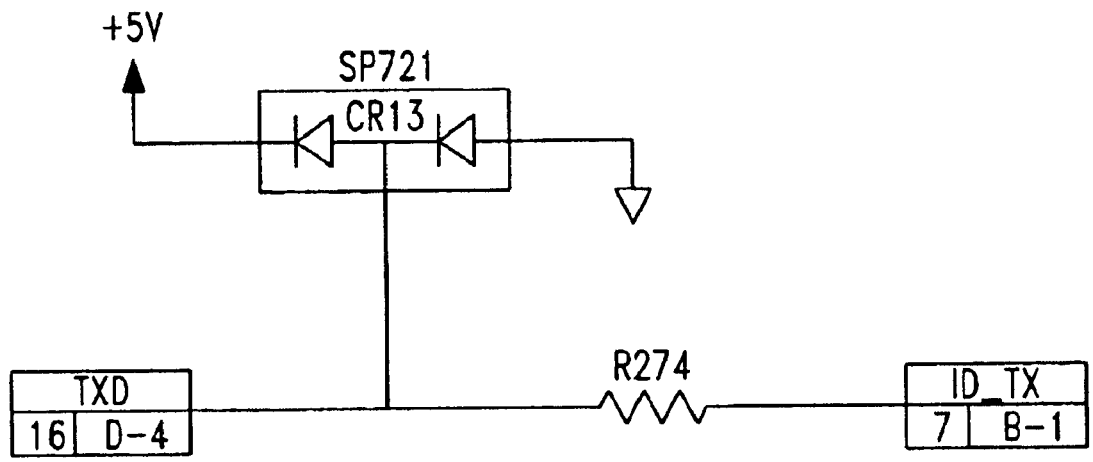
FIGS. 41 and 42 are schematic views of transient over-voltage protection circuitry according to the present invention.
Figure 42:
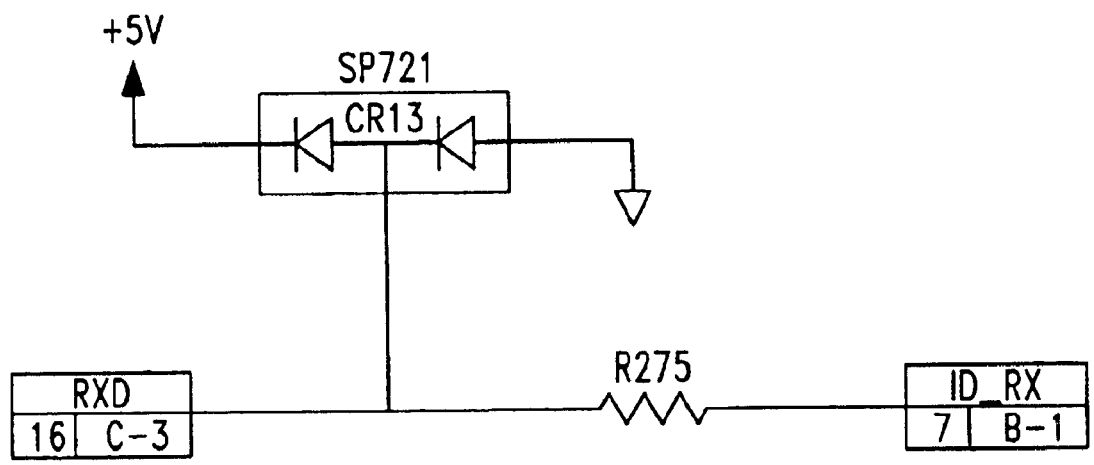

Referring to FIGS. 41 and 42, CR13, R274 and R275 provide transient over-voltage protection for the signal inputs from the Auto-Point ID device.

System configuration and self test registers circuitry 260, field wiring board connector 274 and the DSP board connector 276 also shown in FIG. 9.

Hence, the portable data collector and analyzer apparatus 10 includes separate conditioned channels for timing transducer or phase reference transducer signals and an Auto-point Identification route management system in addition to supporting the two conditioned transducer input channels for providing dynamic signal measurements. An example of a phase reference transducer is a Keyphasor® transducer that is manufactured by Bently Nevada Corporation located in Minden, Nev.

Figure 43:
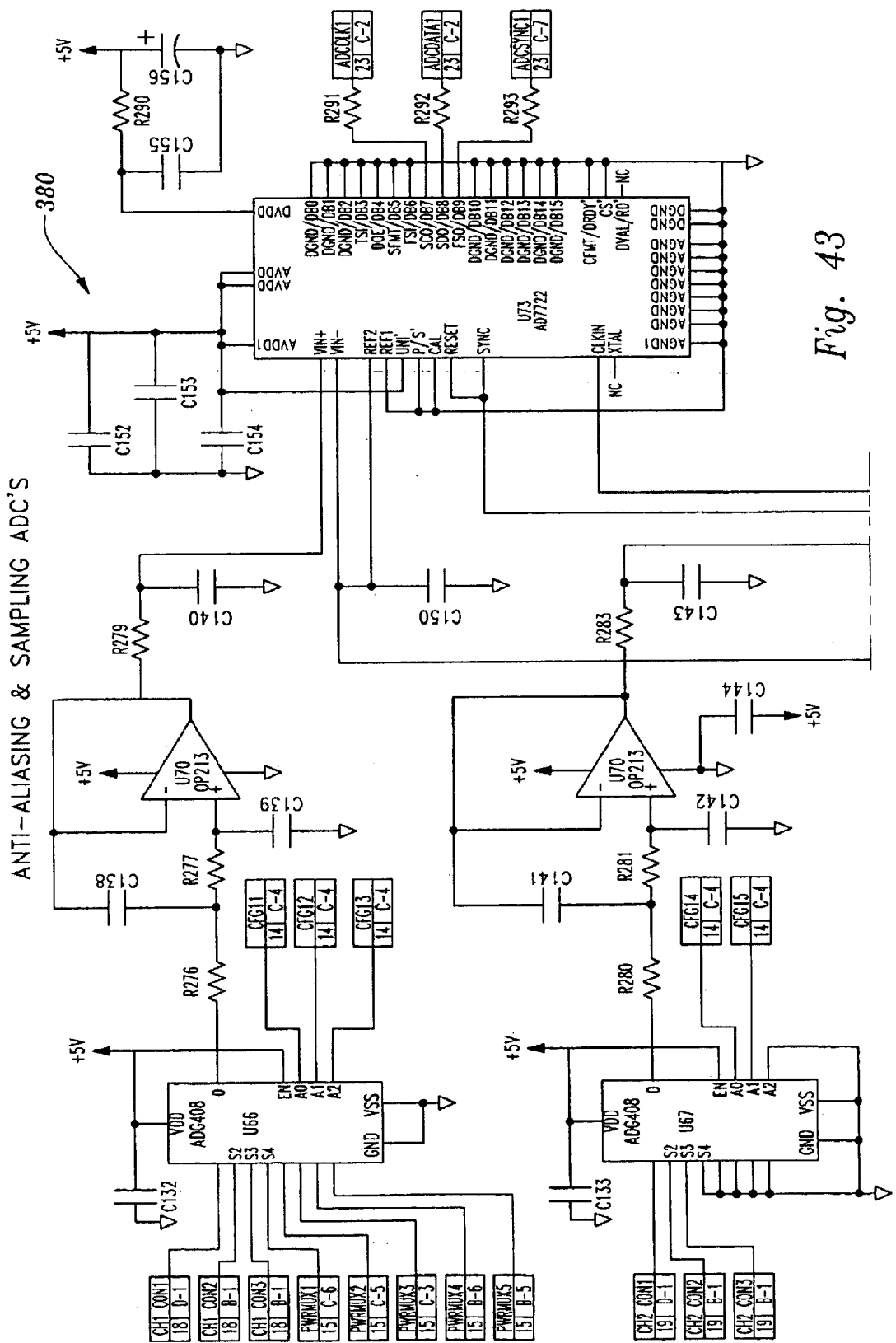
FIGS. 43 and 44 are schematic views of anti-alias filtering and sampling circuitry according to the present invention.
Figure 44:
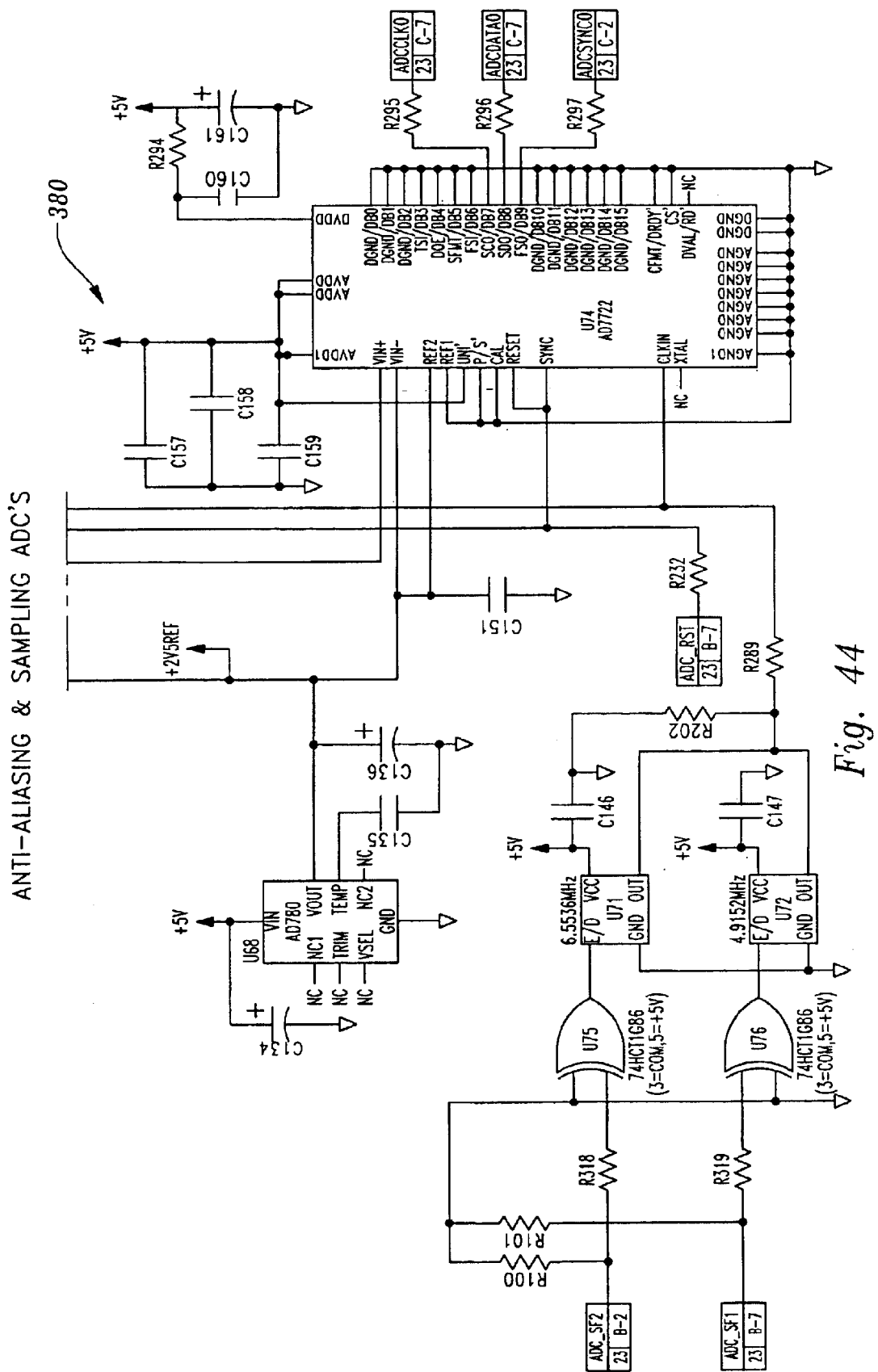
Figure 45:
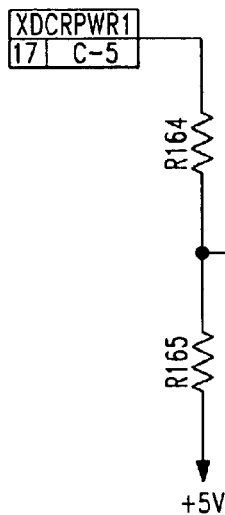
FIGS. 45 through 49 are schematic views of transducer supply node voltage circuits according to the present invention.
Figure 46:
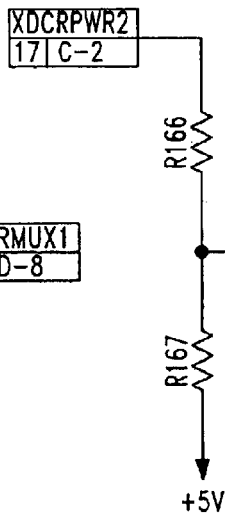
Figure 47:
Figure 48:
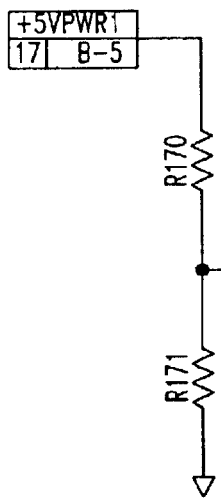
Figure 49:

FIGS. 43 and 44 schematically depict the first channel anti-alias filtering and sigma-delta analog to digital converter circuitry 270 and the second channel anti-alias filtering and sigma-delta analog to digital converter circuitry 272 shown in FIG. 10.

Anti-Alias Filtering and Analog to Digital Converters

More specifically, FIGS. 43 and 44 schematically show an anti-alias filtering and sampling circuit 380. CH1_CON1, CH1_CON2, CH1_CON3, CH2_CON1, CH2_CON2 and CH2_CON3 from the analog signal conditioning circuits 340 and 350 are input to a pair of multiplexers U66 and U67 (e.g., Analog Devices ADG408 devices). These are controlled by CFG11 to CFG15, allowing selection of one source from each channel to be connected to the output of the multiplexer. In addition to $CH1_{13}CON1$, 2 and 3 the channel A multiplexer (U66) also has inputs from FIGS. 45 through 49.

Specifically, FIGS. 45 through 49 are simple resistors circuits that output fixed voltages derived from the transducer power supply circuits that are delineated hereinbelow. During self-test the DSP measures these voltages using the A/D Converters U73 and U74 to determine whether they are within an acceptable voltage range.

The output from each multiplexer is connected to an anti-alias filter. For channel A this is comprised of U70 (e.g., a Analog Devices OP213 device), R276, R277, C138 and C139. These components form a 2-pole Butterworth response low-pass filter with a negative 3 dB frequency of 150 kHz. This is sufficient to ensure that input signals of sufficient frequency to cause aliasing are rejected and the 2-pole response ensures that A/D Converter clock frequencies cannot cause aliasing either. The Analog Devices AD7722 A/D Converter U73 requires the combination of R279 and C140. For channel B this is comprised of U70 (e.g., a Analog Devices OP213 device), R280, R281, C141 and C142. These components form a 2-pole Butterworth response low-pass filter with a negative 3 dB frequency of 150 kHz. This is sufficient to ensure that input signals of sufficient frequency to cause aliasing are rejected and the 2-pole response ensures that A/D Converter clock frequencies cannot cause aliasing either. The Analog Devices AD7722 A/D Converter U74 requires the R283 and C143 combination.

A voltage reference device U68 (e.g., an Analog Devices AD780 device) and associated components provides a stable 2.5 volt reference for the A/D Converters, U73 and U74, and is also used to generate voltage offsets for the analog signal conditioning circuits 340 and 350.

Figures 50, 50A:
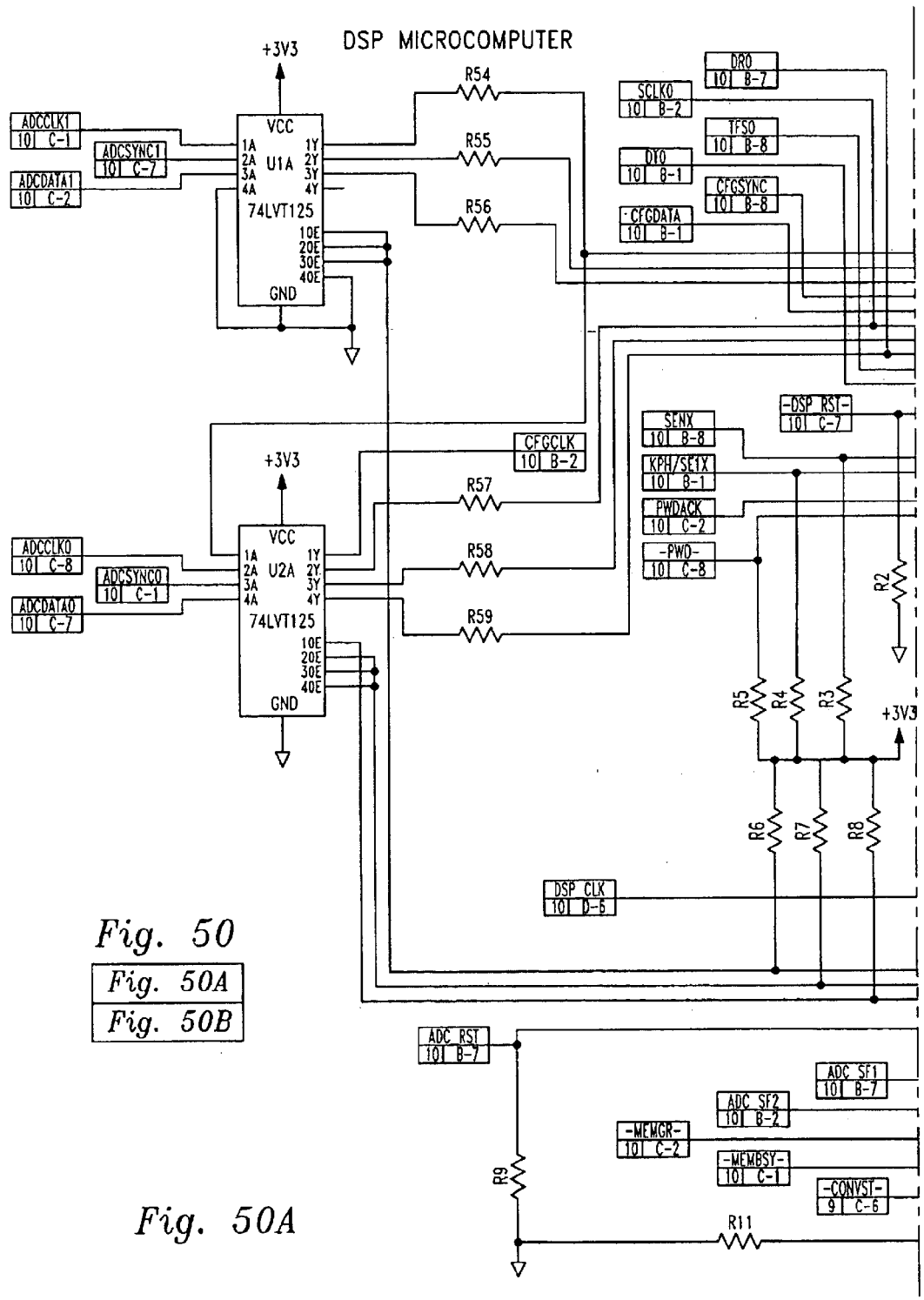
FIG. 50 is a schematic view of one embodiment of a digital signal processor (DSP) according to the present invention.
Figure 50B:
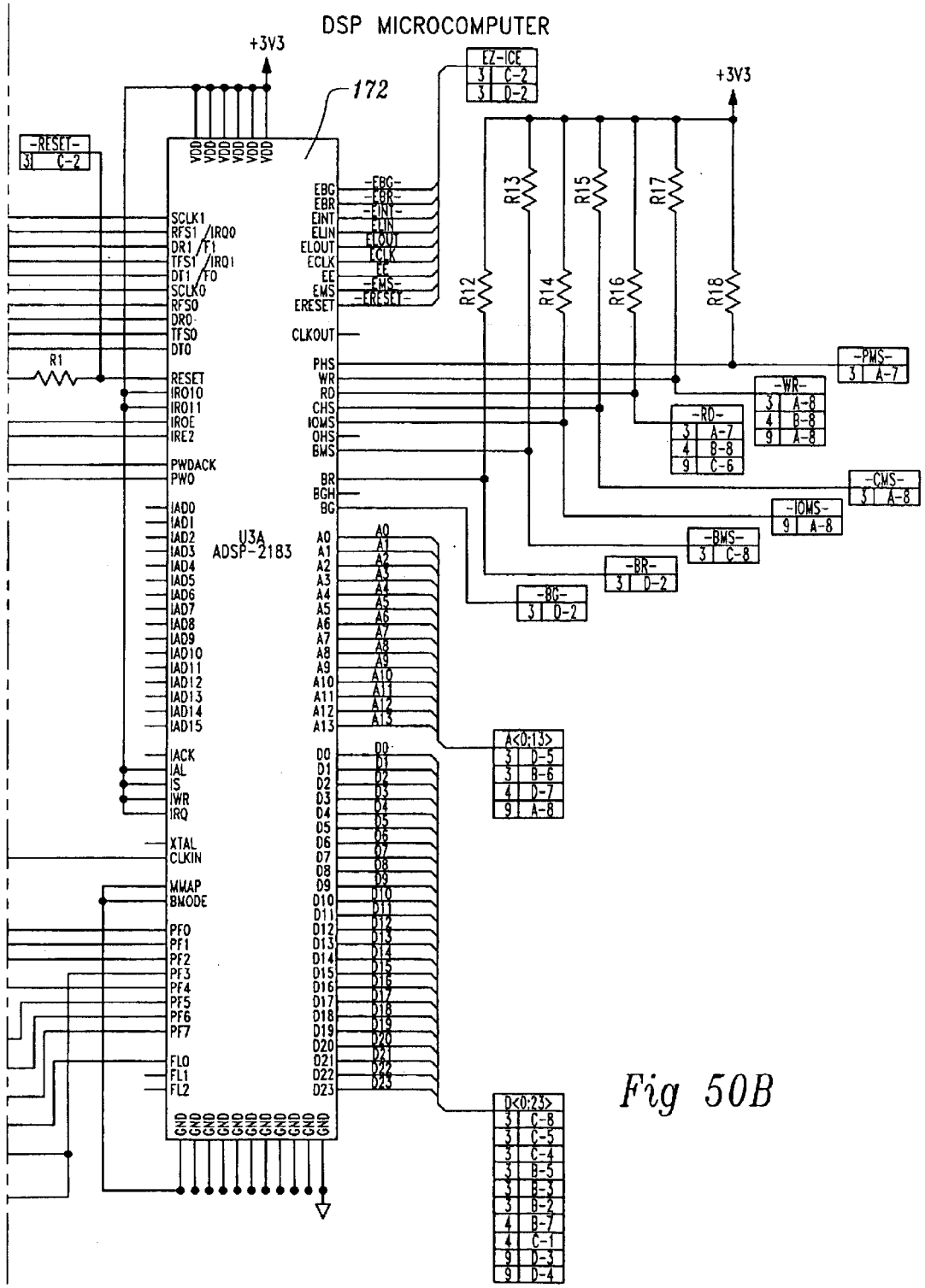

Referring to FIG. 50, ADC_SF1 and ADC_SF2 are DSP outputs that are used to select which of oscillators U71 and U72 (see FIG. 44) are active. U75 and U76 (see FIG. 44) are used to translate the positive 3.3 volt DSP output to a positive 5 volt logic level suitable for use as an input for the oscillators. The selected oscillator is used to clock the A/D Converters. Frequencies of either 6.5536 MHz or 4.9152 MHz are used to provide output data rates of 102.4 ksps or 76.8 ksps. The serial outputs of the A/D Converters U73, U74 are connected to the DSP (on the Piggy PWA 170) via serial protection resistors R291 to R293 and R295 to R297. These resistors protect against power supply sequencing problems.

Piggy PWA

Each block of FIG. 7 will now be delineated in detail. At the outset, and as mentioned hereinabove, the Piggy PWA 170 includes the Digital Signal Processor (DSP) 172 or U3A, the DSP memory including program and data memory 174 and byte memory 176, the DSP and microcontroller shared memory 178, the microcontroller 8-bit memory 180, the LCD interface and contrast control circuitry 182, the keypad interface circuitry 188, the phase threshold voltage generation circuitry 192 and the piggy to main board connector 194.

The DSP Micro-computer

Referring to FIG. 50, the DSP micro-computer 172 preferably performs all of the signal processing necessary for the input type in use. In one preferred form, the DSP 172 is an Analog Devices ADSP-2183 device operating from a 3.3 volt supply and employing built-in power management capabilities to meet the low power requirements of battery operated equipment. In addition to its computational capabilities the device also contains two on-board serial ports, several general purpose input/output pins and a debug interface.

The DSP is clocked by DSP_CLK signal output via U16 and produced from the 20 MHz clock oscillator U18 on the Main PWA 240 (please see FIG. 21).

The DSP reset input is controlled by the microcontroller 280 on the Main PWA 240 via DSP_RST output and line (please see FIG. 17). This allows the microcontroller 280 to assert the reset signal when required.

The programmable input/output pins of the DSP are used to control various hardware functions.

The debug port provides a means by which fault finding can be performed on the DSP program.

The two serial ports of the DSP 172 are connected to the A/D Converters U73, U74 on the Main PWA via buffers U1A and U2A. Specifically, the serial outputs of the A/D Converters U73, U74 are connected to the DSP via buffers U1A and U2A and via serial protection resistors R291 to R293 and R295 to R297. Buffers U1A and U2A provide 5 volt tolerant inputs and 3 volt outputs suitable for interfacing to the DSP 172. R54 to R59 in FIG. 50 are required to reduce the overshoot of the A/D Converter signals. Excessive overshoot causes the DSP serial ports to behave erratically. The DSP 172 controls the A/D Converter sampling frequency using ADC_SF1 and ADC_SF2. It is possible to disable the A/D Converters completely using these control signals. In addition to receiving A/D Converter outputs, the DSP serial ports are also used to write configuration data to serial configuration registers of the configuration circuitry 324 (please see FIG. 30) on the Main PWA, and to read/write calibration values to an EEPROM U30, which is also located on the Main PWA and shown in FIG. 26.

Program Data & Byte Memory

Figure 51:
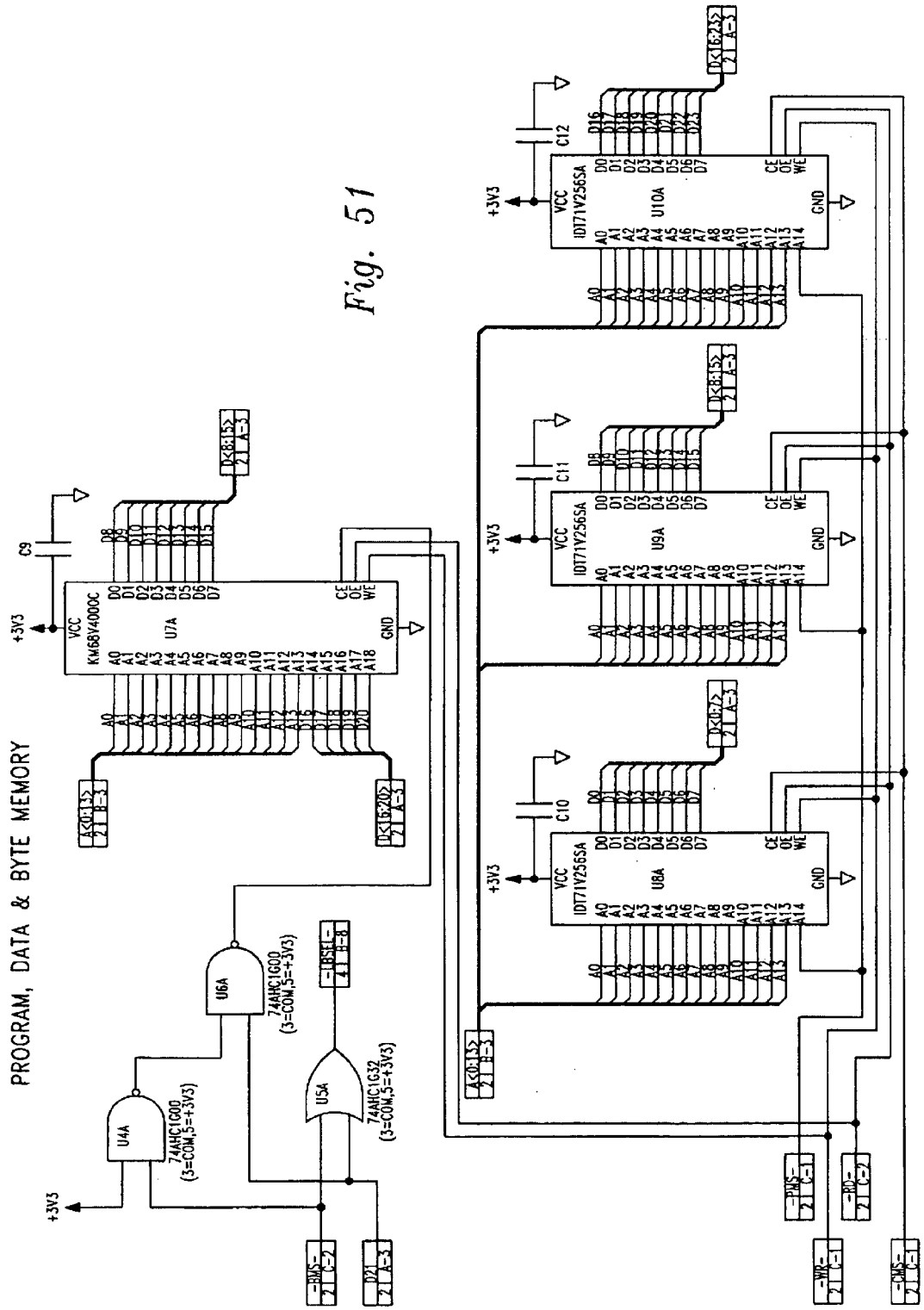
FIG. 51 is a schematic view of one embodiment of program, data and byte memory according to the present invention.

Referring to FIG. 51, the program and data memory 174 is comprised of U8A, U9A and U10A. These are 32 k×8 bit static RAM devices (e.g., Integrated Device Technologies 71V256 devices). These are high-speed devices used by the DSP 172 for program storage and storage of other parameters required by the DSP 172 during signal processing calculations. For example, the program and data memory can be used storage of code, filter coefficients and small temporary variables. U8A, U9A and U10A are preferably arranged to form a 32 k×24 bit storage area.

Figure 52B:
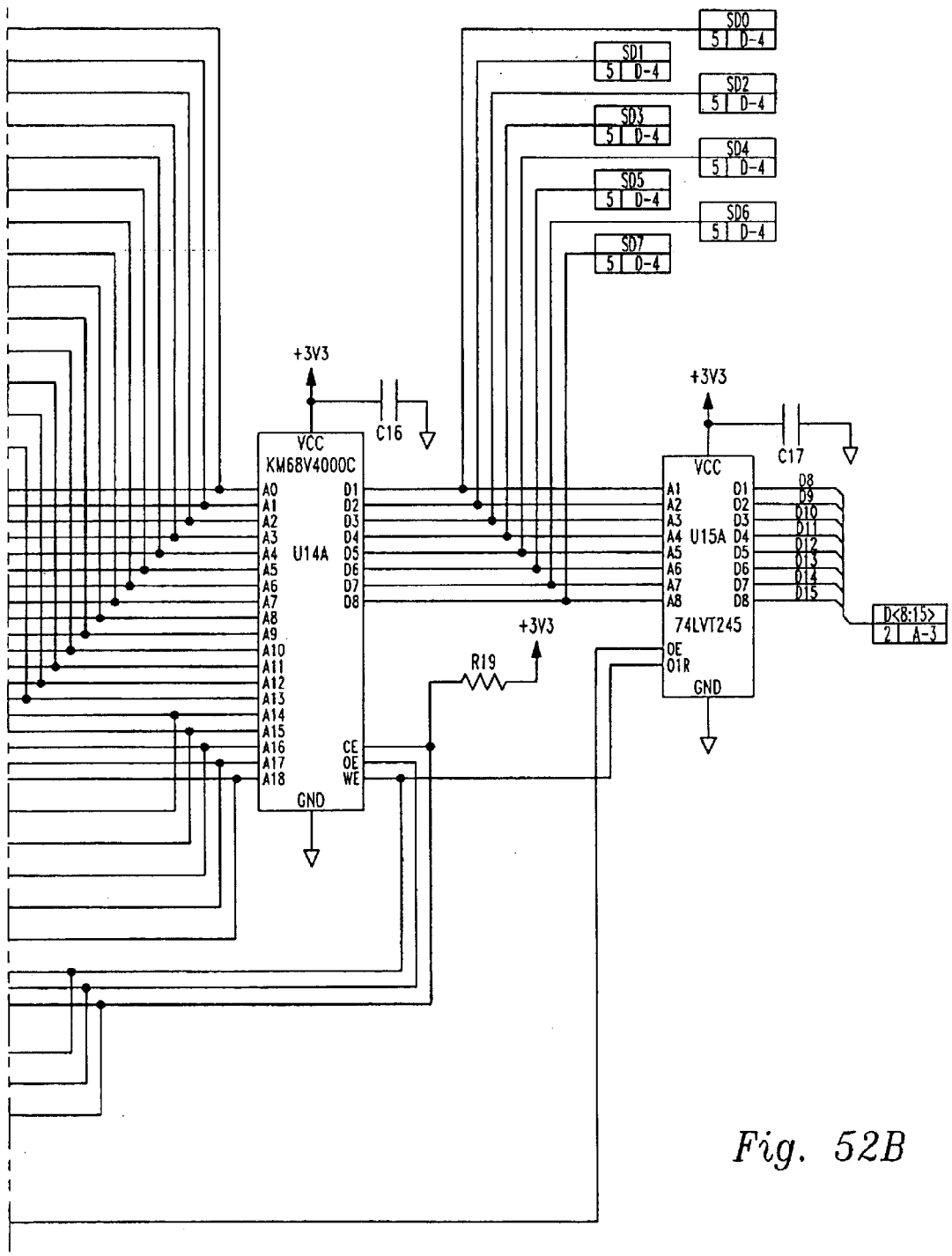
FIG. 52 is a schematic view of one embodiment the DSP and microcontroller shared memory according to the present invention.

The byte memory 176 comprises U7A shown in FIG. 51 and U14A shown in FIG. 52. These are 512 k×8 bit static RAM devices (e.g., Samsung KM68V4000 devices). These devices are slower than Program memory and therefore are used to store values not in a time critical path. For example, the external byte memory can be used for storage of fast fourier transforms, temporary waveforms, and averages. The upper 512 kByte of Byte memory U7A is dedicated for use by the DSP 172 for storage of temporary waveform data, spectrum data and averages. Referring to FIG. 51, the address decoding is performed by U4A, U5A and U6A (e.g., U4A and U5A are Texas Instruments 74AHC1G00 devices and U6A is a 74AHC1G32 device). When D21 is high and -BMS- is low, U7 is enabled. -LBSEL- is driven low to enable the lower 512 kByte of Byte memory only when both D21 and -BMS- are low.

DSP and Microcontroller Shared Memory

Referring to FIG. 52, the DSP and microcontroller shared memory 178 is comprised of U14A. As noted, U14A is a 512 k×8 bit static RAM device (e.g. a Samsung KM68V4000 device). U14A is mapped into the lower 512 k of DSP Byte memory and also mapped into the microcontroller memory space. Buffers U11, U12 and U13 (e.g., Texas Instruments 74LVT573 devices) and U15 (e.g., Texas Instruments 74LVT245 device) are designed to allow the DSP address and data bus to be isolated from U14A so that the microcontroller 280 can also access this area of RAM without affecting DSP operation. Specifically, these buffers are enabled when the DSP 172 requires access to this memory if -LBSEL- and -MEMGR- are both driven low. -MEMGR- and -MEMBSY- (please see FIG. 50) are used by the DSP 172 and the microcontroller 280 to control which device has control of the shared memory area. When the microcontroller 280 is not accessing shared memory it drives -MEMGR- low. Once the DSP 172 starts to access shared memory it drives -MEMBSY- accordingly.

This memory serves two important purposes. Firstly, on power up or as required, the microcontroller 280 can use the shared memory to transfer program code to the DSP 172. While holding the DSP 172 in reset the microcontroller 280 has sole access to this area of memory and DSP code can be written into the RAM. When the DSP reset signal is de-asserted by the microcontroller 280, the DSP 172 boots from shared RAM. This way the microcontroller 280 can control the way the DSP operates at any time. Once the DSP 172 is running, it can copy program code from shared memory into its internal memory or into program memory and use the shared memory area to transfer data between the DSP 172 and the microcontroller 280. This is the mechanism used to transfer measurement configurations and results between the two processors.

For example, when the DSP is required to perform a signal processing operation the DSP algorithms and coefficients will be loaded into the shared memory area. The -MEMGR- signal will be asserted giving the shared memory to the DSP 172. The DSP 172 will then be taken out of power down mode by asserting the -DSP_RST- signal and de-asserting the -PWD- signal. The DSP 172 will then be taken out of reset by de-asserting the -DSP_RST- signal. The DSP 172 will boot up and perform the necessary processing, storing the results in the shared memory. The DSP 172 de-asserts the MEMBSY signal to indicate it has finished using the shared memory. The microcontroller 280 may now de-assert the MEMGR signal, check the shared memory to see if the desired results have been written and if so, extract the results. The microcontroller 280 may now de-assert the -MEMGR- signal and extract the results from the shared memory. The microcontroller 280 will then initiate a power down sequence on the DSP 172 by asserting the -PWD- signal. The DSP 172 will assert the -PWDACK- signal to inform the microcontroller 280 that it is now in power down mode.

Microcontroller Shared Memory & 8-bit Memory

Figure 53:
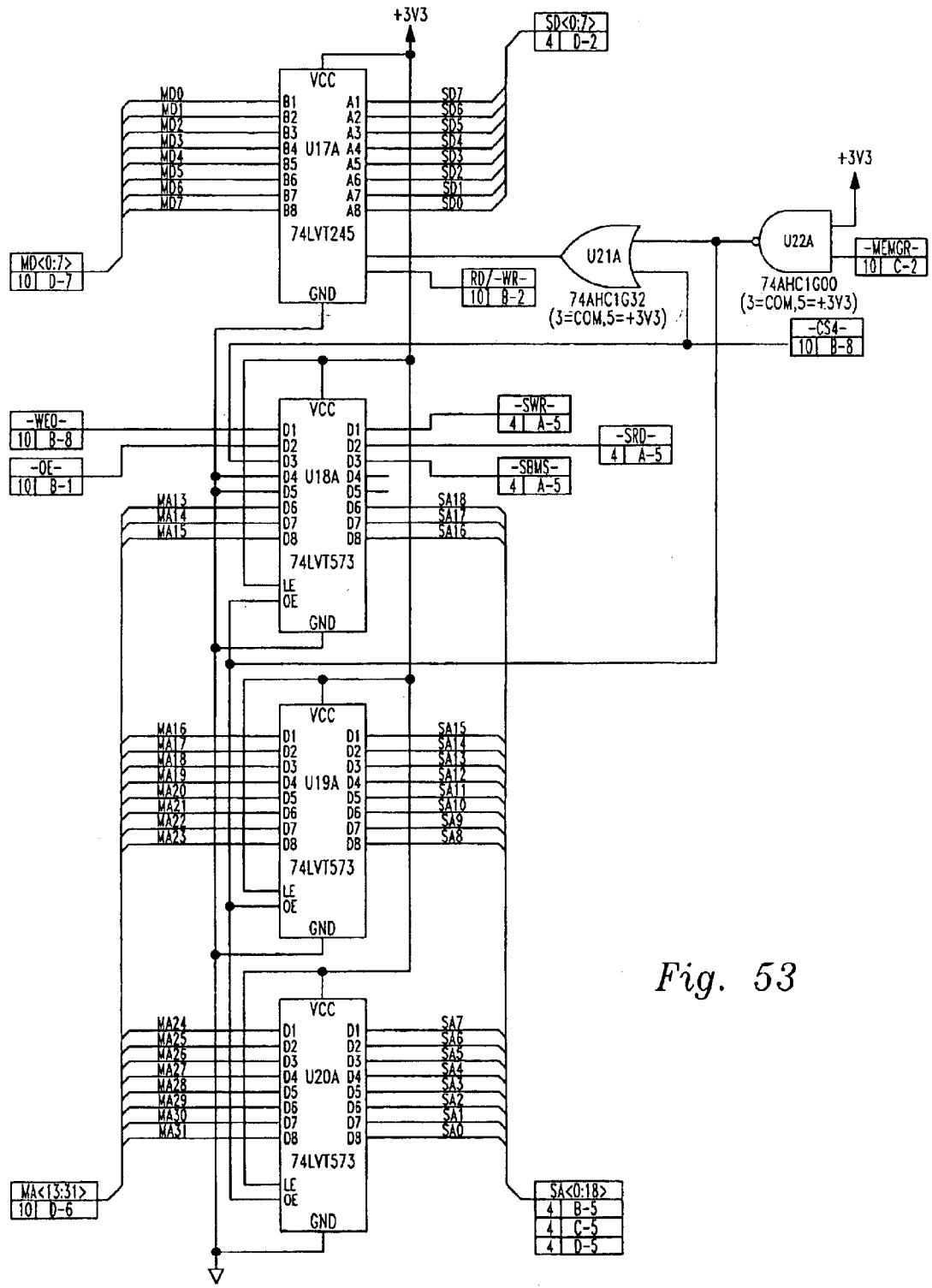
FIG. 53 is a schematic view of one embodiment of shared memory buffers according to the present invention.

Referring to FIG. 53, buffers U17A, U18A, U19A, and U20A are (U17 to U20) used to isolate the microcontroller 280 address and data busses from the shared memory when the microcontroller 280 does not have access to this area of memory. These buffers are enabled when the microcontroller 280 -MEMGR- output and the microcontroller 280 -CS4- control lines are both driven low. Device U21 and U22 accomplish this decoding. In one example, U17A through U20A are buffers manufactured by Texas Instruments and sold under part number 74LVT573. Additionally, and for example, U21 and U22 are both manufactured by Texas Instruments and sold under part numbers 74ACH1G32 and 74ACH1G00, respectively.

Figure 54B:
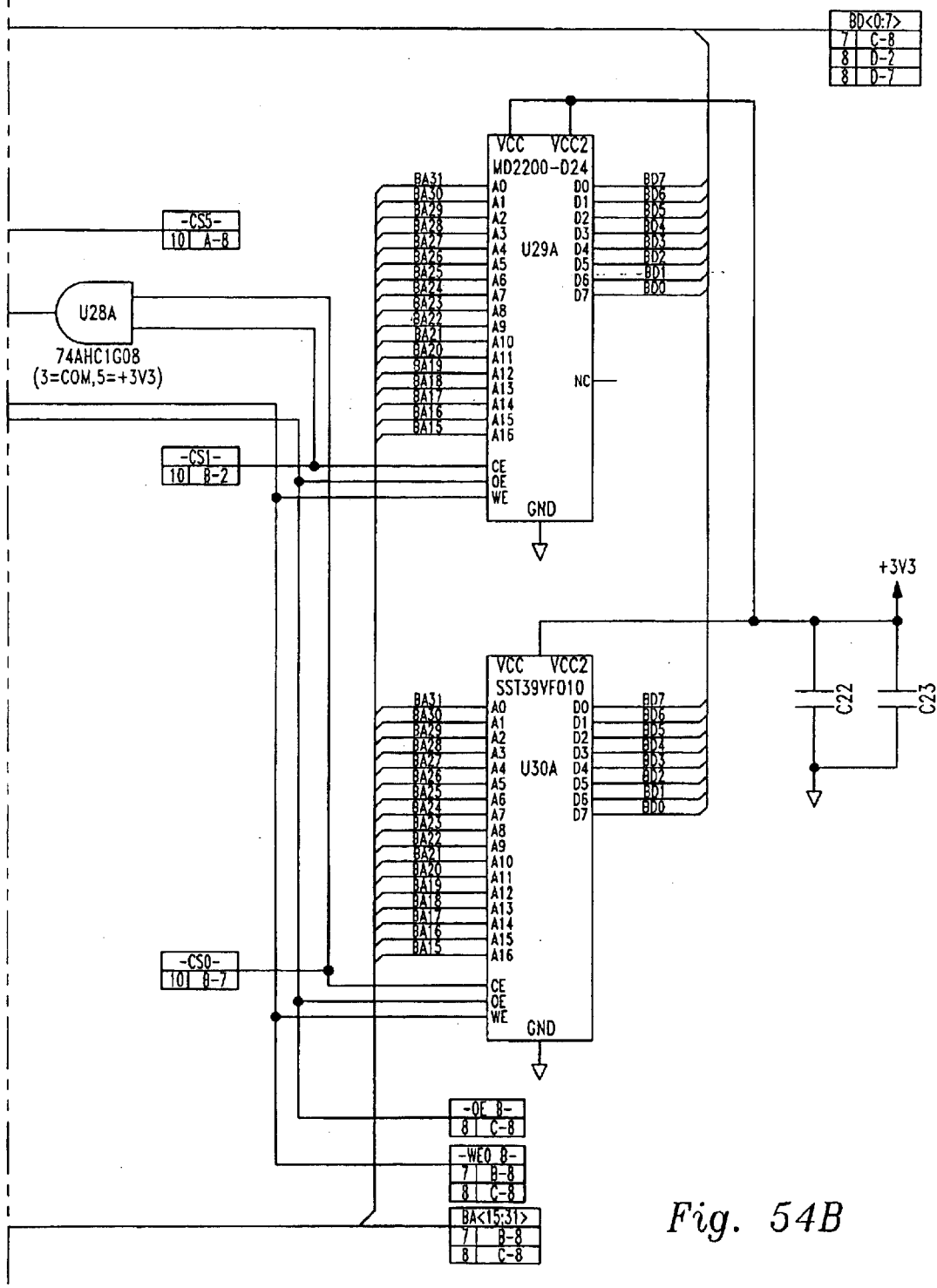
FIG. 54 is a schematic view of one embodiment of microcontroller buffers, microcontroller boot EEPROM and a large capacity non-volatile memory device according to the present invention.

FIG. 54 schematically shows the 8-bit memory 180 for the microcontroller 280. Buffers U23A, U24A, U25A, and U26A are designed to minimize bus loading due to the number of devices on these bus lines. These buffers are enabled by the address decoding logic devices U27 and U28. If any of -CS0-, -CS1- or -CS5- are driven low, the buffers will be enabled. In one example, U23A, U24A, U25A, and U26A are buffers manufactured by Texas Instruments and sold under part number 74LVT573.

-CS0- is used to enable the microcontroller boot EEPROM U30A. In one example, this is a SST 39VF010 128 k×8 bit flash device manufactured by Texas Instruments. It is used to store a small program used to initialize the microcontroller 280 on power up. This code also copies the Windows® CE operating system from non volatile memory, which is relatively slow, to faster SDRAM (on the Main PWA 240) before executing it.

-CS1- signal and line is used to enable the M-Systems DiskOnChip (MD2200-D24) storage device U29A. This non-volatile memory device is a large capacity device used to store the Windows® CE operating system, application software and measurement results. It has a capacity of 24 Mbyte and can be upgraded to 48 MB if necessary. This device is important to the system design as, due to its non-volatile nature, data from measurement results or user input can be permanently retained, even in the event of a complete loss of unit power. The use of the M-Systems device reduced development effort as drivers for it are incorporated into the Windows® CE operating system.

LCD Interface & Contrast Control

Figures 55, 55A:
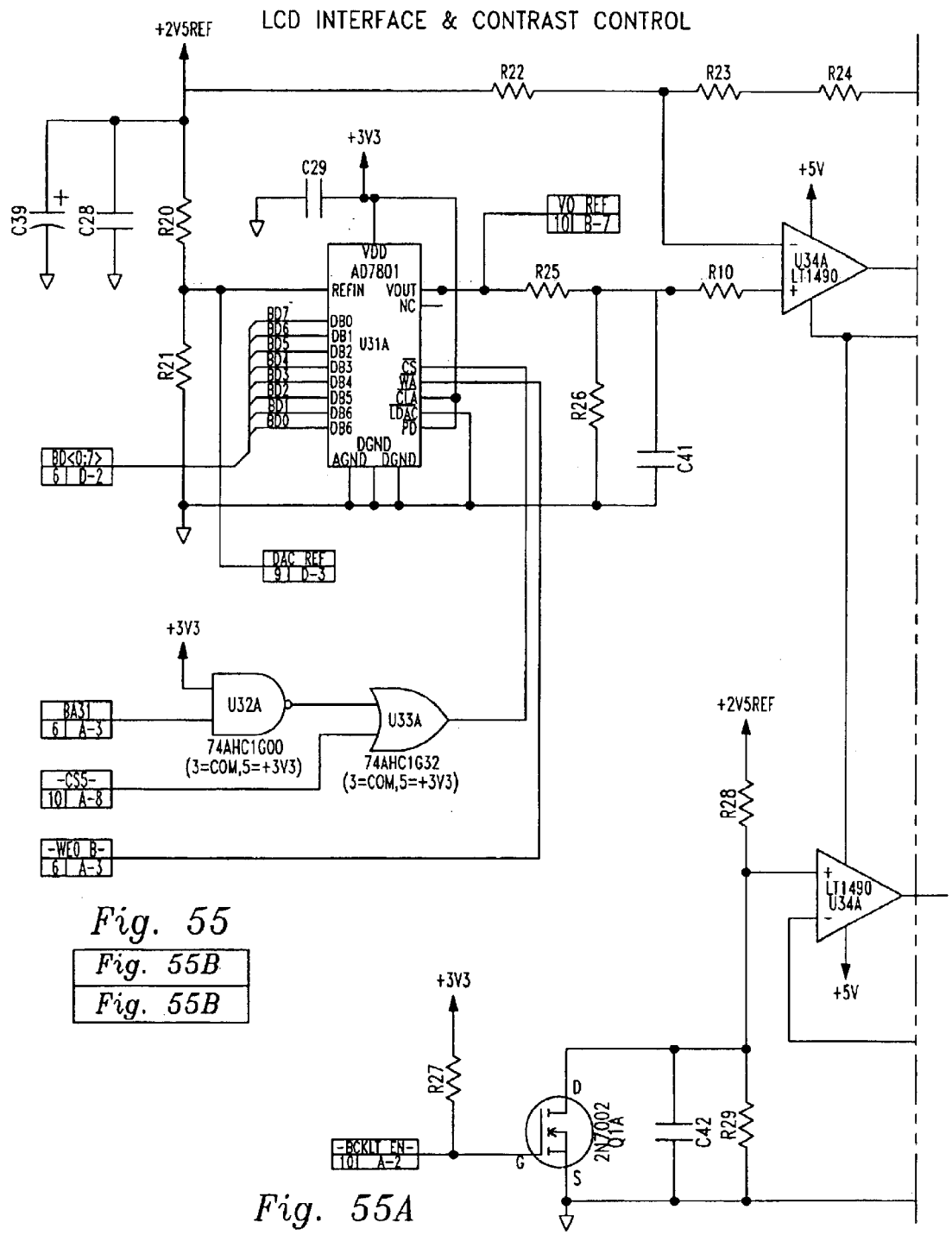
FIG. 55 is a schematic view of a LCD interface and contrast control circuit according to the present invention.
Figure 55B:
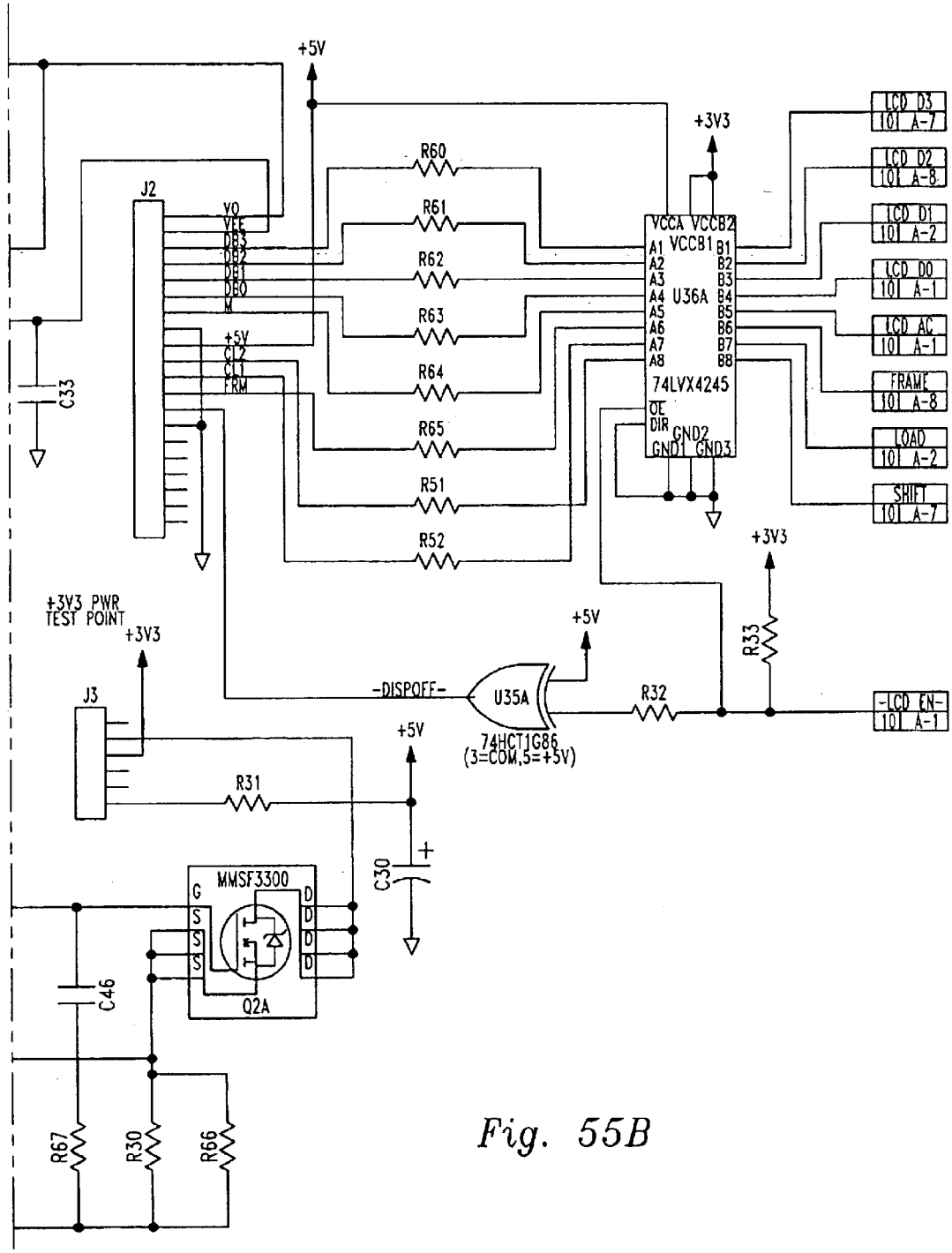

Referring to FIG. 55, the microcontroller 280 in the form of the MPC823 has a built-in LCD controller. The signals from this controller are used to drive U36A (e.g., a Motorola 74LVX245 device) which provides 3.3 volts to 5 volts logic level translation between the microcontroller 280 and the LCD device 70. The series resistors R51, R52 and R60 to R65 are provided to reduce overshoot on the signals used to drive the LCD device 70, which connects to J2. The microcontroller 280 uses -LCD_EN- to disable the LCD control interface. This signal is also translated from 3.3 volts to 5 volts logic levels by U35A (e.g., a Texas Instruments 74HCT1G86 device) before it is used to drive the LCD device 70 enable input.

The LCD module backlight connects to J3. The backlight is an array of LEDs driven from the 5 volt supply with a constant 300 mA. Capacitor C30 provides local charge storage to minimize transients caused by turning the backlight on or off. Q2 (e.g., a Motorola MMSF3300 device), U54 (e.g., a Linear Technology LT1490 device) and associated discrete components form the constant current supply for the backlight. The value of current driven is determined by R28, R29, R30, R66 and R67. Q1 (e.g., a Motorola 2N7002 device) is turned on and off by -BCKLT_EN- to enable or disable the backlight power source.

A D/A Converter device, U31, controls the LCD contrast. In one example, U31 is an Analog Devices AD7801 device that uses a 1.25 volt reference (derived from the system 2.5 V reference by R20 and R21) and multiplies it by a programmable factor to produce an output between 0 and 2.5 volts. This device is enabled by microcontroller 280 address decoding provided by U32A and U33A. Op-amp U34A and associated components produce a contrast control voltage range of negative 12 to negative 21 volts from the 0 to plus 2.5 volt D/A Converter, U31A, output.

Keypad Interface

Figure 56A:
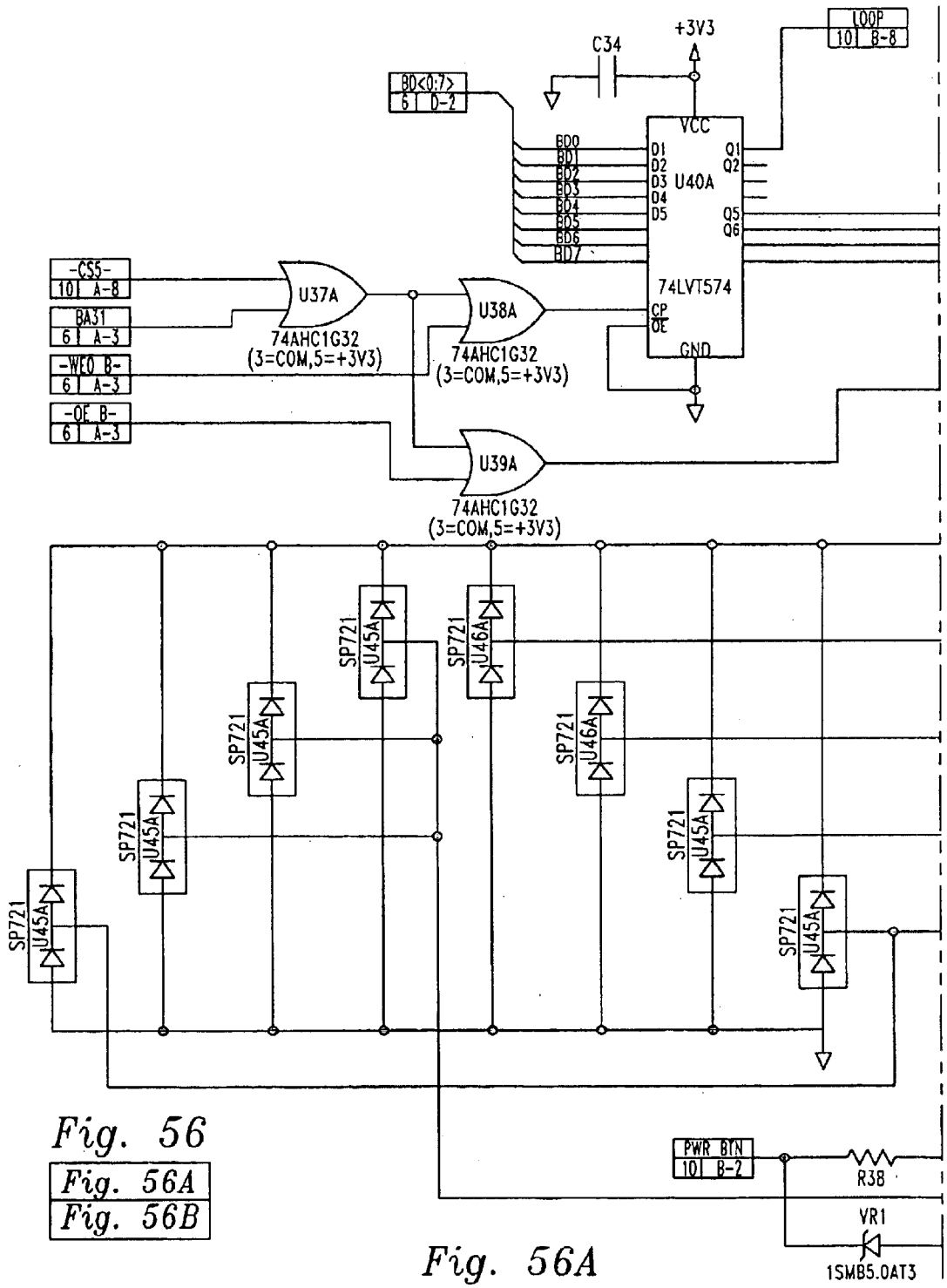
FIG. 56 is a schematic view of a keypad interface circuit according to the present invention.
Figure 56B:
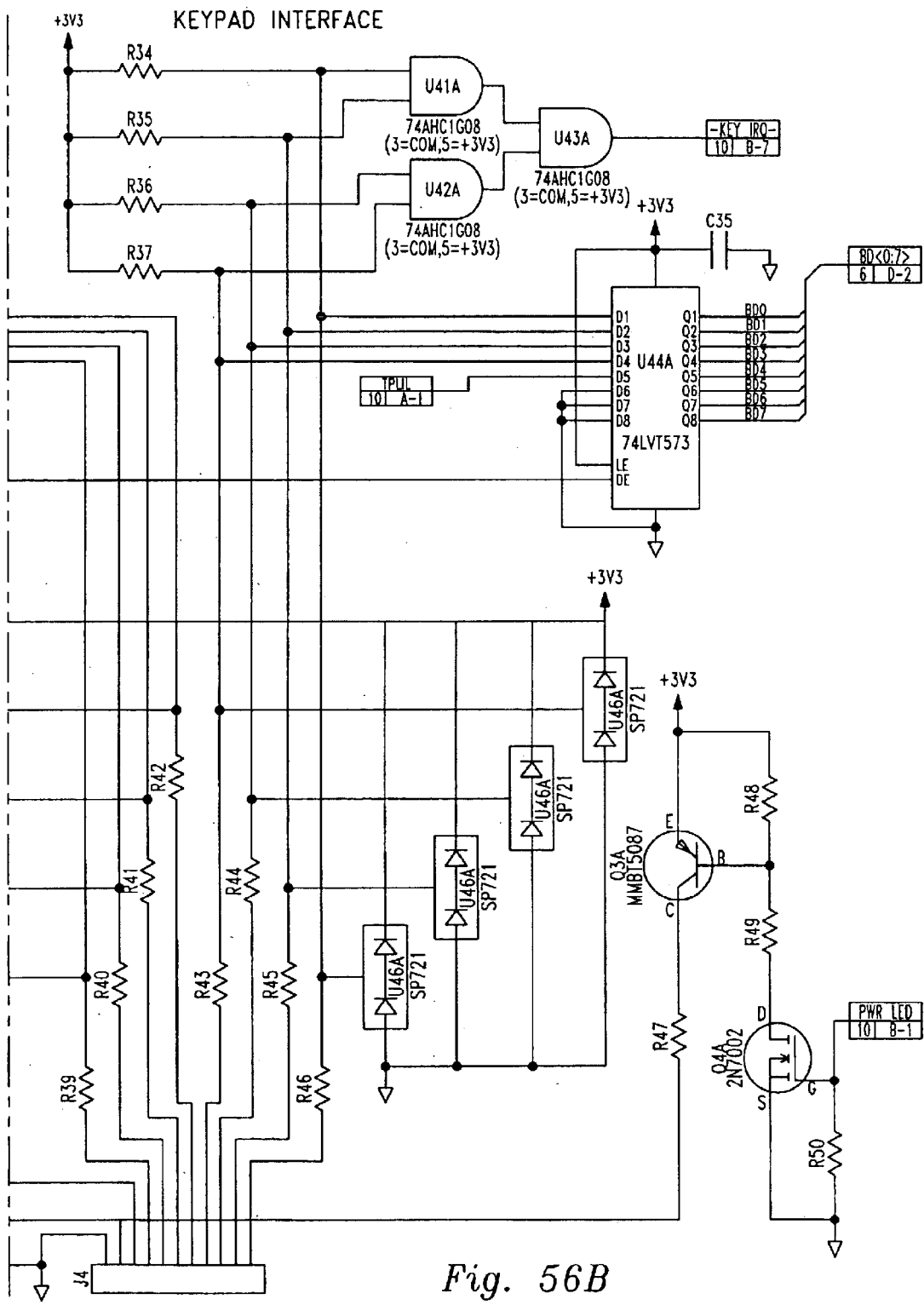

Referring to FIG. 56, the keypad 90 is memory mapped in to even addresses accessed by chip select signal -CS5-. U37A, U38A and U39A (e.g., Texas Instruments 74AHC1G32 devices) provide address decoding to selectively enable parallel latches U40A and U44A (e.g., Texas Instruments 74LVT574 and '573 devices, respectively). The Ethernet signals LOOP, and TPLIL are also controlled by accesses to the keypad latches.

The keypad is based on a 4 by 4 matrix with a total of 15 active keys. Initially the keypad drive latch is set up with logic '0' on each column and the rows have pull-ups to 3.3 V. When a key is pressed a short is created between a particular row and column, causing a row to be pulled to a logic low. This causes U41A through U43A (e.g., Texas Instruments 74AHC1G08 devices) to produce an interrupt (-KEY_IRQ-) and defines which key has been pressed.

When a key press event has been detected then a walking zero's pattern is applied to the keypad columns. As each column is activated the state of the rows can be determined by reading the keypad output latch. Thus the pressed key can be determined from its row and column co-ordinates.

Transient over-voltage protection is provided by clamping diodes U45A and U46A (e.g., Harris SP721 devices). Resistors R39 through R46 ensure that insufficient energy is present to cause a spark if the keypad connector, J4, is accidentally disconnected.

Pin 3 of connector J4 connects directly to the On/Off button 118 on the keypad 90. This is not part of the 4×4 matrix, but is a single pole switch. It is used to activate the power control circuit on the Power Supply PWA 200. When power is on, the microcontroller 280 drives PWR_LED so that the LED built into the keypad is turned on via Q3 (e.g., Motorola MMBT5067 device), Q4 (e.g., Motorola 2N7002 device) and associated shown components.

Phase Reference Threshold Voltage Generation

Figure 57:
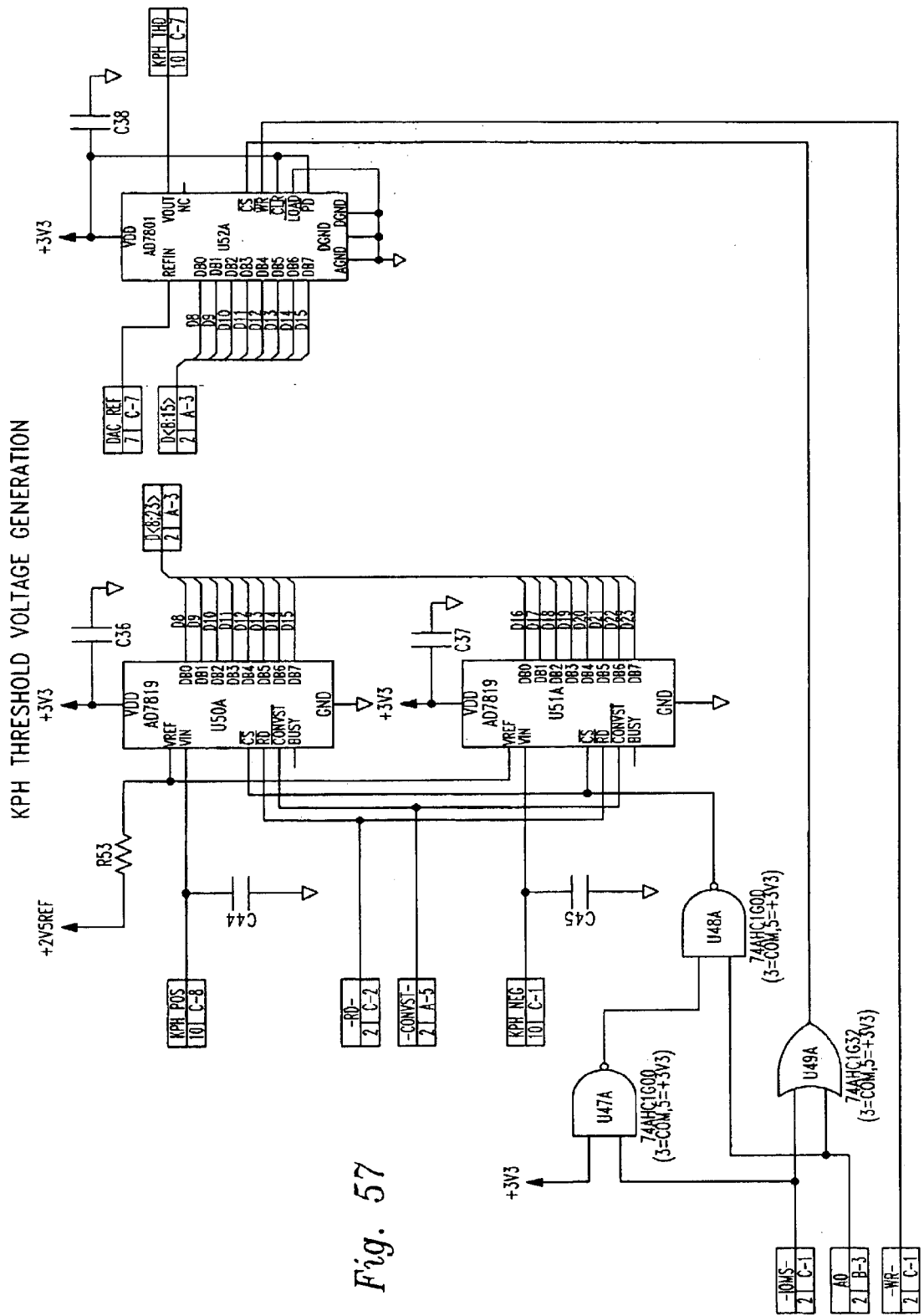
FIG. 57 is a schematic view of a phase reference threshold voltage generation circuit according to the present invention.

Referring to FIG. 57, A/D Converters U50A and U51A (e.g., Analog Devices AD7819 devices) are used to convert the KPH_POS and KHP_NEG signals from the Main PWA 240 into digital values by the DSP 172. These two devices are mapped into the DSP I/O memory space. Address decoding is performed by U47A through U49A. The values of these voltages are sampled once per DSP cycle (approx. 300 times per second). The difference between the two voltages is calculated and written out to a D/A Converter U52A (e.g., Analog Devices AD7801 device). This device generates an output voltage KPH_THD which is used by the phase reference conditioning circuitry 360 (please see FIG. 39) on the Main PWA 240. This device is also used to produce known voltage levels during self-test.

The Power Supply & Battery Charger Circuitry

Referring back to FIG. 8, the Power Supply & Charger PWA 200 includes a battery charger circuit 202, a positive three point three volt (3.3V) supply 204, a positive five volt (5V) supply 206, a negative twenty four volt (−24V) supply 208, a regulator 210, a keep alive logic and control circuit 212, and a PCMCIA power source 214. Each functional block of FIG. 7 will now be delineated in detail.

The portable data collector and analyzer apparatus 10 can be powered either by battery pack 36 or by an external 15 volt ac adapter 220.

Figure 58:
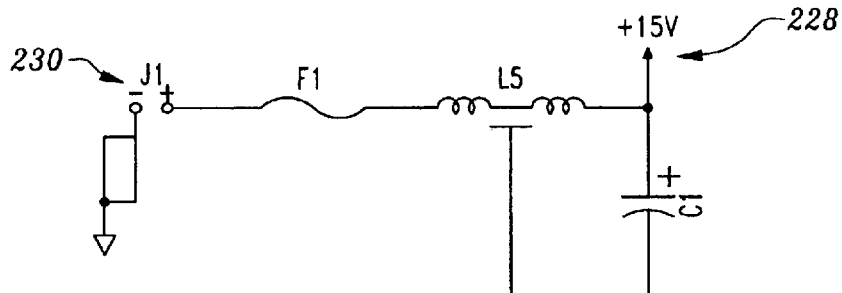
FIG. 58 is a schematic view of a dc connector circuit according to the present invention.
Figure 59A:
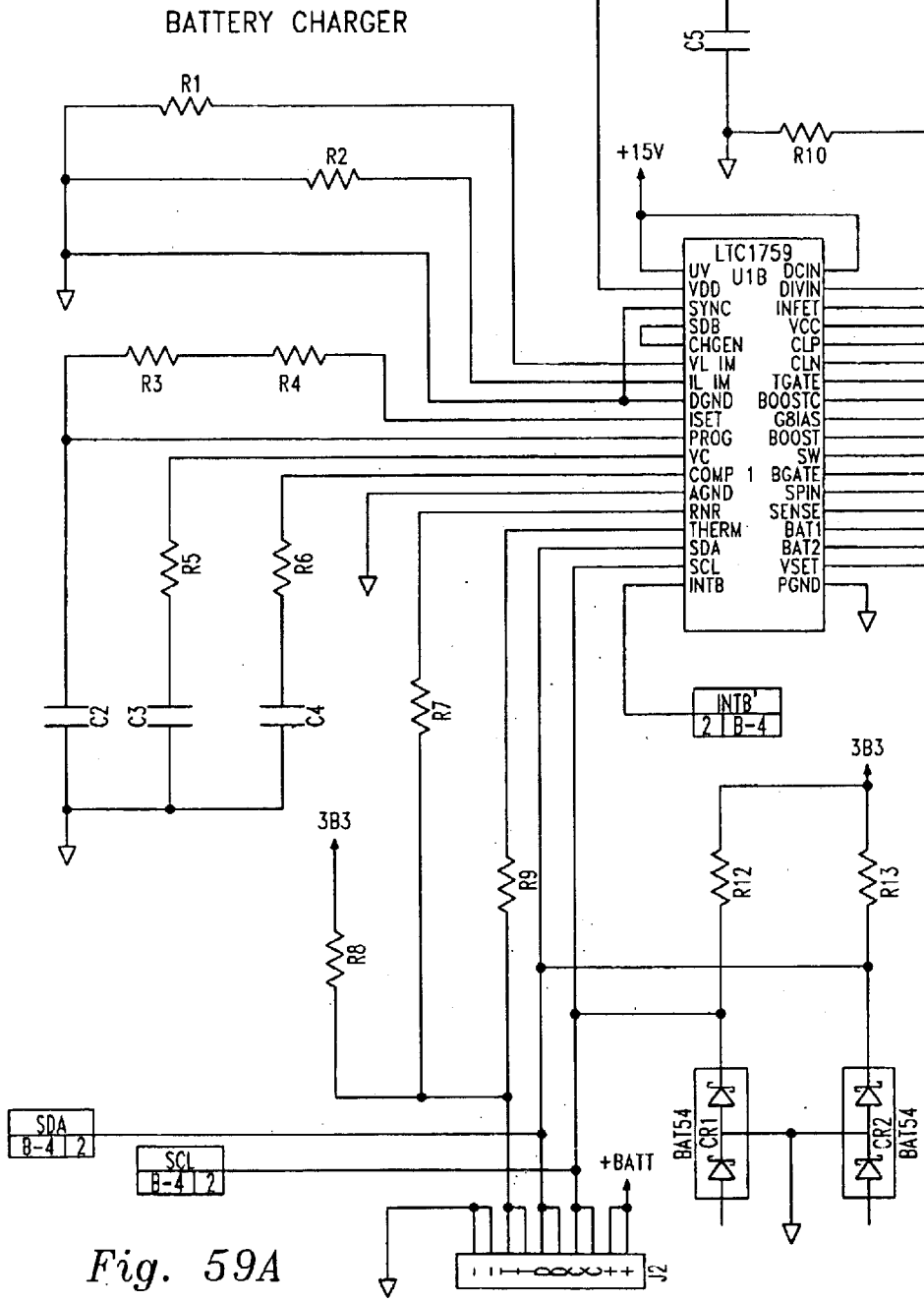
FIG. 59 is a schematic view of a battery charger circuit according to the present invention.
Figure 59B:
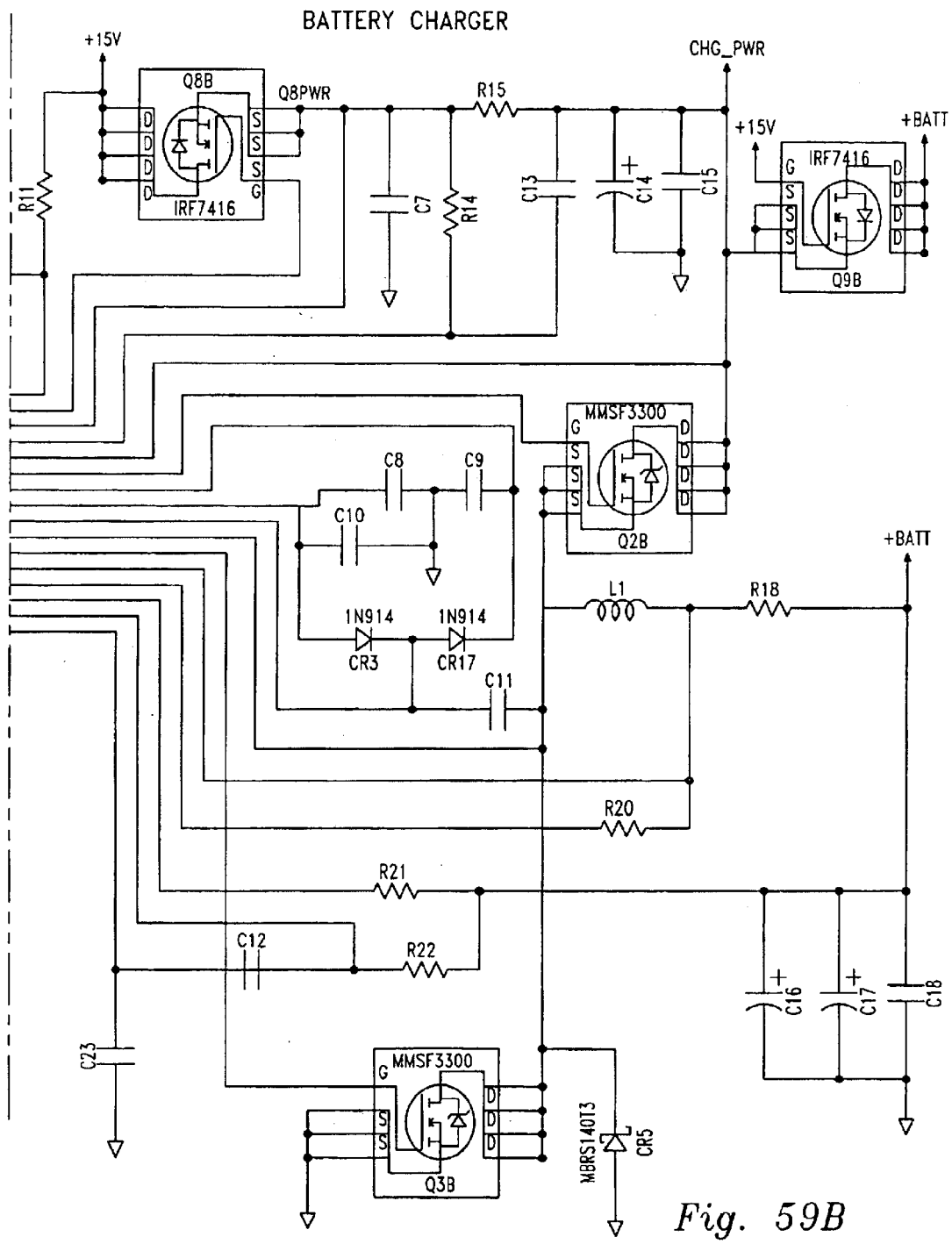

Referring to FIGS. 58 and 59, the external 15 volt ac adapter 220 (shown in FIG. 8) is coupled to jack J1 and thus, external power is fed via a fuse F1 and inductor/capacitor filtering L5 and C1 (FIG. 58) to the battery charge control IC U1B (e.g., a Linear Technology Corporation LTC1759 device) and switch Q8B (FIG. 59).

Figure 60:
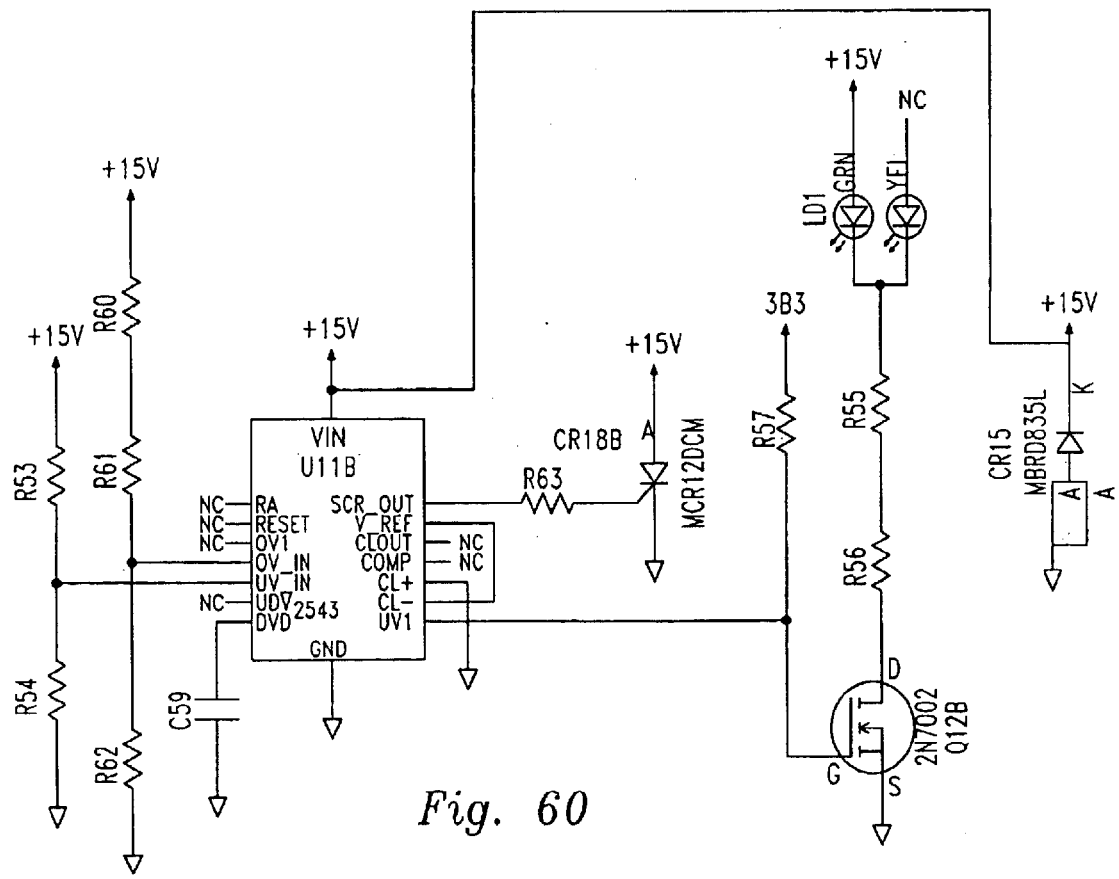
FIG. 60 is a schematic view of an over voltage protection and LED control circuit according to the present invention.

FIG. 60 schematically shows an over voltage protection and LED control circuit. This circuit receives the external power from the ac adapter 220. The external power is checked to ensure it is within an acceptable voltage range by U11B (e.g., a Unitrobe 2543 device) and its associated components. If the input voltage is within tolerance transistor Q12B is turned on and thus illuminates LED LD1 via current limiting resistors R55 and R56. If the input voltage exceeds the allowable voltage range U11B switches on thyristor CR18B causing the input fuse F1 to blow. Reverse polarity protection is also provided by CR15A.

Referring back to FIG. 59, the battery power is fed to switch Q9B via connector J2. The battery charger IC U1B detects the presence of plus 15 volts of external power and switches Q8B on and Q9B off so that external power is used to produce the power for the unit. If the battery charger IC U1B determines that the battery requires charging, switch Q9B is turned off and Q2A is turned on. The +BATT supply is then produced by the switching converter controlled by the charger IC and associated components (L1, R20, CR3, CR17, C8 through C11). R18 is used to sense the current into the battery. R21, R22, C12 and C23 sense the battery charge voltage. The charger uses these parameters to control the charge process. R15 is used to sense the current drawn from the external power supply. The charger IC allows the maximum current drawn to be limited. In this case it is limited to two amps by R1 through R6 and by C2 through C4. If the portable data collector and analyzer apparatus 10 and charging process attempts to draw more than this the charger IC will limit the charging current so that this limit is not exceeded. R7 through R9 set up the battery charger IC thermal shutdown controller.

Figure 61:
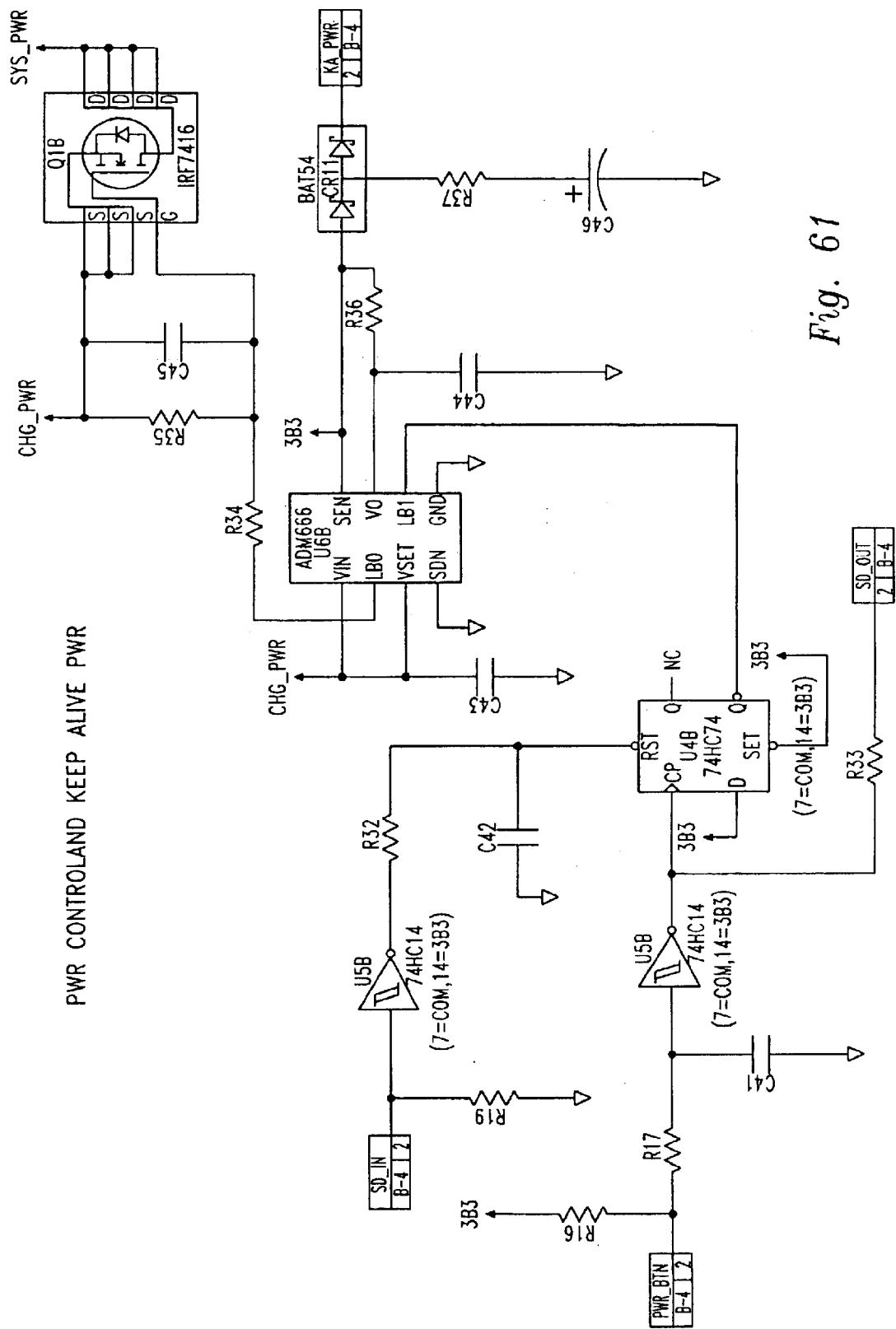
FIG. 61 is a schematic view of a power control and keep alive circuit according to the present invention.

FIG. 61 schematically shows a power control and keep alive circuit. Voltage is generated by a linear voltage regulator 210 (FIG. 8) powered by the switched battery or external supply U6B. This is used to power the battery charge control IC U1B and also the logic used to control turn on and turn off of the apparatus 10. It also supplies 3B3 to a high capacity battery backup capacitor C46 via blocking diode CR11. This capacitor is used to maintain power to the real time clock when no power is present. When power is initially applied, U4B is set up such that Q not is high. U6B drives the input of U5B and is pulled high via R16 and R17 until the on/off button on the keypad (PWR_BTN) is pressed. This causes the output of U4B to toggle which in turn causes U6B to turn switch Q1B on. This enables SYS_PWR which is the main power source to all the portable data collector and analyzer switching power converters. Once power is on, further presses of the on/off keypad button are monitored at SD_OUT by the microcontroller 280. If the button is pressed for longer than a predetermined time, the microcontroller asserts SD_IN. This resets U4B via U5B causing Q1B to be switched off and removing power from the switching converters.

Switching converters are used to generate plus 3.3 volts, plus 5 volts and negative 24 volts power supplies for use in the portable data collector and analyzer apparatus 10.

Figure 62:
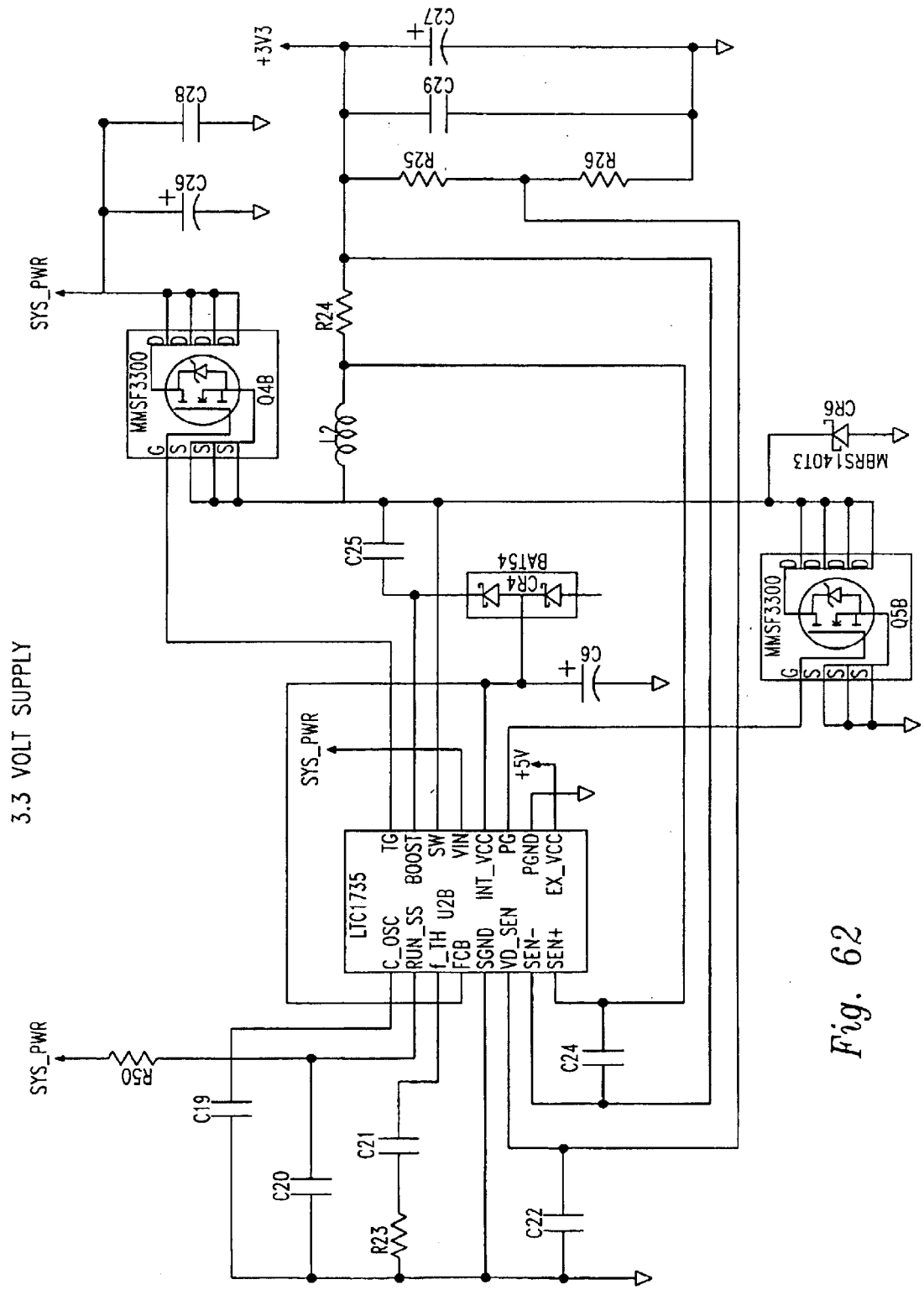
FIG. 62 is a schematic view of a positive three point three volt supply circuit according to the present invention.

FIG. 62 schematically shows a positive 3.3 volt supply circuit. The 3.3 volt supply circuit uses controller IC U2B to drive its associated components to produce the required output voltage. These component values are derived from the published application notes for the device. Specifically, R24 is used to derive the current limit setpoint while R25 and R26 derive the output voltage of the circuit.

Figure 63:
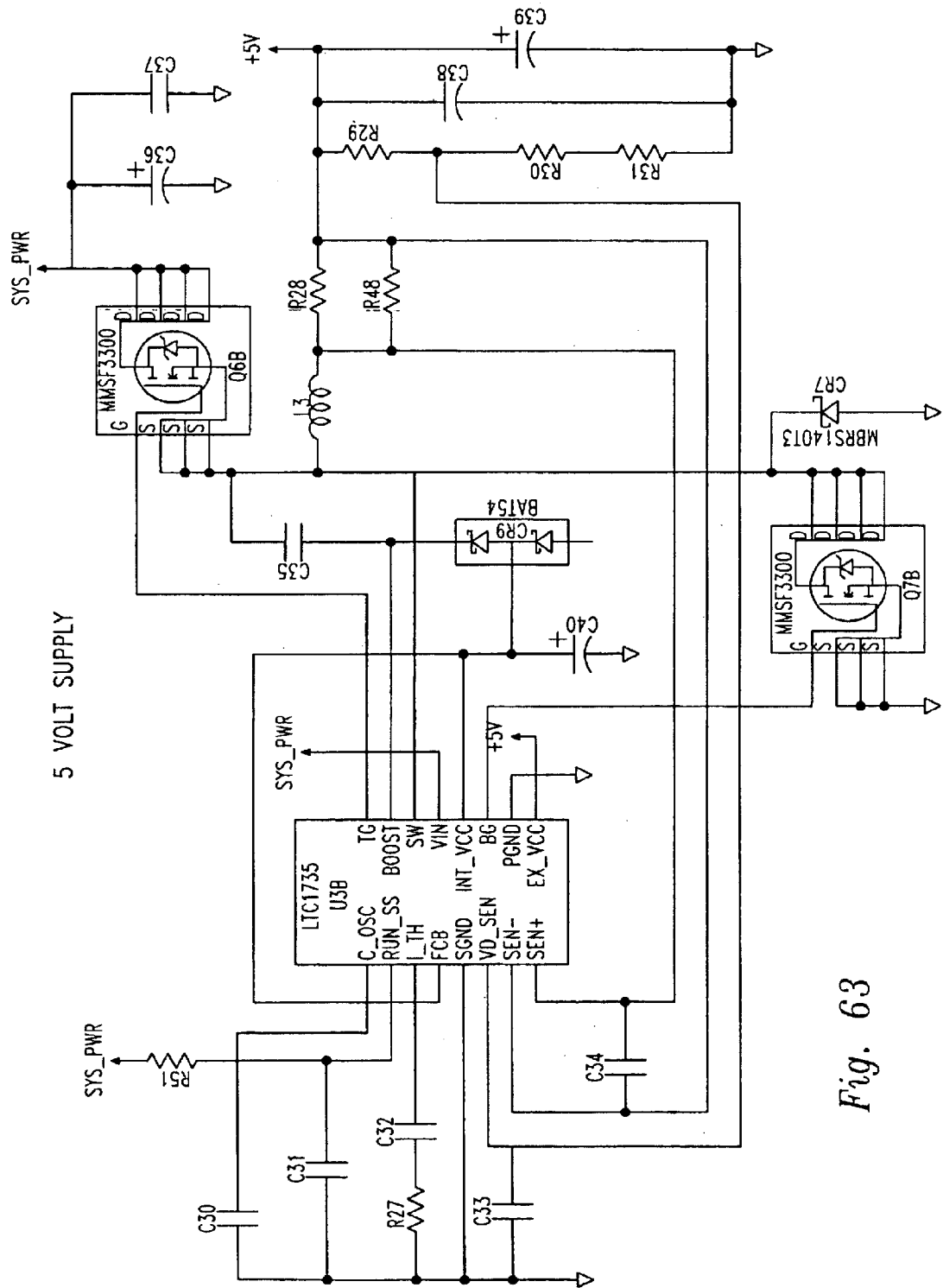
FIG. 63 is a schematic view of a five volt supply circuit according to the present invention.

FIG. 63 schematically shows a positive 5 volt supply circuit. The 5 volt supply circuit uses controller IC U3B in the same way as the positive 3.3 volt supply circuit. In this case R28 and R48 derive the current limit setpoint while R29 through R31 derive the voltage output.

Figure 64:
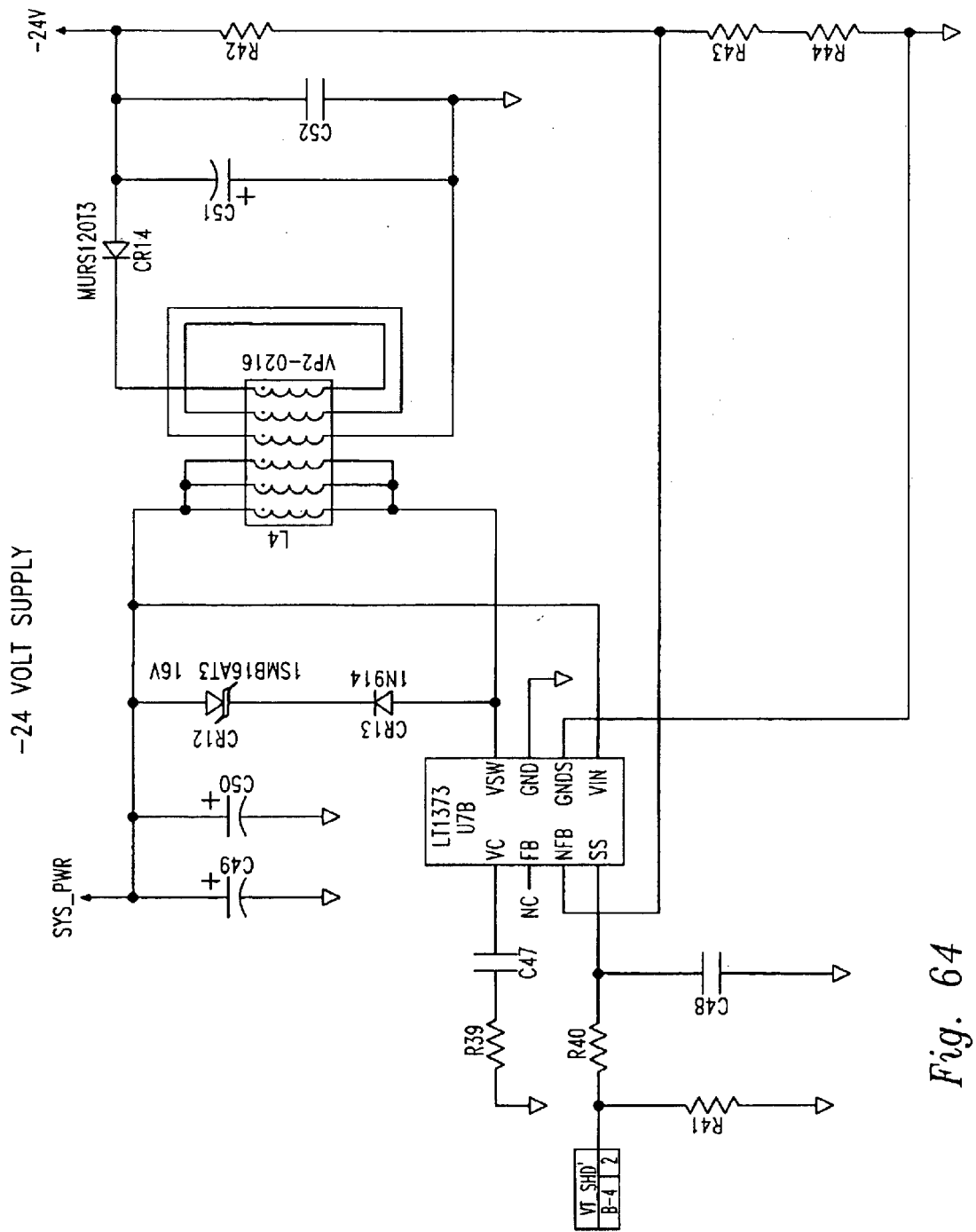
FIG. 64 is a schematic view of a negative twenty four volt supply circuit according to the present invention.

FIG. 64 schematically shows a negative 24 volt supply circuit. The negative 24 volt supply is generated using controller IC U7B and its associated components. The output voltage is derived by R42 through R44 and again, these component values are derived from the published application notes for this device. Note that current limiting is inherent in the way in which a flyback converter operates.

Figure 65:
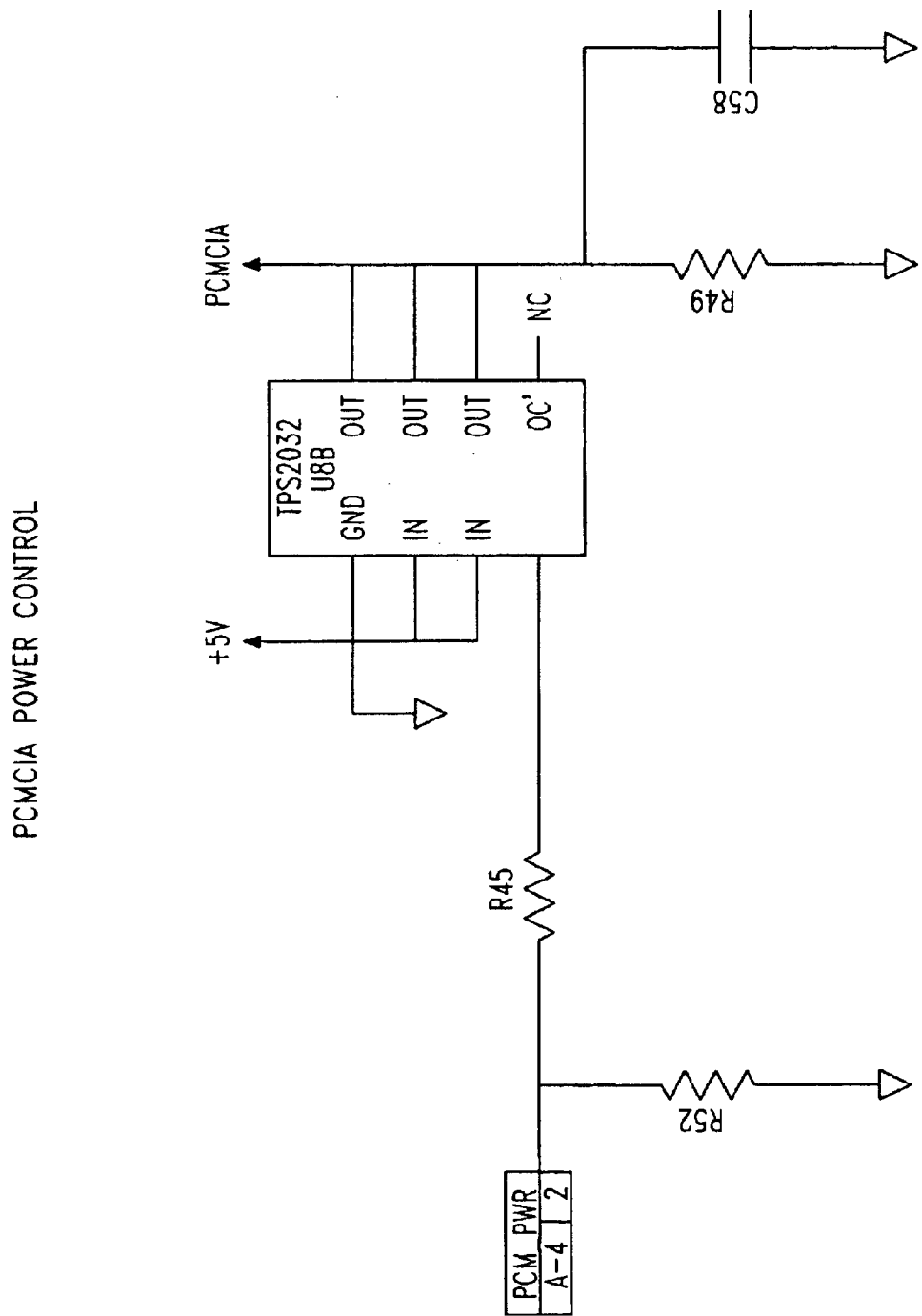
FIG. 65 is a schematic view of a PCMCIA power control circuit according to the present invention.

FIG. 65 schematically shows the PCMCIA power source 214 for the PCMCIA socket. Power for the PCMCIA socket is drawn the positive 5 volt supply that is switched on or off by the microcontroller 280 using switch U8B and associated components as shown.

Referring back to FIG. 15, the Power Supply & Charger PWA 200 is also used to route keyboard control and RS-232 communications port signals to connectors to make them available to the user via J4 and J5. Transient protection is provided for the keyboard connection by CR8 as shown in FIG. 15.

The DSP Firmware

The DSP sampling process follows the following steps:

When first requiring the DSP 172 to perform some signal processing, the microcontroller 280 places the DSP 172 in reset and then places the DSP code in the shared memory U14A (FIG. 25) and subsequently brings the DSP out of reset. This has the effect of forcing the DSP 172 to load and run this code.

One of hallmarks of the present invention is that downloading the code as and when required has the advantage that many different versions of DSP code can be used depending upon the application being run. In addition, this means that an EPROM is not needed to store code and rather, code can be upgraded by downloading new firmware to the portable data collector and analyzer apparatus 10.

Once the code is run, the DSP 172 will first perform self-test routines and then wait for a configuration from the portable data collector and analyzer apparatus 10, describing which measurements to take. Before sampling, the DSP 172 performs the following initialization steps.

a) Decides which interrupts should be enabled/disabled.
b) Calculates the filter coefficients from the desired filter corner frequencies.
c) Sets up the required decimation for any spectrum calculation.
d) Calculates the filter settling times depending upon the high-pass filter corner frequencies.
e) Initializes all necessary variables.

The DSP 172 then samples and processes the data, writes out the results to the shared memory U14A and informs the microcontroller 280 that new results are available to be read.

Figure 66:
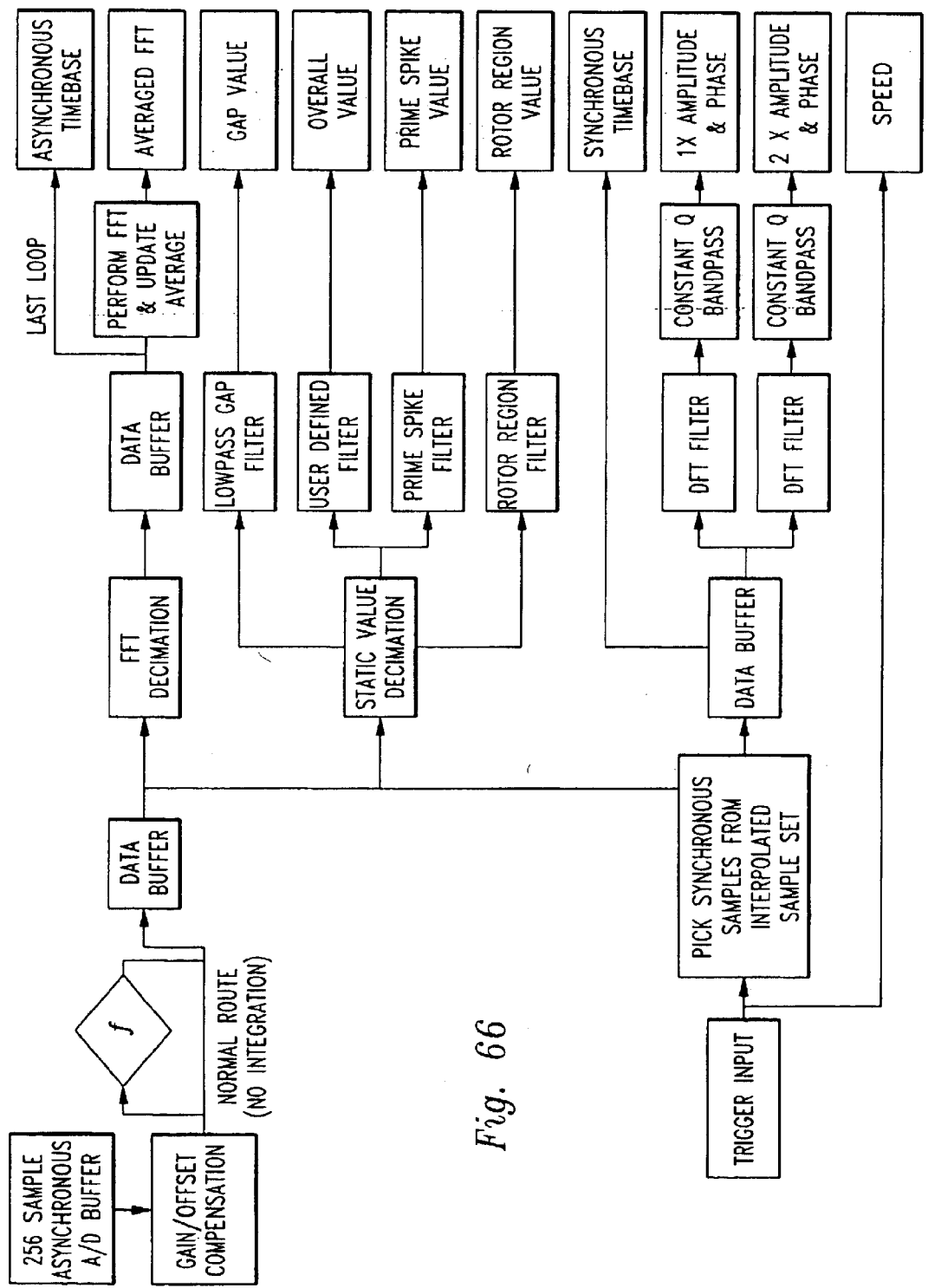
FIG. 66 is a flowchart of the DSP processing steps according to the present invention.

FIG. 66 shows a flowchart of the processing steps taken while the DSP is sampling. The flowchart applies to single channel data with trigger input. Each additional channel follows the flowchart shown in FIG. 66 but would have an output for each additional channel. For example two channel inputs follow the same process as delineated in FIG. 66 and would doubling of all outputs except for the speed data.

More specifically, DSP 172 is able to perform several tasks in parallel, depending upon what measurements are configured:
a) It can perform a dual channel spectrum and also two channel overall vibration values as well as giving a speed measurement, all in parallel.
b) It can calculate dual channel overall vibration, prime spike, rotor region, and gap values in parallel.
c) It can synchronously sample and calculate dual channel overall vibration, prime spike, rotor region, gap values and 1X and 2X vectors in parallel (this is done at a slightly reduced signal bandwidth of 30 kHz as opposed to 40 kHz for the above asynchronous measurements).

Static Values (Gap Filter, Overall Value, Prime Spike and Rotor Region)

The DSP 172 calculates the required filter coefficient from the corner frequency. This has the advantage that any corner frequency can be chosen and a large look-up table containing the coefficients for each frequency is not required.

More specifically, the corner frequencies referred to are the high pass and low pass filter corner frequency used in the Prime Spike, Rotor region and Direct value calculations. The corner frequency is the point at which the output signal power is filtered to half the input signal power (also known as the 3 dB point).

The high pass and low pass filters used in the Prime Spike, Rotor region and Direct value calculations are implemented as infinite impulse response (IIR) filters. This type of filter emulates a hardware filter implementation. Each filter has a series of coefficients associated with it which define the filter response. The DSP uses a set of well-known equations in the art to internally calculate the necessary coefficients for each high and low pass filter from the user specified corner frequencies. This replaces the need for an extensive look up table on the microprocessor and provides increased flexibility for the user.

The DSP firmware makes as much use as possible of a unique decimation technique according to the present invention in order to improve the accuracy of the high and low-pass filters and release processor time for the FFT calculation. This unique decimation technique according to the present invention will be delineated in detail hereinbelow.

When the DSP receives a new configuration and has begun sampling, it will wait until the high pass filter has settled before writing out a valid value to shared memory U14A.

Analysis Feature Description of the DSP Firmware

Further details of the analysis features shown in FIG. 66 are as follows:

Phase Measurement

To calculate the phase of a signal, a discrete fourier transform (DFT) is performed on one cycle of synchronous data. On the PDC, DFTs are calculated for frequencies corresponding to the trigger speed and twice the trigger speed. Each DFT provides a complex value which describes the spectral content at that frequency. The amplitude and phase of this vector is then calculated thus:

$$Amplitude = \sqrt{Re^2 + Im^2}$$

$$Phase = 270 + \arctan\left(\frac{Im}{Re}\right) \quad 0° \le phase < 360°$$

Speed Measurement

Each trigger input causes an interrupt on the DSP. The in-built timer is used to record when this interrupt occurs and the DSP then calculates the difference between the time of this interrupt and the time of the last one. This gives an interrupt period in clock cycles. The speed is then calculated thus:

$$Speed\ (rpm) = 60 * \frac{Processor\ frequency}{clock\ cycles}$$

Direct Timebase Waveform

The timebase waveform displayed is the decimated waveform used to calculate the spectrum.

Filtered Timebase Waveform

The filtered timebase waveform is constructed from the 1X or 2X vector amplitude and phase value Full Spectrum The full spectrum is calculated using a 1024 pt complex FFT. 1024 samples of synchronous dual channel data are passed in the routine. Channel 1 data is used as the real part and the channel 2 data is used as the imaginary part for the input. The complex FFT is then calculated and the amplitude of each component calculated. The resulting amplitude spectrum is displayed as negative and positive orders (multiples of trigger frequency) and shows forward and reverse precession components in the signal.

Spectrum

The spectrum calculation is described below under the heading: FFT Calculation Including the Frequency Shift and Decimation Method.

Orbit

The orbit is an XY plot of Ch1 versus Ch2 over a specified number of revolutions Prime Spike Prime Spike takes the input data, passes it through $4^{th}$-order Butterworth high pass filter and then a $4^{th}$ order Butterworth low pass filter and then measures the peak to peak value or RMS value of the resulting waveform.

Rotor Region

As prime spike with a different user specified high and low pass corner frequency.

Averaging

This takes the average of several amplitude spectrums in order to minimize the effects of noise on the signal.

Windowing

The window function is applied to the input data before applying the FFT. Two windows are selectable (as well as no window): Hanning, which gives improves frequency resolution and flat-top which gives improved amplitude resolution at the expense of slightly wider frequency spikes. The effect of the window upon the amplitude is compensated for after the FFT by dividing the amplitude by the normalized area of the window.

FFT Calculation Including the Frequency Shift and Decimation Method

The DSP 172 is able to calculate a spectrum from between 100 and 6400 lines, windowed, averaged and with overlap. The method used according to the present invention is easily extendible so that virtually any number of lines of resolution could be calculated if so desired. Additionally, the method was specially designed around a 1024 point FFT so that the routine could be used without needing much on-board DSP memory.

For example, a 6400 line spectrum has to process 16,384 data samples. A traditional 16,384 point FFT radix two algorithm would require an input buffer and an output buffer of this size, the input buffer being used as workspace for the radix two algorithm. Thus, a DSP with less than this required memory would need to use external memory to implement the algorithm. Thus, a DSP with, for example, only 16K of onboard data memory (like the ADSP 2183) would need to use external memory to implement the algorithm. This means that the efficient addressing which the DSP uses to speed up its processing would not be able to be used and the algorithm would be very inefficient. The 16,384-pt FFT algorithm (no windowing/averaging) would take up to 2.2 million clock cycles if it could use internal memory alone. Rewriting the routine to use external memory would mean the same process would take up to two orders of magnitude longer.

The new method according to the present invention is based upon a frequency shifting and decimation method to split the input into separate 1024 pt chunks, each comprised of a different portion of the desired frequency spectrum.

In general the new is comprised of the following steps:

1) Take N point input data,
2) Frequency shift input data by appropriate amount. (Note real input data now becomes complex),
3) Decimate N point complex data by required factor to get 1024 decimated points with the required spectral content. (i.e. for 6400 line spectrum decimate by 8),
4) Apply desired window function (see the above description under the heading: windowing),
5) Calculate 1024 point radix two complex FFT of the decimated data,
6) Calculate amplitude of FFT,
7) Store 800 of the 1024 points in appropriate portion of resultant spectrum,
8) Loop until the entire spectrum has been stored (8 times for a 6400 line spectrum), The advantages of the new algorithm are thus:

1) The core FFT calculation can be performed in internal memory utilizing the DSP addressing advantages that this gives.
2) The routine is easily adaptable to any number of lines needing only external storage for the input data. A separate routine is not needed for each N point FFT.
3) Overall processing time is vastly reduced.
4) The routine requires much less workspace, saving memory.

For example, a 6400 line spectrum would require eight frequency shifts, eight decimations and eight 1024 pt FFT calculations. A 1024 pt FFT typically takes 100,000 DSP clock cycles. Each decimation would take about 500,000 clock cycles and the frequency shift would take 4096 clock cycles. In total this would be 8*(100000+500000+4096) i.e. 4832768 cycles.

This is slower than using internal memory alone, but far quicker than performing the whole 16384 pt FFT in external memory by a factor of up to 50.

More specifically, the FFT routine can calculate an amplitude spectrum with a resolution of 100 to 6400 lines, increasing in factors of two (giving options of 100,200,400, 800,1600,3200 and 6400). For a resolution of 'k' lines, the input data consists of 'N' points or samples, where N is k*2.56 (e.g. for a for a 100 line spectrum, input data consisting of 256 samples is required)

The standard FFT algorithm takes 1024 pt complex input (consisting of real and imaginary data) and produces a 1024 pt complex FFT. Amplitude values are calculated and only the first 400 positive frequency bins are used and provide the 400 line spectrum. (Real input data produces negative frequency values identical to the positive ones and lines 400 to 511 are used to provide filter roll-off space as real filters are never brick-wall).

So, the standard FFT is used to provide a 400 line spectrum. For 100 and 200 line spectra the input data is repeated to generate 1024 input samples and the first 100 or 200 lines of the resulting amplitude spectrum is used.

For example: Say a 100 line spectrum is desired. This requires 100*2.56=256 input samples. So, by repeating each input sample 4 times, we generate 1024 samples. This creates a 400 line spectrum. However, the process of repeating the input samples has the effect of reducing the input frequency by a factor of 4, effectively compressing the spectrum into the first 100 lines. By taking these 100 lines, the desired spectrum is obtained.

In order to process more than 400 lines, the frequency shift and decimate method according to the present invention is used.

Figure 67:
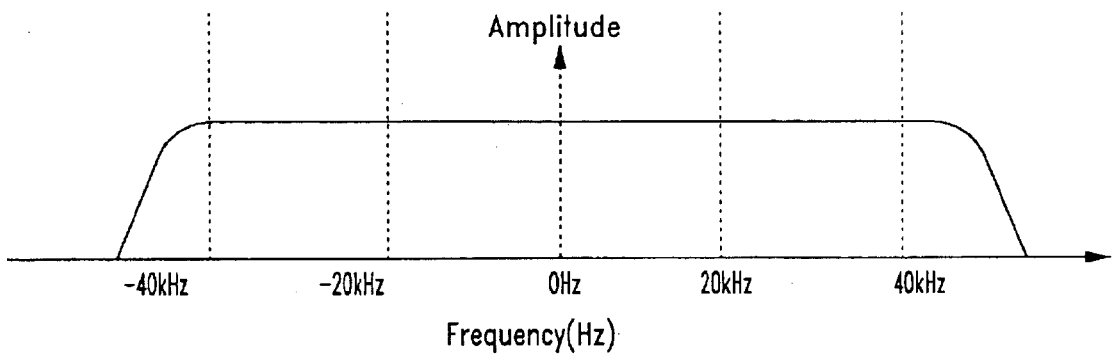
FIGS. 67 through 69 are graphs to help in the delineation of a frequency shift and decimation method according to the present invention.
Figure 68:
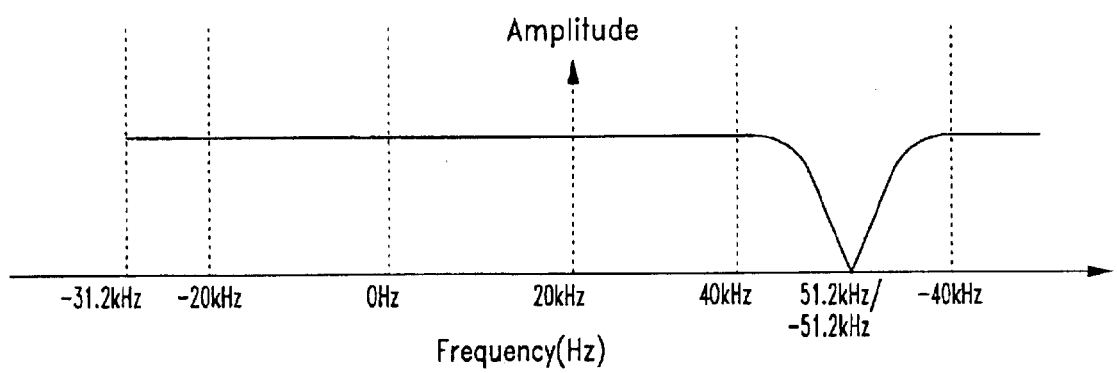
Figure 69:
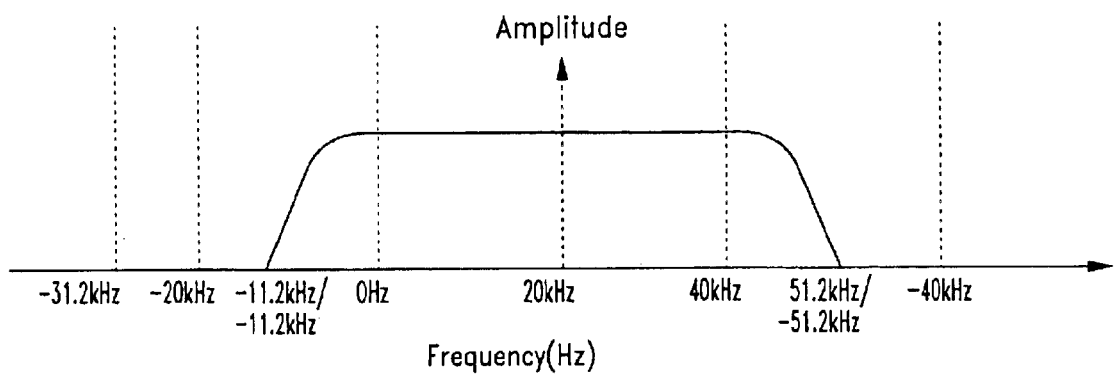

FIGS. 67 through 69 will be employed with the following examples to clearly delineate the frequency shift and decimation method according to the present invention.

Assume that the sample rate is 102.4 kHz, hence the spectrum frequency range is 0–40 kHz (102400 Hz /2.56). For real input data, the frequency spectrum will look something like that in FIG. 67. Only the positive frequencies up to 40 kHz are used for the resulting 400 line spectrum, meaning that the negative frequencies are wasted if a complex FFT algorithm is used.

Say, for example, an 800 line spectrum with no window is desired. This requires 2048 input data samples.

If the data was frequency shifted 20 kHz to the left, then the spectrum would look like that in FIG. 68, with the frequencies of interest shifted to both negative and positive frequencies. The frequency shift is performed by multiplying the data by a complex exponential equation:

$$y(t)=x(t)*e^{i2\pi ft}$$

Where f is frequency shift in Hz, 'i' is the imaginary number, t is time, x(t) is the input value at time t and y(t) is the output value at time t.

This produces 2048 complex input data samples for the FFT, which can only handle 1024. By decimating the data by a factor of 2, we obtain 1024 complex data samples with a frequency content ranging from −20 kHz to 20 kHz, as required (see FIG. 69). This data is then FFT'd to obtain 512 negative frequencies and 512 positive frequencies, all of them of interest (see FIG. 69). The 400 negative and 400 positive frequency bins corresponding to the desired 800 line 0–40 kHz spectrum are then stored in the output array.

For a 1600 line spectrum, the algorithm is very similar but requires 4096 input samples and two frequency shifts. The first frequency shift shifts the data by 10 kHz and decimates by 4, giving a resulting spectrum with a frequency content from 0 to 20 kHz. These 800 lines are stored in the first 800 lines of the final output spectrum. The second frequency shift shifts the input data by 30 kHz and again decimates by 4, giving a resulting spectrum with a frequency content from 20 to 40 kHz. These 800 lines are stored in the second 800 lines of the final output spectrum, completing the desired 1600 line spectrum.

For a spectrum with a greater number of lines, the same process is repeated, with modifications to the frequency shift amount and the decimation factor. The frequency shift amount for the $n^{th}$ frequency shift (Hz) is thus:

$$\text{Frequency shift amount} = \frac{(2n-1)*156.25*\text{fft sample freq}}{\text{number of lines}}$$

If the spectral data is to be windowed, for example by a Hanning or flat-top window, this is applied to the complex frequency shifted input data just before the data is FFT'd. The input data is multiplied by the window function to obtain the windowed complex data, which is then FFT'd.

The window functions are used to reduce effects such as 'picket fencing' which are caused by having an incomplete number of waveforms to process. The Hanning window provides increased frequency resolution, and the Flat-top window provides increased amplitude resolution at the expense of slightly wider frequency bins.

Synchronous Sampling

The Synchronous sampling shown in FIG. 66 is performed by sample picking from the asynchronous data set. The DSP stores trigger pulse times in a buffer and once 256 asynchronous samples have been received it processes this buffer:

a) The start time of the 256 asynchronous sample set is determined (from the end time).
b) The first trigger pulse in this buffer is found (if any).
c) The time period for each synchronous sample is calculated by determining the time between trigger pulses and dividing by the synchronous sample rate.
d) The two closest asynchronous samples to the trigger pulse are calculated.
e) The synchronous sample is found by interpolating between these two points to the exact time required.
f) The time of the next synchronous sample is determined.
g) The next two asynchronous samples are found and the synchronous sample calculated.
h) If the time of the next trigger pulse or the number of synchronous samples per rev is reached, the synchronous waveform is stored.
i) Loop to f) until the buffer is processed.

Slight modifications can be made to this scheme for having multiple and sub-unity trigger pulses per buffer.

The trigger pulse can be provided by whatever external device is causing a trigger input, for example, a phase reference transducer in the form of a Keyphasor® transducer (manufactured by Bently Nevada Corporation located in Minden, Nev.) an optical trigger, a strobe or other known phase reference means may be employed for causing a trigger input. Typically, the trigger input is a once per revolution pulse. The DSP is interrupted on a leading or trailing edge of the pulse (depending on configuration) and the time of the pulse is stored in a buffer. Additionally, the trigger pulse may also be simulated internally by the DSP code.

Figure 70:
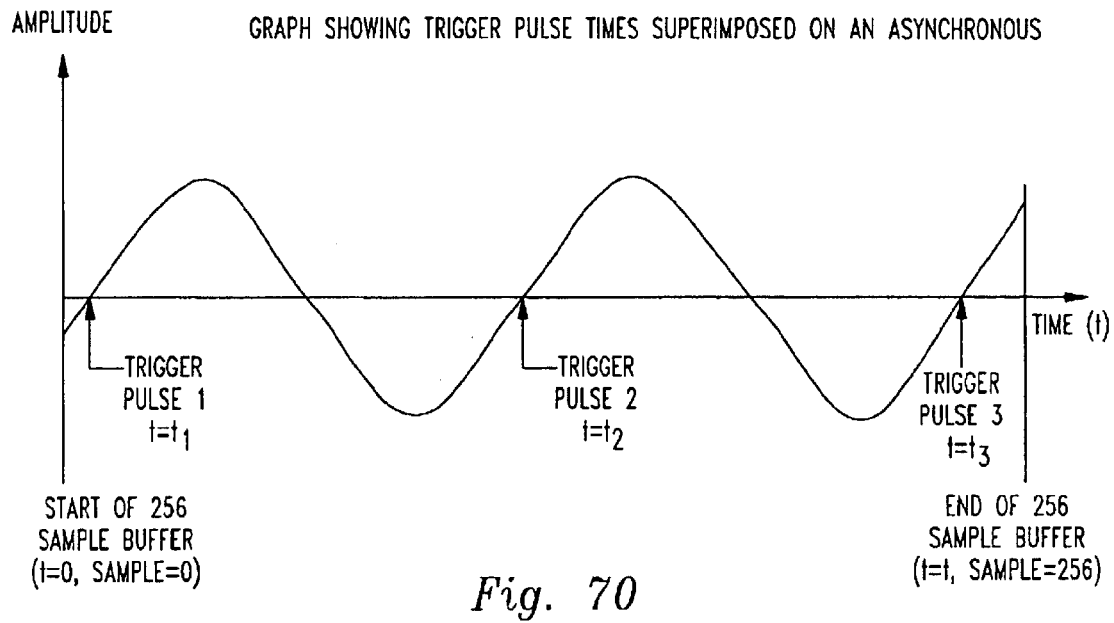
FIGS. 70 and 71 are graphs to help in the delineation of synchronous sampling method according to the present invention.
Figure 71:
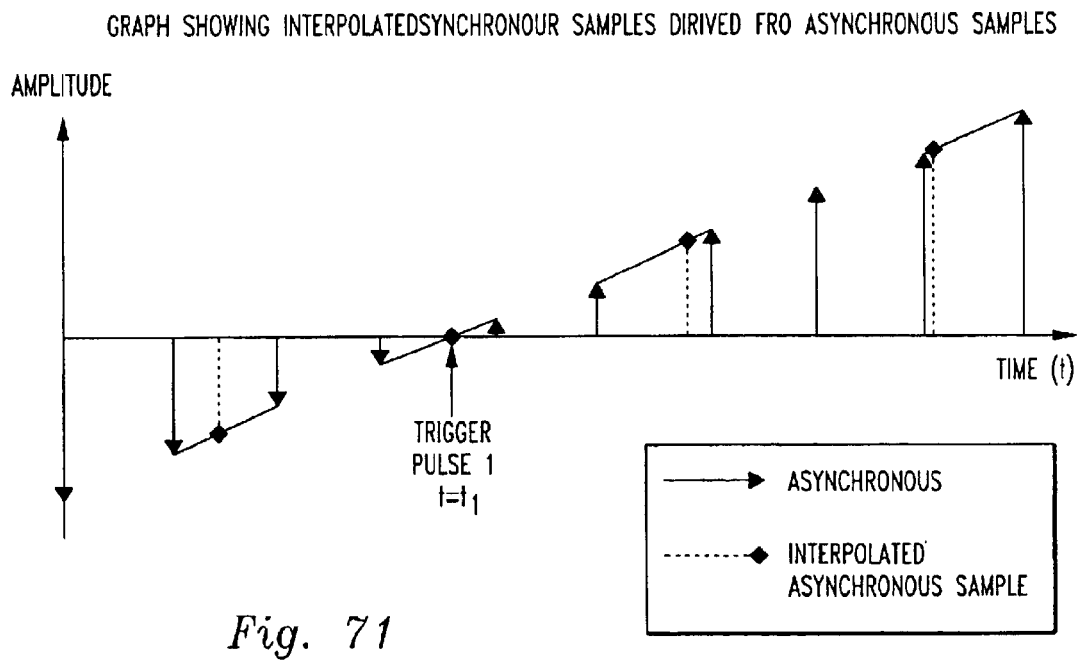

More specifically, and referring to FIGS. 70 and 71, the synchronous sampling is performed by sample picking from the asynchronous data set. The DSP stores the trigger pulse times in a buffer and once 256 asynchronous samples have been received it processes this buffer according to the following method:

a) The start time of the 256 asynchronous sample set is determined (from the end time). The time taken to capture the 256 samples is known (256 sample rate (Hz)) and so the start time is just the end time minus the buffer capture time. The group delay of the A/D (time taken to sample the data) is also subtracted from the start time to find the time when the signal arrived at the A/D and not the time when the A/D outputted the data. This time could be also modified to allow for any hardware filter delay in order to further improve the phase accuracy of the algorithm.

b) The trigger pulse times (which are stored when the trigger input causes a DSP interrupt) are stored in a circular buffer. There is a pointer which points to the earliest pulse time in the buffer. The DSP then scans the buffer and compares the trigger pulse times to the buffer start time to find the first pulse time which is later than the buffer start time. If this pulse is also before the end time of the buffer then the sampling algorithm continues and this pulse time is noted. FIG. 70 shows a diagram of a typical asynchronous buffer with the trigger pulse times superimposed on it.

c) The time period for each synchronous sample is calculated by determining the time between consecutive trigger pulses and dividing by the synchronous sample rate. The synchronous sample rate is the number of samples which are desired between pulses (for this application the sample rate is selectable between 32, 64 and 128 samples).

d) The first synchronous sample to be generated is that relating to the first trigger pulse in the buffer—the one found in step 'b'. Knowing the start time of buffer and the time between asynchronous samples (1/sample rate), it is a simple matter to calculate the two closest asynchronous samples to this trigger pulse.

sample just before trigger pulse =

$$\text{int}\left(\frac{\text{trigger pulse time} - \text{buffer start time}}{\text{time between asynchronous samples}}\right)$$

sample just after trigger pulse = sample just before trigger pulse + 1 e) The exact trigger pulse time is, mostly, somewhere between these two samples (exactly how much is determined by taking the fractional part of the above calculation). Currently linear interpolation is used to find the value at the trigger pulse time, but any number of interpolation methods could be used. Once this trigger pulse value is determined, it is stored in a temporary buffer. FIG. 71 shows a zoomed in portion of FIG. 70, with the asynchronous samples shown and a few interpolated synchronous samples to demonstrate how the synchronous samples are generated.

f) The next synchronous sample time is determined by adding the synchronous sample period to the trigger pulse time.

g) The two closest asynchronous samples to the next sample time are found using the same method as that in step 'd' and the value of the next synchronous sample determined as per step 'e'.

h) The next synchronous sample time is determined as per step 'f'. If the time of this next sample is after the time of the next trigger pulse, then the synchronous waveform is stored. The waveform is stored in external memory.

i) Loop to f) until the time of the next sample is after the time of the next trigger pulse.

j) If the time of the next trigger pulse is before the end of the asynchronous buffer (i.e. multiple trigger pulses per asynchronous buffer), then loop to 'd', using the next trigger pulse in the trigger pulse buffer.

k) If the next synchronous sample time is after the end of the asynchronous buffer, stop until the next 256 sample asynchronous buffer has been captured and then loop to 'b', but use the next synchronous sample time as the point from which to find the next trigger pulse, not the buffer start time.

l) loop to a) until all the synchronous revs have been stored.

In addition to performing signal processing functions, the DSP 172 is also used to perform system configuration and signal path self-tests. System configuration is carried out by transmitting a 16-bit serial word via one of the DSP's full-duplex serial ports, to two daisy-chained 8-bit serial shift registers which are used to control the setup of various analogue switches and multiplexers. Signal path self-test is performed by injecting a dc voltage, setup by the phase reference transducer threshold DAC, into the various single-pole double-throw analogue switches placed in the signal paths for this purpose. The voltages can then be read by the analog to digital converters in the normal way to verify the correct operation of the conditioned input paths. The test is carried out prior to any type of signal measurement and whenever the system is re-configured for another transducer type. Node voltage self-checks consist of verifying the transducer +5 volt and −24 volt power supplies, and can be monitored directly from the ADC's input multiplexers. The transducers are verified for correct biasing within okay limits stored in firmware.

In Use and Operation

Downloading Route Information: Software and Hardware

Figure 72:
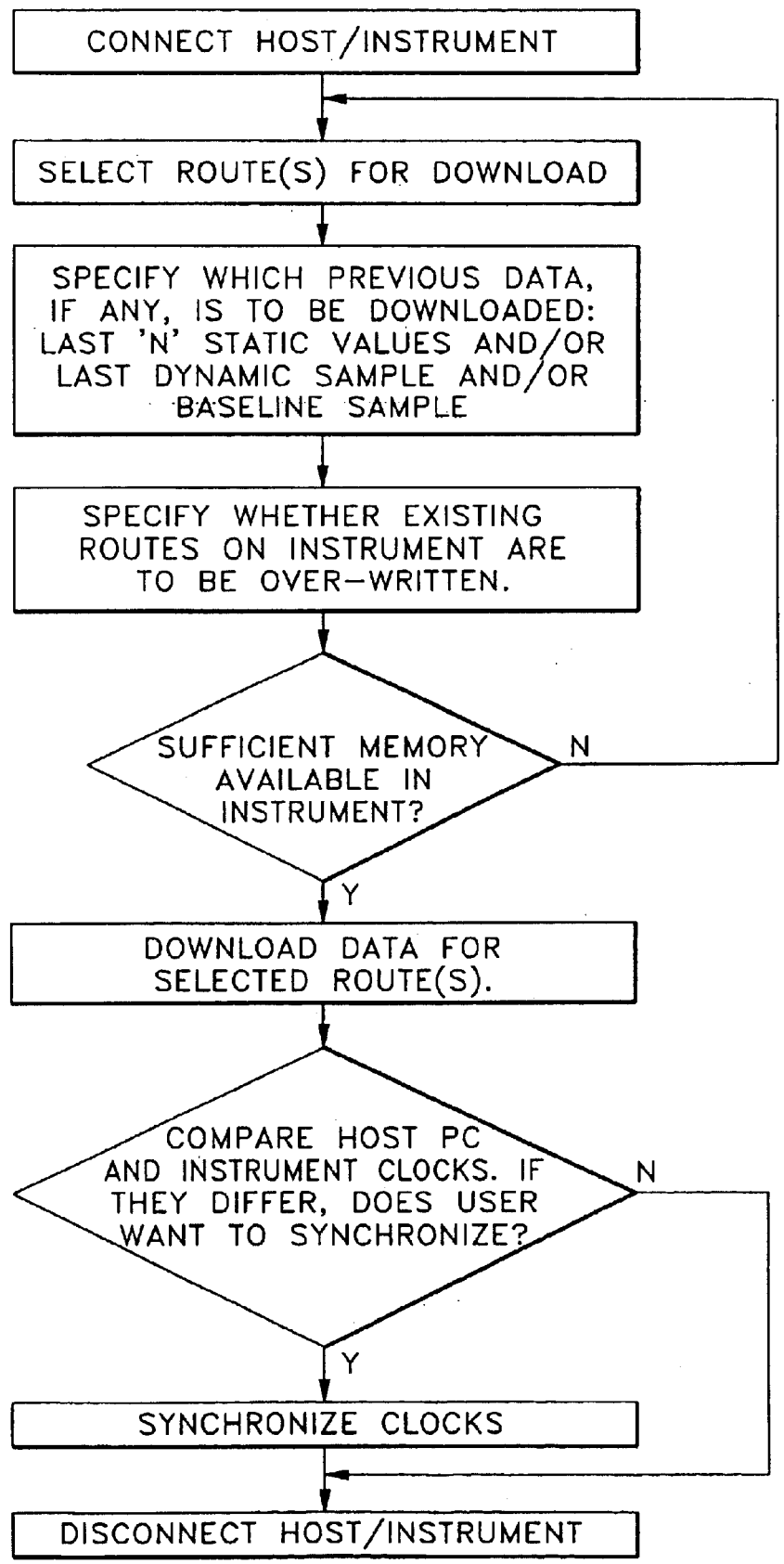
FIG. 72 is a downloading route information flowchart according to the present invention.

FIG. 72 shows a downloading route information flowchart that will now be described in detail.

The host computer is configured and then the portable data collector and analyzer apparatus 10 is connected via a cable to a host computer 410 using either the serial or Ethernet communications links (please see FIGS. 9 and 22). The host computer 410 and the portable data collector and analyzer apparatus 10 then automatically begin to communicate. No user interaction is required at either the host computer or the portable data collector and analyzer 10 to initiate communications between the two devices.

One embodiment of a host computer system that can be employed in combination with the instant invention is described in the commonly assigned copending U.S. patent application Ser. No. 09/515,529, filed Feb. 29, 2000, of Bob Spriggs, et al, entitled "An Industrial Plant Asset Management System: Apparatus and Method," which is hereby incorporated by reference in its entirety.

Using the software on the host computer the pre-configured routes to be downloaded to the instrument are selected. Each route selected can be configured to download route information only, or route information plus historical vibration (or other input signal) data. This historical data can be the last and static values collected and/or the last dynamic data collected and/or a reference (baseline) dynamic data set.

If any of the routes to be downloaded are already stored in the portable data collector and analyzer's memory, the host computer warns the user that the routes to be downloaded will overwrite the existing routes.

The host computer software then retrieves the necessary information from a database 412, converts it into the file format required by the portable data collector and analyzer 10 and copies it over to the portable data collector and analyzer's memory. If there is insufficient memory available in the portable data collector and analyzer apparatus 10 to store the route information, the host software will not transfer the data and informs the user of the problem.

The data copied to the portable data collector and analyzer's memory contains route information such as the hierarchical plant structure (for example groups, machines and points). For each measurement point the data contains information about the type of transducer to be used and their specific properties, its position on the machine, the measurement units, measurement types to be collected, filtering to be applied, historical data and alarm setpoint levels.

As part of the download process the host computer compares the computer clock and the instrument's clock. If the times are different the user is asked if the times should be synchronized.

Once the route information has been transferred, the portable data collector and analyzer 10 can be disconnected from the host and data collection can be performed.

Collecting Data: Software and Hardware

Figure 73:
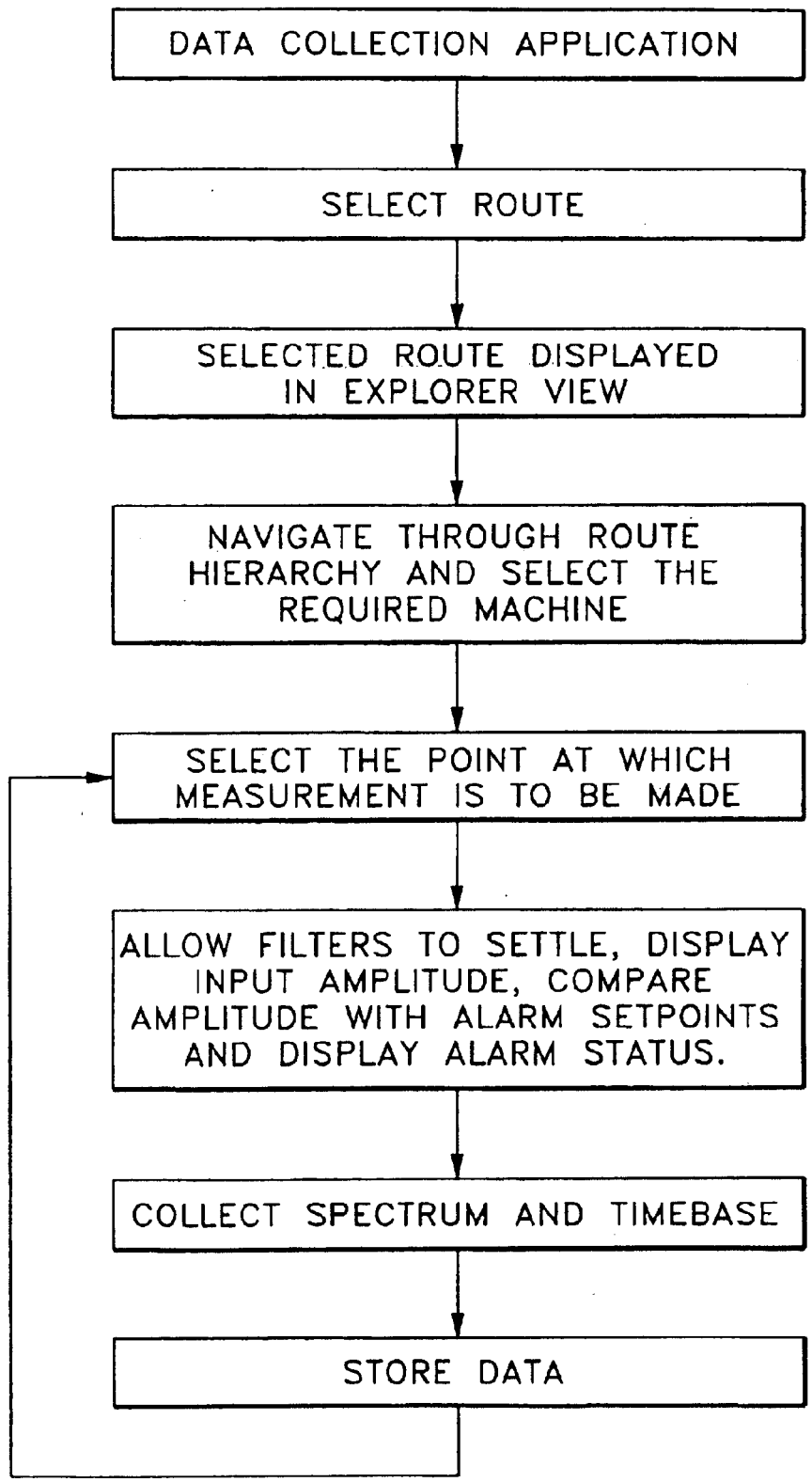
FIG. 73 is a data collection flowchart according to the present invention.

FIG. 73 shows a data collection flowchart and FIG. 74 shows an application manager/data collection display from the display device 70. Theses figures will now be explored in detail.

After switching the portable data collector and analyzer apparatus 10 on, the Data Collection Application can be launched from the application manager shown displayed in FIG. 74. The user then selects a route for which data is to be collected from the available routes stored in the instrument's memory. After selection, the route hierarchy is displayed on the instrument's display as shown in FIG. 74. The route hierarchy display can be expanded or contracted as required to help the user select or locate the machine at which measurements are to be made. A plant group, machine or measurement point can also be located by its tag name using the search facility provided.

Once the meaurement point has been selected, the hardware configuration details for the measurement point are passed to the DSP by the microcontroller. This information allows the DSP to set up the signal conditioning hardware to make the required measurement. It also tells the DSP how to process the incoming signal (for example filtering, integration, RMS/Pk detection, et cetera).

The user then places the transducer in position (or connects to an existing transducer) and starts the data collection process. The instrument waits while the signal conditioning paths (hardware and software) settle to a steady level before displaying the vibration (or other measurement) signal. The measurement results are compared against alarm setpoint levels. The results of the comparison are displayed on the display. Dynamic data (spectrums and timebase) are collected and averaged as required. All measurements are performed on both signal paths (channel A and channel B) simultaneously.

On completion of data collection, the data and alarm results are automatically stored. The software returns to the route hierarchy display ready for the user to start the next measurement process. Measurement at a point can be repeated and the measurement results are automatically stored, either in place of existing data or in addition to it.

FIG. 75 outlines some of the touchscreen Keys (located at the bottom of the screen) and keypad keys used during the data collection process.

The data collector and analyzer apparatus 10 also allows data to be collected at measurement points not included in a downloaded route.

FIG. 76 shows an application manager/analysis display from the display device 70. The analysis feature display can be launched from the application manager for configuring the apparatus 10 for making measurements at points not included in the downloaded route.

FIG. 77 outlines some of the touchscreen keys (located at the bottom of the screen) and keypad keys used during the process of configuring the apparatus 10 for making measurements at points not included in the downloaded route and then carrying out the process of collecting data from these points.

Uploading Measurement Data: Software and Hardware

Figure 78:
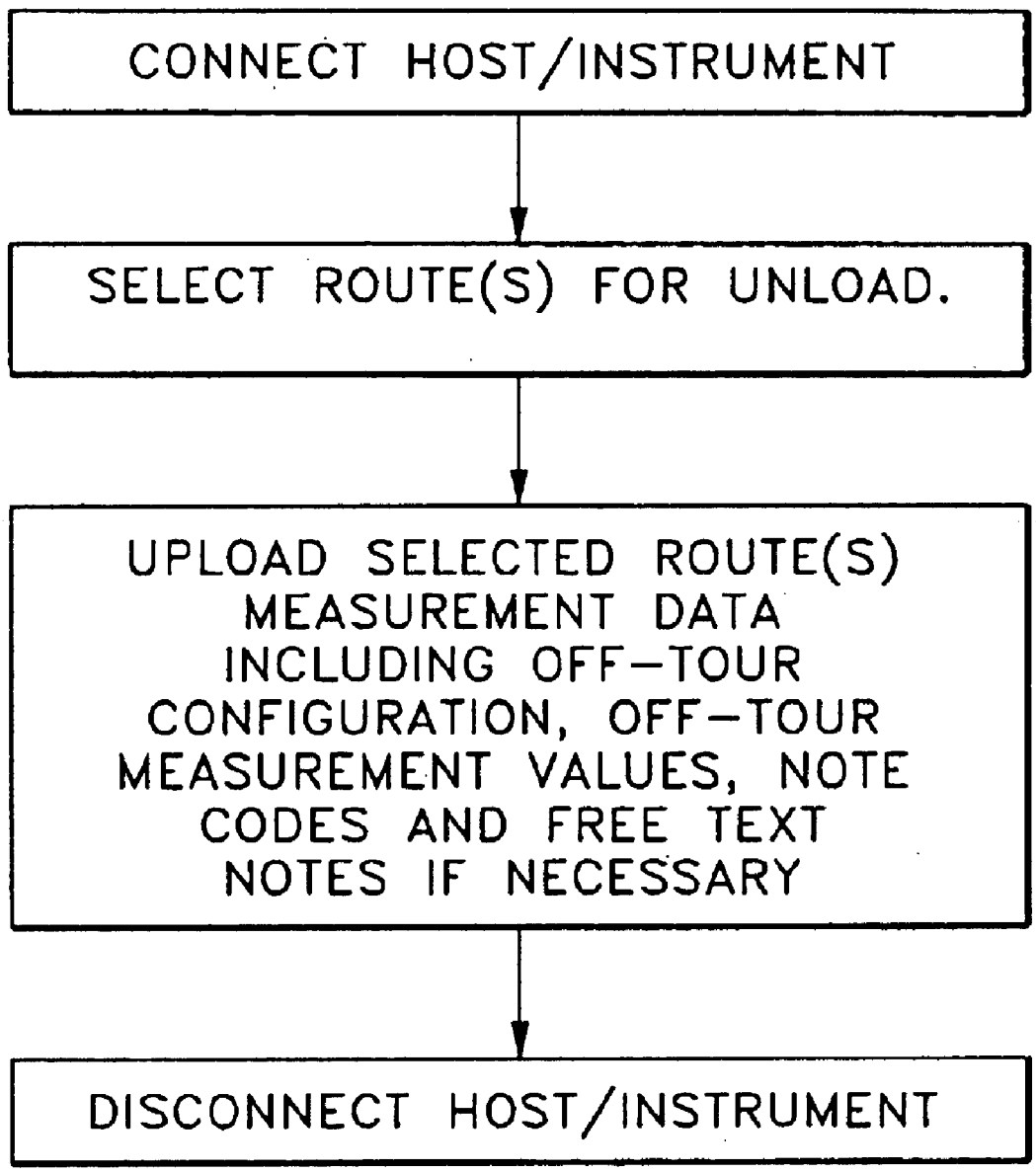
FIG. 78 is an uploading information flowchart according to the present invention.

FIG. 78 shows an uploading information flowchart that will now be described in detail.

The portable data collector and analyzer apparatus 10 is connected to the host computer 410 using either the serial or Ethernet communications links. The host computer and instrument then automatically begin to communicate. No user interaction is required at either the host computer 410 or the apparatus 10 to initiate communications between the two devices.

Using the software on the host computer, the route(s) in the portable data collector and analyzer's memory are uploaded as selected.

The host computer software then retrieves the route and measurement data from the portable data collector and analyzer's memory and stores it in the database 412. In addition to route data it is also possible to upload data collected at measurement points not included in the downloaded route. Also the measurement configuration used to collect this data is uploaded. These points can then be merged with the database using the host software.

Once the route information has been transferred the apparatus 10 can be disconnected from the host.

Moreover, having thus described the invention, it should be apparent that numerous structural modifications and adaptations may be resorted to without departing from the scope and fair meaning of the present invention as set forth hereinabove and as described hereinbelow by the claims.

We claim:

1. A portable data collector and analyzer apparatus, comprising in combination:

a transducer for sensing dynamic data and producing analog signals correlative to said sensed data;

signal conditioning circuitry operatively coupled to said transducer for receiving and conditioning said analog signals from said transducer to produce conditioned analog signals;

a filter circuit operatively coupled to said signal conditioning circuitry for receiving and filtering said conditioned analog signals to produce filtered analog signals;

an analog to digital converter circuit operatively coupled to said filter circuit for receiving and sampling said filtered analog signals to produce digital data samples;

a digital signal processor operatively coupled to said analog to digital converter circuit for receiving and operating on said digital data samples for selecting N samples wherein N is an integer power of two, said digital signal processor operating on said N samples by frequency shifting said N samples a predetermined amount to produce a set of N complex samples, said digital signal processor performing at least one decimation on said N complex samples for defining X number of packets of complex samples each comprised of N/X number of complex samples wherein X has an initial value of two for said at least one decimation and wherein X increases thereafter by a multiple of two for each subsequent decimation until a final predetermined number of decimations of said N complex samples is performed for defining a final number of packets of complex samples;

said digital signal processor performing a Fast Fourier Transform on said final number of packets of complex samples for producing frequency spectrum data;

a microprocessor device and;

an external shared memory device interfaced between and shared by both said digital signal processor device and said microprocessor device for receiving and storing said frequency spectrum data from said digital signal processor and transferring said stored frequency spectrum data to said microprocessor device.

2. The apparatus of claim 1 wherein said digital signal processor repeatedly performs said decimation on said N complex samples until a final number of 1024 packets of complex samples is obtained wherein each of said 1024 packets include two complex samples.

3. The apparatus of claim 2 wherein said digital signal processor performs a radix two complex Fast Fourier Transform on said final number of 1024 packets.

4. The apparatus of claim 3 wherein said digital signal processor frequency shifts said N samples by said predetermined amount being determined by the formula:

$$F_s = ((2n-1)*156.25*f_s)/N_L$$

Where n is an nth frequency shift, $f_s$ is a Fast Fourier Transform sample frequency rate, and $N_L$ is a number of desired spectrum lines.

5. A method for processing data with a portable data collector and analyzer apparatus, said method including the steps of:

(a) sensing dynamic data and producing analog signals correlative to said sensed data;

(b) converting said signals into digital data samples;

(c) defining a resolution of lines of a final output line spectrum;

(d) selecting N digital data samples wherein N is an integer power of two, (e) frequency shifting said N digital data samples by a predetermined frequency amount to produce a set of N point complex data, (f) decimating said N point complex data for defining X number of decimated points wherein X is an integer, (g) performing a Fast Fourier Transform on said X number of decimated points for producing a line spectrum;

(g) storing said line spectrum into a memory device, and (h) iteratively repeating steps (e) through (g) for a predetermined integer number of times until said defined resolution of lines of said final output line spectrum is obtained.

6. The method of claim 5 wherein said frequency shifting step includes frequency shifting said N digital data samples by a predetermined frequency amount determined by the formula:

$$F_s = ((2n-1)*156.25*f_s)/N_L$$

Where
- n is an nth frequency shift,
- $f_s$ is a Fast Fourier Transform sample frequency rate, and
- $N_L$ is a number of lines in said final output line spectrum.

7. The method of claim 6 wherein said decimation step includes decimating said N point complex data for defining 1024 decimated points.

8. The method of claim 7 wherein said step of performing said Fast Fourier Transform on said X number of decimated points for producing said line spectrum includes performing a radix two complex Fast Fourier Transform on said 1024 decimated points for producing said line spectrum.

9. A method for processing data with a portable data collector and analyzer apparatus, said method including the steps of:

(a) determining a start time of a packet of data having a predetermined number of asynchronous samples contained therein;

(b) determining a first trigger time which is later than the determined start time of the packet;

(c) determining a subsequent trigger time which is consecutive to the first trigger time and which is earlier than the determined end time of the packet;

(d) calculating a synchronous sample period by dividing the time between the consecutive trigger pulses by a predetermined synchronous sample rate;

(e) determining a first asynchronous sample that is prior to and closest the first trigger pulse and determining a second asynchronous sample consecutive to the first determined asynchronous sample;

(f) interpolating between the first and the second asynchronous samples for generating a value of a first synchronous sample at the first trigger pulse time, (g) determining a subsequent synchronous sample time by adding the synchronous sample period to the first trigger pulse time, (h) determining two asynchronous samples, one sample just before and one sample just after the subsequent synchronous sample time;

(i) interpolating between the two asynchronous samples for generating and storing a value of a subsequent synchronous sample at the subsequent synchronous sample time, (j) determining a next subsequent synchronous sample time by adding the synchronous sample period to the last subsequent synchronous sample time, (k) skipping to step (o) if the next subsequent synchronous sample time is after the time of the next trigger pulse;

(l) determining two asynchronous samples, one sample just before and one sample just after the next subsequent synchronous sample time;

(m) interpolating between the two asynchronous samples for generating a value for a next subsequent synchronous sample at the next subsequent synchronous sample time;

(n) iteratively repeating steps (j) through (m);

(o) iteratively repeating steps (j) through (m) if the time of the next trigger pulse is before the end of the asynchronous buffer and replacing the step (k) next trigger pulse value with a next trigger pulse value consecutive to the next trigger pulse value in step (k);

(p) storing the generated synchronous samples as a synchronous sample waveform if the next trigger pulse value in step (k) is after the end of the asynchronous buffer.

10. The method of claim 9 further including the step of processing subsequent buffers of asynchronous samples by iteratively repeating steps (a) through (p) above and by replacing the buffer start time with a next subsequent synchronous sample time that is after the last subsequent synchronous sample time used to generate the last synchronous sample of the last synchronous sample waveform generated from the last buffer.

* * * * *